US009247524B2

(12) United States Patent
Obradovich

(10) Patent No.: US 9,247,524 B2
(45) Date of Patent: Jan. 26, 2016

(54) POSITIONAL CAMERA AND GPS DATA INTERCHANGE DEVICE

(71) Applicant: SILVER STATE INTELLECTUAL TECHNOLOGIES, INC., Las Vegas, NV (US)

(72) Inventor: Michael L. Obradovich, Las Vegas, NV (US)

(73) Assignee: Silver State Intellectual Technologies, Inc., Las Vegas, NV (US)

( * ) Notice: Subject to any disclaimer, the term of this patent is extended or adjusted under 35 U.S.C. 154(b) by 0 days.

(21) Appl. No.: 14/296,285

(22) Filed: Jun. 4, 2014

(65) Prior Publication Data

US 2014/0287784 A1 Sep. 25, 2014

Related U.S. Application Data

(60) Continuation of application No. 12/785,315, filed on May 21, 2010, now Pat. No. 8,856,848, which is a continuation of application No. 10/373,497, filed on Feb. 24, 2003, now Pat. No. 7,748,021, which is a (Continued)

(51) Int. Cl.
*H04W 24/00* (2009.01)
*H04W 64/00* (2009.01)
(Continued)

(52) U.S. Cl.
CPC ....... *H04W 64/006* (2013.01); *G08G 1/096716* (2013.01); *G08G 1/096741* (2013.01);
(Continued)

(58) Field of Classification Search
CPC ..... H04W 64/006; H04W 4/02; H04W 64/00; H04W 36/32; H04W 40/20; H04W 52/285; H04W 64/003; H04M 1/72583; H04B 1/3805; H04N 1/00307
USPC .......... 455/456.1, 456.2, 456.3, 456.5, 456.6, 455/414.3, 414.1, 404.2, 412.1
See application file for complete search history.

(56) References Cited

U.S. PATENT DOCUMENTS 4,350,970 A 9/1982 von Tomkewitsch
4,521,857 A 6/1985 Reynolds, III (Continued)

FOREIGN PATENT DOCUMENTS

EP 0 650 125 A1 4/1995
EP 0 829 704 A2 3/1998

(Continued)

OTHER PUBLICATIONS

McDonald, Keith D., "Course 122-GPS Fundamentals & Applications", Navtech Seminars & GPS Supply, Inc., Catamaran Resort Hotel, San Diego, CA, Mar. 22-23, 1999 (336 pages).

(Continued)

*Primary Examiner* — Khalid Shaheed
(74) *Attorney, Agent, or Firm* — Klein, O'Neill & Singh, LLP

(57) ABSTRACT

A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.

46 Claims, 59 Drawing Sheets

TRAFFIC 1

Related U.S. Application Data division of application No. 09/425,320, filed on Oct. 21, 1999, now Pat. No. 6,525,768.

(60) Provisional application No. 60/105,050, filed on Oct. 21, 1998.

(51) Int. Cl.

| | |
|---|---|
| ***G08G 1/0967*** | (2006.01) |
| ***H04B 1/3805*** | (2015.01) |
| ***H04N 1/00*** | (2006.01) |
| ***H04M 1/725*** | (2006.01) |
| *G01S 19/14* | (2010.01) |

(52) U.S. Cl.

CPC ........ *G08G1/096775* (2013.01); *H04B 1/3805* (2013.01); *H04M 1/72583* (2013.01); *H04N 1/00307* (2013.01); *G01S 19/14* (2013.01)

(56) References Cited

U.S. PATENT DOCUMENTS 4,792,803 A 12/1988 Madnick et al.
4,812,843 A 3/1989 Champion, III et al.
4,953,196 A 8/1990 Ishikawa et al.
4,977,509 A 12/1990 Pitchford et al.
5,023,934 A 6/1991 Wheeless
5,043,736 A 8/1991 Darnell et al.
5,119,504 A 6/1992 Durboraw, III
5,124,915 A 6/1992 Krenzel
5,164,904 A 11/1992 Sumner
5,182,555 A 1/1993 Sumner
5,189,632 A 2/1993 Paajanen et al.
5,225,638 A 7/1993 Quint et al.
5,225,843 A 7/1993 Thompson
5,235,633 A 8/1993 Dennison et al.
5,257,023 A 10/1993 Furuya
5,265,024 A 11/1993 Crabill et al.
5,267,042 A 11/1993 Tsuchiya
5,272,638 A 12/1993 Martin et al.
5,295,064 A 3/1994 Malec et al.
5,299,132 A 3/1994 Wortham
5,317,311 A 5/1994 Martell et al.
5,334,974 A 8/1994 Simms et al.
5,335,276 A 8/1994 Thompson et al.
5,396,429 A 3/1995 Hanchett
5,420,592 A 5/1995 Johnson
5,432,841 A 7/1995 Rimer
5,450,329 A 9/1995 Tanner
5,479,482 A 12/1995 Grimes
5,488,558 A 1/1996 Ohki
5,491,507 A 2/1996 Umezawa et al.
5,497,339 A 3/1996 Bernard
5,504,482 A 4/1996 Schreder
5,504,684 A 4/1996 Lau et al.
5,506,644 A 4/1996 Suzuki et al.
5,517,193 A 5/1996 Allison et al.
5,519,403 A 5/1996 Bickley et al.
5,523,950 A 6/1996 Peterson
5,528,248 A 6/1996 Steiner et al.
5,539,645 A 7/1996 Mandhyan et al.
5,543,789 A 8/1996 Behr et al.
5,555,286 A 9/1996 Tendler
5,559,520 A 9/1996 Barzegar et al.
5,559,707 A 9/1996 DeLorme et al.
5,572,204 A 11/1996 Timm et al.
5,579,535 A 11/1996 Orlen et al.
5,596,494 A 1/1997 Kuo
5,604,676 A 2/1997 Penzias
5,625,668 A 4/1997 Loomis et al.
5,625,884 A 4/1997 Gitlin et al.
5,627,547 A 5/1997 Ramaswamy et al.
5,627,549 A 5/1997 Park
5,638,279 A 6/1997 Kishi et al.
5,640,156 A 6/1997 Okuda et al.
5,642,285 A 6/1997 Woo et al.
5,648,763 A 7/1997 Long
5,648,769 A 7/1997 Sato et al.
5,652,379 A 7/1997 Fukatani
5,661,652 A 8/1997 Sprague et al.
5,663,720 A 9/1997 Weissman
5,666,159 A 9/1997 Parulski et al.
5,673,039 A 9/1997 Pietzsch et al.
5,677,837 A 10/1997 Reynolds
5,689,252 A 11/1997 Ayanoglu et al.
5,694,514 A 12/1997 Evans et al.
5,699,056 A 12/1997 Yoshida
5,699,255 A 12/1997 Ellis et al.
5,701,258 A 12/1997 Harris et al.
5,708,712 A 1/1998 Brinkmeyer et al.
5,712,679 A 1/1998 Coles
5,717,748 A 2/1998 Sneed, Jr. et al.
5,717,749 A 2/1998 Sneed, Jr. et al.
5,719,936 A 2/1998 Hillenmayer
5,720,037 A 2/1998 Biliris et al.
5,724,316 A 3/1998 Brunts
5,727,053 A 3/1998 Sizer II et al.
5,742,226 A 4/1998 Szabo et al.
5,760,742 A 6/1998 Branch et al.
5,774,070 A 6/1998 Rendon
5,774,825 A 6/1998 Reynolds
5,774,827 A 6/1998 Smith, Jr. et al.
5,781,150 A 7/1998 Norris
5,786,789 A 7/1998 Janky
5,790,974 A 8/1998 Tognazzini
5,794,174 A 8/1998 Janky et al.
5,802,492 A 9/1998 DeLorme et al.
5,806,005 A 9/1998 Hull et al.
5,815,142 A 9/1998 Allard et al.
5,825,432 A 10/1998 Yonezawa
5,831,552 A 11/1998 Sogawa et al.
5,835,907 A 11/1998 Newman
5,848,373 A 12/1998 DeLorme et al.
5,864,305 A 1/1999 Rosenquist
5,903,321 A 5/1999 Tung et al.
5,908,464 A 6/1999 Kishigami et al.
5,913,078 A 6/1999 Kimura et al.
5,919,246 A 7/1999 Waizmann et al.
5,929,774 A 7/1999 Charlton
5,938,721 A 8/1999 Dussell et al.
5,946,626 A 8/1999 Foladare et al.
5,948,040 A 9/1999 DeLorme et al.
5,963,956 A 10/1999 Smartt
5,973,731 A 10/1999 Schwab
5,982,298 A 11/1999 Lappenbusch et al.
5,983,109 A 11/1999 Montoya
5,999,124 A 12/1999 Sheynblat
5,999,877 A 12/1999 Takahashi et al.
6,005,533 A 12/1999 Wilson
6,005,936 A 12/1999 Shimizu et al.
6,009,336 A 12/1999 Harris et al.
6,046,712 A 4/2000 Beller et al.
6,047,327 A 4/2000 Tso et al.
6,067,571 A 5/2000 Igarashi et al.
6,073,075 A 6/2000 Kondou et al.
6,075,874 A 6/2000 Higashikubo et al.
6,091,956 A * 7/2000 Hollenberg ................ 455/456.5
6,092,076 A 7/2000 McDonough et al.
6,107,939 A 8/2000 Sorden
6,107,944 A 8/2000 Behr et al.
6,119,066 A 9/2000 Sugiura et al.
6,122,506 A 9/2000 Lau et al.
6,127,945 A 10/2000 Mura-Smith
6,131,066 A 10/2000 Ahrens et al.
6,131,067 A 10/2000 Girerd et al.
6,133,853 A 10/2000 Obradovich et al.
6,134,501 A 10/2000 Oumi
6,141,610 A 10/2000 Rothert et al.
6,144,920 A 11/2000 Mikame
6,147,598 A 11/2000 Murphy et al.
6,148,261 A 11/2000 Obradovich et al.
6,163,749 A 12/2000 McDonough et al.
6,163,753 A 12/2000 Beckmann et al.
6,166,626 A 12/2000 Janky et al.

(56) References Cited

U.S. PATENT DOCUMENTS

| | | | |
|---|---|---|---|
| 6,169,955 | B1 | 1/2001 | Fultz |
| 6,173,231 | B1 | 1/2001 | Chojnacki |
| 6,184,801 | B1 | 2/2001 | Janky |
| 6,185,427 | B1 | 2/2001 | Krasner et al. |
| 6,188,957 | B1 | 2/2001 | Bechtolsheim et al. |
| 6,191,704 | B1 | 2/2001 | Takenaga et al. |
| 6,192,312 | B1 | 2/2001 | Hummelsheim |
| 6,192,314 | B1 | 2/2001 | Khavakh et al. |
| 6,199,013 | B1 | 3/2001 | O'Shea |
| 6,202,203 | B1 | 3/2001 | Ng |
| 6,208,934 | B1 | 3/2001 | Bechtolsheim et al. |
| 6,212,470 | B1 | 4/2001 | Seymour et al. |
| 6,212,472 | B1 | 4/2001 | Nonaka et al. |
| 6,212,473 | B1 | 4/2001 | Stefan et al. |
| 6,219,557 | B1 | 4/2001 | Havinis |
| 6,219,614 | B1 | 4/2001 | Uchigaki et al. |
| 6,219,694 | B1 | 4/2001 | Lazaridis et al. |
| 6,278,884 | B1 | 8/2001 | Kim |
| 6,282,362 | B1 | 8/2001 | Murphy et al. |
| 6,321,158 | B1 | 11/2001 | DeLorme et al. |
| 6,332,127 | B1 | 12/2001 | Bandera et al. |
| 6,335,753 | B1 * | 1/2002 | McDonald ................. 348/14.01 |
| 6,337,951 | B1 | 1/2002 | Nakamura |
| 6,377,810 | B1 | 4/2002 | Geiger et al. |
| 6,437,797 | B1 | 8/2002 | Ota |
| 6,504,571 | B1 | 1/2003 | Narayanaswami et al. |
| 6,522,354 | B1 | 2/2003 | Kawamura et al. |
| 6,522,417 | B1 * | 2/2003 | Kakigahara et al. ......... 358/1.15 |
| 6,525,768 | B2 | 2/2003 | Obradovich |
| 6,529,824 | B1 | 3/2003 | Obradovich et al. |
| 6,535,140 | B1 | 3/2003 | Goss et al. |
| 6,535,243 | B1 | 3/2003 | Tullis |
| 6,549,768 | B1 | 4/2003 | Fraccaroli |
| 6,584,320 | B1 | 6/2003 | Kawamoto |
| 6,587,691 | B1 | 7/2003 | Granstam et al. |
| 6,625,135 | B1 * | 9/2003 | Johnson et al. ............... 370/332 |
| 6,628,325 | B1 | 9/2003 | Steinberg et al. |
| 6,664,982 | B1 | 12/2003 | Bi |
| 6,677,894 | B2 * | 1/2004 | Sheynblat et al. ....... 342/357.46 |
| 6,721,558 | B1 | 4/2004 | Saad |
| 6,784,924 | B2 | 8/2004 | Ward et al. |
| 6,944,466 | B2 | 9/2005 | Bi et al. |
| 7,031,728 | B2 | 4/2006 | Beyer, Jr. |
| 7,071,843 | B2 | 7/2006 | Hashida et al. |
| 7,084,903 | B2 | 8/2006 | Narayanaswami et al. |
| 7,173,651 | B1 | 2/2007 | Knowles |
| 7,343,165 | B2 | 3/2008 | Obradovich |
| 7,650,234 | B2 | 1/2010 | Obradovich et al. |
| 7,748,021 | B2 | 6/2010 | Obradovich |
| 8,538,498 | B2 | 9/2013 | Obradovich et al. |
| 8,700,312 | B2 | 4/2014 | Obradovich et al. |
| 2001/0040532 | A1 | 11/2001 | Yasuda |
| 2001/0043273 | A1 | 11/2001 | Herrod et al. |
| 2002/0001032 | A1 | 1/2002 | Ohki |
| 2002/0029108 | A1 | 3/2002 | Liu et al. |
| 2002/0030745 | A1 | 3/2002 | Squilla et al. |
| 2002/0167595 | A1 | 11/2002 | Patel et al. |
| 2002/0171737 | A1 | 11/2002 | Tullis |
| 2003/0011684 | A1 | 1/2003 | Narayanaswami et al. |
| 2004/0001214 | A1 | 1/2004 | Monroe |
| 2007/0285523 | A1 | 12/2007 | Ward et al. |
| 2010/0231751 | A1 | 9/2010 | Obradovich |

FOREIGN PATENT DOCUMENTS

| | | |
|---|---|---|
| JP | 04-504016 | 7/1992 |
| JP | 04-250436 | 9/1992 |
| JP | 04-347977 | 12/1992 |
| JP | 07-210580 | 8/1995 |
| JP | 08-322091 | 12/1996 |
| JP | 09-135416 | 5/1997 |
| JP | 9-231263 | 9/1997 |
| JP | 10-150625 | 6/1998 |
| JP | 10-233985 | 9/1998 |
| JP | 10-241093 | 9/1998 |
| JP | 9-154938 | 1/1999 |
| JP | 2000-275319 | 10/2000 |
| JP | 2000-322446 | 11/2000 |
| KR | 1992-001236 | 1/1992 |
| KR | 1998-701413 | 5/1998 |
| WO | WO 90/08371 | 7/1990 |

OTHER PUBLICATIONS

Noriyuki, Duane, "Just Think of It as a Big Eye in the Sky . . . Watching", Los Angeles Times, Section E, Apr. 27, 1997 (3 pages, E1, E8).

"Clacar Unveils New Technology", Clacar, Inc., 1998 (1 page).

"Dusts Free Color Weather Graphics—And Cirrus Software for Windows", GTE, advertisement (1 page).

"Monet (Mobile Network)", Toyota, (2 pages).

Noguchi, Yoshikazu, "Intelligent Car-History and the Future in Japan and Toyota", Toyota Motor Corporation, 98C015 (pp. 121-125).

"Nokia 9000 Communicator-All in One", Nokia, Jan. 28, 1997 (16 pages).

Dye, Steven et al., "The GPS Manual Principles and Applications", Baylin Publications (23 pages).

Search Report from European Patent Office on corresponding EP application (99960143.8) dated Jun. 27, 2005.

Office Action from European Patent Office dated Feb. 20, 2006 for EP Application No. 99960143.8.

Office Action from European Patent Office dated Apr. 3, 2009 for EP Application No. 99960143.8.

Office Action from Japanese Patent Office dated Jan. 13, 2009 for JP Application No. 2000-577775.

Office Action from Korean Intellectual Property Office dated May 25, 2006 for KR Application No. 10-2001-7005014.

Notice of Allowance from Korean Intellectual Property Office dated Dec. 15, 2006 for KR Application No. 10-2001-7005014.

International Search Report on corresponding PCT application (PCT/US1999/024868) from International Searching Authority (US) dated Feb. 11, 2000.

Decision on Institution of Inter Partes Review, IPR2014-00159 (U.S. Pat. No. 7,343,165 B2), Paper 6, May 28, 2014.

Saito et al., "Automobile Navigation System Using Beacon Information," IEEE 1989 Vehicle Navigation and Information Systems Conference, pp. 139-145.

Petition for Inter Partes Review of U.S. Pat. No. 6,525,768.

* cited by examiner

FIG.20

| LISTING / NAME / WAYPOINT | ADDRESS | CITY | STATE | PHONE NO | GPS LOCATION NORTH | GPS WEST | WAYPOINT |
|---|---|---|---|---|---|---|---|
| ALEX'S GERMAN-AMERICAN RESTAURANT | 2801 S. EL CAMINO REAL | SAN CLEMENTE | CA | 714-492-8986 | 33°24.60 | 117°36.25 | 1 |
| ANTOINE'S CAFE | 218 S. EL CAMINO REAL | SAN CLEMENTE | CA | 714-492-1763 | 33°25.40 | 117°37.38 | 2 |
| BAKERS'S SQUARE RESTAURANT & PIES | 610 CAMINO DE LOS MARES | SAN CLEMENTE | CA | 714-661-3100 | 33°27.80 | 117°39.60 | 3 |
| BEACH GARDEN CAFE | 618 1/2 AVENIDA VICTORIA | SAN CLEMENTE | CA | 714-498-8145 | 33°25.35 | 117°37.36 | 4 |
| BOOTLEGGERS GRILL & SPEAKEASY | 111 AVE. PALIZADA | SAN CLEMENTE | CA | 714-361-8658 | 33°25.65 | 117°37.85 | 5 |
| BURBON STREET SANDWICHERY | 430 N. EL CAMINO REAL | SAN CLEMENTE | CA | 714-492-7827 | 33°25.58 | 117°37.76 | 6 |
| BURGER STOP | 524 AVENIDA PICO | SAN CLEMENTE | CA | 714-492-2350 | 33°25.92 | 117°37.12 | 7 |
| BURRITO BASKET, THE | 2017 S. EL CAMINO REAL | SAN CLEMENTE | CA | 714-498-5002 | 33°25.10 | 117°36.34 | 8 |
| CAFE CALYPSO | 114 AVENIDA DEL MAR | SAN CLEMENTE | CA | 714-366-9346 | 33°25.42 | 117°37.42 | 9 |
| CAFE EXPRESSO | 641 CAMINO DE LOS MARES | SAN CLEMENTE | CA | 714-240-3467 | 33°25.81 | 117°37.31 | 10 |
| CAPTAIN CULVER COUNTERCULTURE NATURAL FOODS | 149 AVENIDA DEL MAR | SAN CLEMENTE | CA | 714-498-8098 | 33°25.39 | 117°37.40 | 11 |
| CARL'S JR. RESTAURANT | 638 CAMINO DE LOS MARES | SAN CLEMENTE | CA | 714-493-0189 | 33°27.65 | 117°39.45 | 12 |
| CARL'S JR. RESTAURANT | 3929 S. EL CAMINO REAL | SAN CLEMENTE | CA | 714-498-5641 | 33°24.50 | 117°35.95 | 13 |
| CARROWS RESTAURANT | 620 AVENIDA PICO | SAN CLEMENTE | CA | 714-492-4290 | 33°25.85 | 117°37.10 | 14 |
| CHINA BEACH CANTEEN | 2369 S. EL CAMINO REAL | SAN CLEMENTE | CA | 714-492-6228 | 33°27.80 | 117°37.15 | 15 |
| CHINA WELL RESTAURANT | 620 CAMINO DE LOS MARES | SAN CLEMENTE | CA | 714-661-6813 | 33°27.61 | 117°39.42 | 16 |
| COCO'S FAMILY RESTAURANT | 2350 S. EL CAMINO REAL | SAN CLEMENTE | CA | 714-498-1542 | 33°24.90 | 117°36.18 | 17 |
| CORKY'S CAFE | 2727 VIA CASCADITA | SAN CLEMENTE | CA | 714-492-1135 | 33°25.10 | 117°37.48 | 18 |
| COURTSIDE RESTAURANT | 111 AVE. VISTA MONTANA | SAN CLEMENTE | CA | 714-361-2211 | 33°25.10 | 117°36.10 | 19 |
| DAVE'S MEXICAN RESTAURANT | 1701 N. EL CAMINO REAL | SAN CLEMENTE | CA | 714-492-7867 | 33°25.50 | 117°38.90 | 20 |
| DEL TACO | 109 CALLE DE INDUSTRIAS | SAN CLEMENTE | CA | 714-492-5311 | 33°25.51 | 117°36.50 | 21 |
| DENNY'S RESTAURANT | 529 AVENIDA PICO | SAN CLEMENTE | CA | 714-492-2382 | 33°25.48 | 117°36.15 | 22 |
| DOMINOES PIZZA | 1502 N. EL CAMINO REAL | SAN CLEMENTE | CA | 714-498-9002 | 33°25.25 | 117°37.50 | 23 |
| EASTERN WINDS | 201 N. EL CAMINO REAL | SAN CLEMENTE | CA | 714-492-3008 | 33°25.01 | 117°37.05 | 24 |
| EL CAMINO TACOS | 420 S. EL CAMINO REAL | SAN CLEMENTE | CA | 714-366-8358 | 33°25.10 | 117°37.25 | 25 |
| EL JEFE CAFE | 106 E. ESCALONES | SAN CLEMENTE | CA | 714-492-4010 | 33°25.25 | 117°37.03 | 26 |
| EL MIRADOR | 301 N. EL CAMINO REAL | SAN CLEMENTE | CA | 714-366-0855 | 33°25.08 | 117°37.10 | 27 |

GPS ENGINE

| APPLICATION MODULE INTERFACE | | | |
|---|---|---|---|
| LAYER SYSTEM | ACCESS LATITUDE/LONGITUDE QUALITY CODES FOR BEST DISPLAY SCALES | | |
| LAYER PROTOCOL | USE SPATIAL QUERY FUNCTIONS | | |
| ROUTE PLANNING | USE CENTROID INTERPOLATION FUNCTIONS | | |
| | USE MATCH-RATE COMPARISON FUNCTIONS | | |

- HEADER PROTOCOL
- TAG TYPE
- LATITUDE/LONGITUDE
- RADIUS
- MAP
- WAYPOINT LINKS
- ETC.

(53)

DIGITAL WEB TV

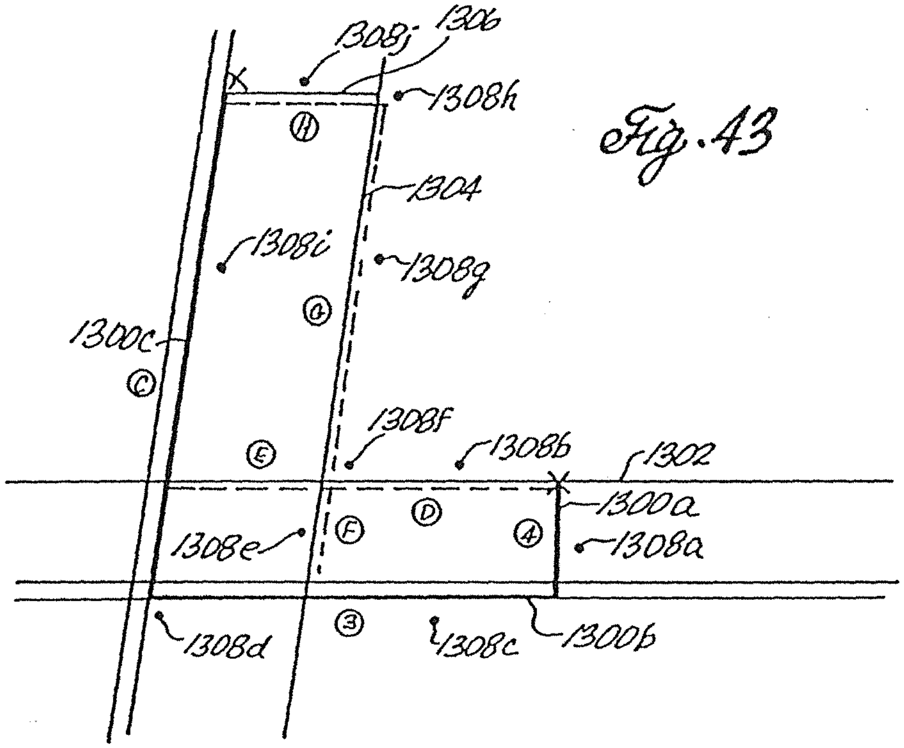
Fig. 43
Fig. 44
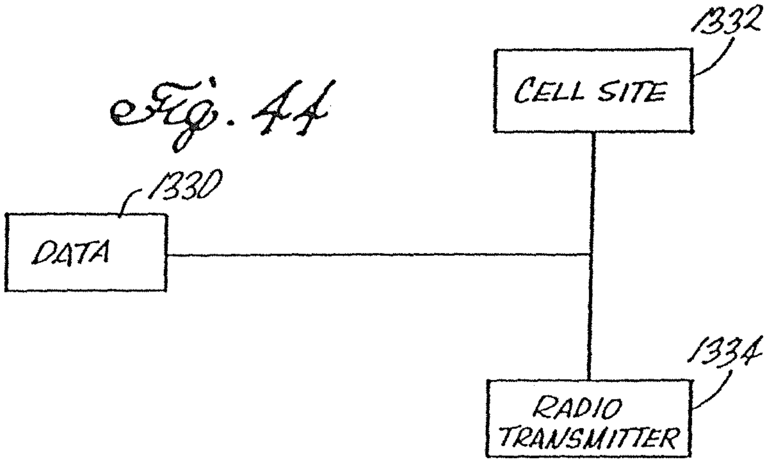

TRAFFIC 1

TRAFFIC 2

TRAFFIC 3

TRAFFIC 4

TRAFFIC 5

TRAFFIC 6

TRAFFIC 7

TRAFFIC 8

TO C-MAIL
FROM NAVIGATE SCREEN

C-MAIL 1

C-MAIL 2

C-MAIL 3

C-MAIL 4

C-MAIL 5

C-MAIL 6

POSITIONAL CAMERA AND GPS DATA INTERCHANGE DEVICE

CROSS-REFERENCE TO RELATED APPLICATIONS

The present application is a continuation application of U.S. patent application Ser. No. 12/785,315, filed May 21, 2010, entitled "POSITIONAL CAMERA AND GPS DATA INTERCHANGE DEVICE," which is a continuation of U.S. patent application Ser. No. 10/373,497, filed Feb. 24, 2003, now U.S. Pat. No. 7,748,021, which is a divisional application of U.S. patent application Ser. No. 09/425,320, filed Oct. 21, 1999, now U.S. Pat. No. 6,525,768, which claims the benefit of the filing date of U.S. Provisional Patent Application No. 60/105,050, filed Oct. 21, 1998. The disclosure of each of these related applications is hereby incorporated by reference.

FIELD OF THE INVENTION

The invention relates generally to a system for communicating data including global-positioning-encoded information. In particular, the present invention relates specifically to a device and system for communicating and retrieving position and position related data.

BACKGROUND OF THE INVENTION

Availability of up-to-date information is more important today than ever before and this will continue to be true for the foreseeable future. People want to be well informed, so much so that they travel with cellular phones, beepers, and even portable hand-held Global Positioning System (GPS) satellite receivers.

GPS capable devices generally have a GPS receiver for receiving satellite signals from the GPS satellite network that allow for determination of the device's position. Such devices allow for precisely locating the device in terms of latitude and longitude using the GPS receiver. Some devices have map data stored in memory and a display for showing the device position with reference to the map data. Other devices have no underlying map data base for reference. Rather, they show only the geographic coordinates of the device's location. These coordinates may be referred to as waypoints. Most GPS receiver devices can store many waypoints. Some GPS receiver devices can plot and display a trail of waypoints and store this trail for future retrieval. Sophisticated devices may compute the device's heading, speed, and other information based on comparisons with previous GPS determined positions.

GPS receiver devices with map display capability may store the map information on computer diskettes, CD-ROM's, or other computer memory storage devices. The device location may then be displayed on a display terminal with reference to a map stored in the computer memory storage device. The available quantity of map data, however, can overwhelm the memory capability of easily portable computer devices. This problem is exacerbated when additional information is included and linked with the map data. In addition, information is more valuable when it is up to date and available at the time of consumption, and such devices do not incorporate a means for updating the stored information. By way of example, a CD ROM could never maintain an up-to-date list of every 5-star restaurant.

Some GPS receiver devices have the ability to communicate over a telecommunications network. These devices do not provide for automatic or semi-automatic dynamic exchange of on-line position dependent or related information. In addition, these devices cannot communicate with third parties in the absence of a uniform data format standard. For example, a cellular-phone-based system comprising GPS location information working in conjunction with proprietary Public Safety Answering Point (PSAP) telephone equipment is known. The device provides personal and medical information on an emergency basis to the proper authorities. Such a device does not allow third parties to communicate, tag, interrogate, limit, designate, modify or share this information amongst themselves for any other use.

To that end, the ability to receive digital data structures with GPS encoding, and storing this information for eventual use or broadcast to third parties, would be valuable. Today, the U.S. and several other countries have independent publishers busily GPS mapping everything down to the most minute detail. Most of these data bases are available on CD ROM storage. The problem is that no one data base can contain enough information to fulfill the unique requests of every particular and picky consumer. The costs associated with providing and maintaining such a large data base would be overwhelming and over-burdening. Additionally, most consumers do not like reading or compiling vast data bases.

SUMMARY OF THE INVENTION

The system of the present invention utilizes Personal Communications Devices (PCDs), and traditional computer systems with GPS engines, routers, and other application programs to request, process, and transmit tagged GPS encoded information. The system, with related applications, can be accessed by device users, traditional computer users, website users (cyberspace), data publishers, public or private enterprises or individuals, by means of application programs. The tagged GPS encoded data files can be stored or sent via communication links using AM, FM, spread spectrum, microwave, laser or light beam in free or fiber optic, line-of-sight, reflected, satellite, secure or non-secure, or any type of communications between multiple points that the application or the state-of-the-art may allow. The system is a waypoint tag and interrogation system using various protocols to answer requests and provide GPS-encoded information. The applications use GPS devices, engines, routing and encoding for access to specific requester-designated data retrieval requests. The applications access fax machines, beepers, telephones and other communication linked devices. The system accesses computer and storage systems with various applications in order to provide this information from a plurality of providers. The system thereby eliminates or reduces the need for large storage devices and interchangeable storage modules.

One embodiment of the present invention includes a requesting device, a data provider (hardware and software), a user, tagger applications or GPS engine and router system with protocols for encoding, tagging, modifying, interrogating, arranging, limiting, displaying, sorting, mapping, segregating, sending, receiving and updating waypoint and the waypoints connected data structures with digital or graphic maps, digital voice files, linked digital web files properly encoded and tagged by way of specific devices, or by traditional computer and storage systems.

The application programs contain protocols for users, providers, taggers, list maintenance organizations, and others, and will use a dynamic identification system from applications containing GPS search engines, route planners, compilers, designators, publishers, and others to permit communication of information.

The PCD is a cellular-phone-sized electronic device, combining the capabilities of a GPS receiver, transceiver, digital beeper, cell phone and projection system into one compact unit. The PCD is capable of uploading emergency information (medical, police alert, etc.) via a one-push button that phones 911 or a security monitoring center similar to those used for house alarms. The alert continues to be broadcast until a response is made.

The PCD is also capable of downloading information via a request to a data provider, similar to a request for directory information from a phone company or other service. In this mode the PCD acts similar to calling a phone operator for information. However, in this instance, no human contact is required. The caller requests specific information (location of gas stations, names of restaurants, local banks, etc.) via a voice command ("Download e.g., Wells Fargo Banks") or via digital commands using a keypad or other input device and the requested information is automatically downloaded to and stored in the memory of the user's PCD. This information can be accessed off-line via the screen on the PCD. It is all done digitally, eliminating having to write down information such as name, address, location map, GPS latitude and longitude encoding, direction and distance to location, hours of operation, or other items of information. The PCD can be plugged into an automobile input port or similar device, if available, and provide distances and directions to locations of interest. Similar information of a condensed nature can also be provided to the user via the screen of the PCD. The user is not required to be a subscriber to some proprietary system, instead the PCD can use any means to access any data base from any potential provider, whether GPS encoded or not.

In some areas the information would be sent and received by way of a Local Area Broadcast via radio frequency signals to each home, car or PCD within a reception area In such an embodiment, users are able to access companies listed on the broadcast network from data providers of properly tagged, yellow page-type information or are provided with GPS encoded information and maps similar to web page listings. This would be advantageous to small towns with little information available for travelers, but which have an interest in providing up-to-date traffic, weather and travel advisories to benefit the local community and businesses. Such a system does not require a master, home or base unit. The providers of data base or advertising information could be a single data provider and could also be individual users with application programs that allow provision of such data. The application programs provide a means for sending and receiving data, GPS encoded data and graphics encoded data. The application programs can also act as a universal coder/decoder to other proprietary GPS data bases.

The present invention allows users to request detailed information relating to their present location as well as information related to distant locales. Some of the advantages provided by the invention include:

1. Information can be received digitally by a PCD user from any system.
2. Multiple requests can be retained, stored or resent.
3. In-depth dynamic data retrievals are possible and could be viewed later.
4. GPS tagging and encoding with latitude and longitude information along with encoded maps for navigation.
5. Small non-contiguous map segments are possible.
6. On-line storage of data personal and other information, along with GPS encoded maps on some data files.
7. Display menus, interfaces and applications can be viewed on heads-up display systems in automobiles, homes, businesses and various commercial applications.
8. Allows for portable Internet access.
9. Provides a means for an Internet based telephone directory access tagged and linked to the originating area code and phone numbers.

Remote and distant third parties could communicate with each other and, by sending and receiving GPS encoded data, can meet or find each other in remote locations. Maps and other digital data may be transmitted/received by fax, beeper (receive only), computer, phone and radio.

The system also utilizes a system of non-subscribers communicating to each other in a similar fashion, without the use of base stations. In addition, the non-subscribers could send personal data bases with maps included, GPS information, and other information of non-related data or graphics from publishers of any such data base. In this embodiment the device would act as a transceiver, sending and receiving dynamic moving waypoint information in digital formats, including maps of various sizes and embodiments.

The PCD can display a singular or a plurality of images and displays, project an image on to a screen or viewing surface, store or communicate data (depicted as a line, graphic, icon, etc.) to and/or receive latitude and longitude data from third parties. Additionally, the device can send/receive latitude- and longitude-encoded maps and other data to/from a third party, send/receive standard or non-standard phone and fax communications (AM, FM, spread spectrum, microwave, laser or light beam in free or fiber optic, line of sight, reflected, satellite, secure or non-secure, or any type of communications between two points that the application or state-of-the-art may allow), perform computer functions from existing application software and operating systems, receive standard or non-standard beeper messages, interface with a conventional computer and provide an interface to a heads-up display, an external viewing device or any projection system.

An embodiment of this invention incorporates a GPS transceiver with a designated application used with a communication system or network. Several users can communicate and send data, maps and graphic files with or without GPS encoding. By example, a user could request from sensing, weather, or condition reporting devices details concerning remote locations. These sensing, weather, and condition reporting devices may also be accessible over cable land lines or other communication media.

In one embodiment of the device and tagging system information is communicated from locations, homes, businesses, commercial designations, government resources, public and private areas, cyberspace and other communication systems. Various designated locations, or a plurality and multiplicity of locations, or data structures, are assigned as waypoints. These waypoints could be tagged, or interrogated from an application program which describes, encodes, reports, modifies and communicates this encoded information and data from any location. In addition, the transmitting device may report a plurality and multiplicity of locations or events unrelated to either the location of either the transmitting or receiving device. Indeed, the device could communicate to many unlinked, unreported or unconnected waypoints and send active dynamic information to the requester. Cyberspace providers may enter the network web system, use applications for device communications and participate in the exchange of information using designated GPS engines and applications. By way of example, the invention can provide a requester with dynamic location information, or other data to a location anywhere in the U.S. This location information may be used to locate individuals in determining whether to authorize credit requests, whether PCD or item containing a PCD, such as an automobile, is moved, or in routing electronic communications.

The system is similar to the world wide web, except the web does not use GPS engines, applications, tagging systems, etc. By way of example, one difference is that the invention uses GPS devices, engines, applications and encoding for access to specific requester designated data retrieval techniques. Indeed, the invention provides a means to locate specific individuals both physically and in terms of an electronically accessible location.

Another advantage the invention provides is a means to display this type of information and a means to store data unrelated to any interrogation by the PCD device. Methods of display include multiple of displays including, by example, overhead displays, heads-up displays, projection systems, LCD displays, computer displays or any past or future designed displays whether connected directly or by some electromagnetic means. The preferred embodiment of the device could include any means of display or combinations thereof. In addition, the device could include many control devices such as remote control, remote mouse type devices and any combination of keyboards.

Further objects, features and advantages of the invention will become apparent from the following detailed description taken in conjunction with the accompanying drawings showing an illustrative embodiment of the invention in which like parts are designated by like reference numerals throughout.

DESCRIPTION OF THE DRAWINGS

FIG. 20 illustrates a typical listing downloaded from a data provider;

FIG. 34 illustrates a block diagram of the condition reporting device of the present invention;

FIG. 43 illustrates a display of a PCD display showing a user's route comprised of multiple segments;

FIG. 44 illustrates a block diagram of a local area transmission system for providing multimedia information.

DETAILED DESCRIPTION OF THE INVENTION

Figure 1:
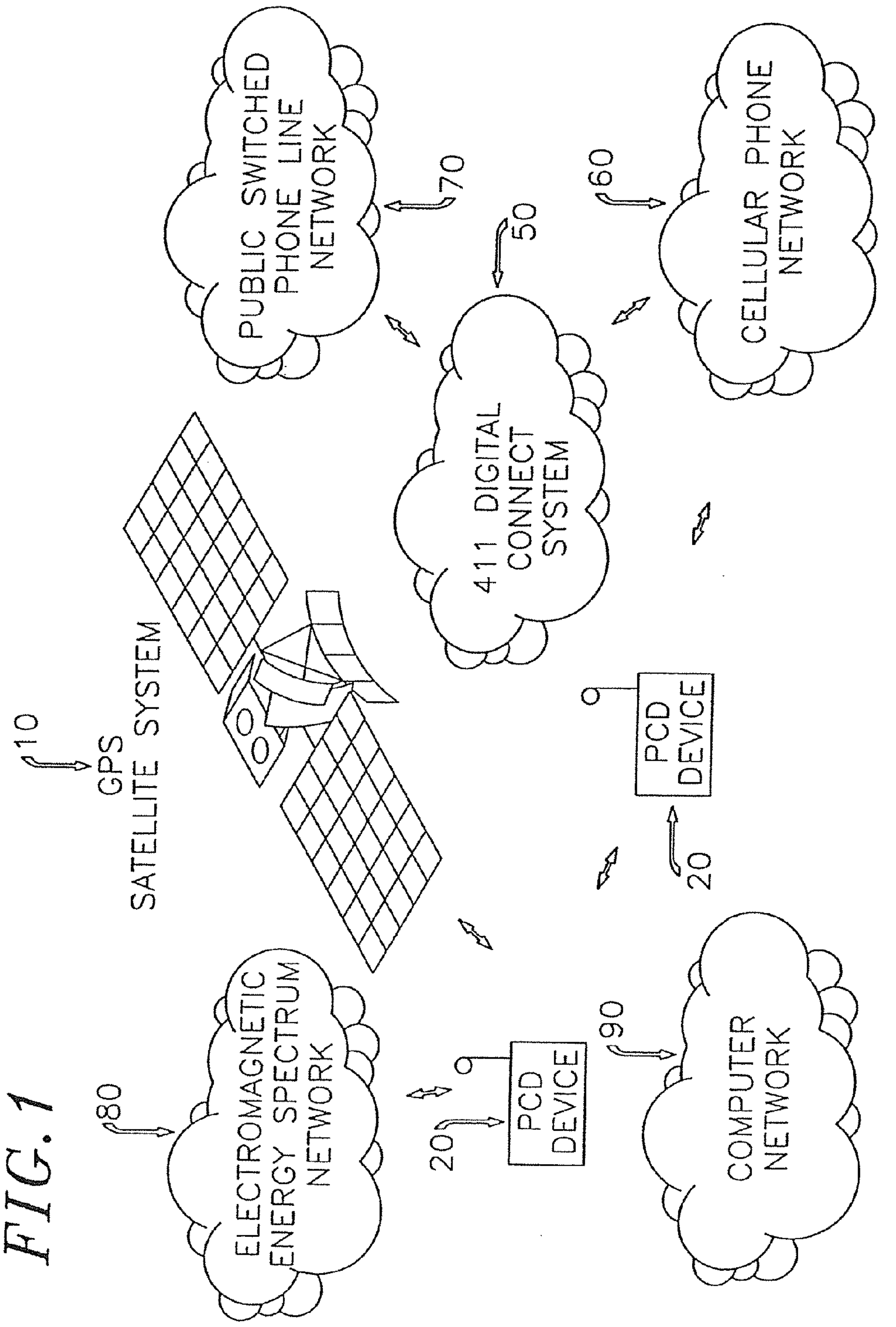
FIG. 1 illustrates a GPS transceiver system and communication links incorporating the present invention.

FIG. 1 shows a system capable of communicating using the electromagnetic energy spectrum, traditional computer networks, cellular phone networks, public telephone networks, and satellite system networks. The major components of the system comprises personal communication devices (PCDs) 20 and one or more of the following: a cellular phone network 60, a standard phone line network 70, an electromagnetic energy spectrum network 80 and/or a computer network 90. The PCD receives signals from a GPS satellite system 10.

Figure 2:
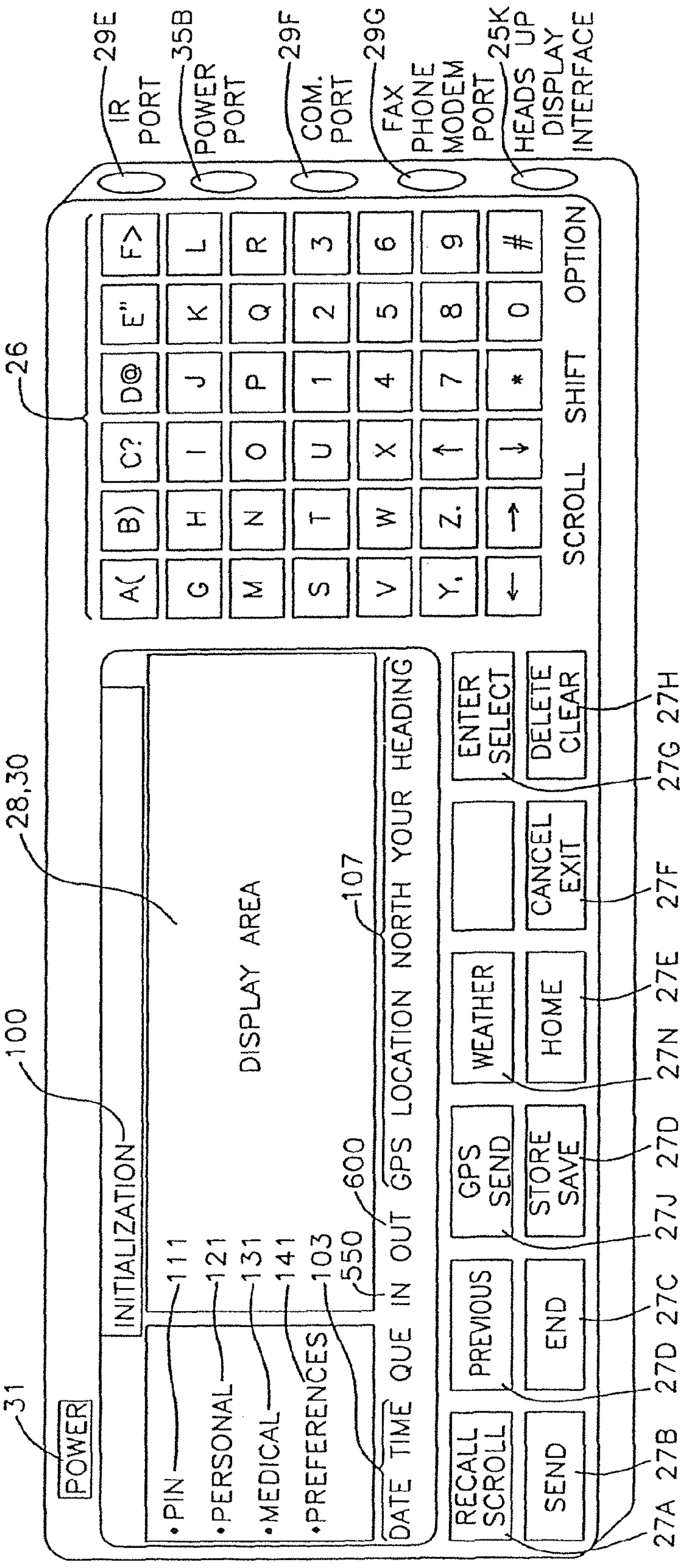
FIG. 2 is a front perspective view of a PCD of the present invention showing a layout of controls and an initialization screen.

FIG. 2 illustrates a PCD of the present invention. The PCD has a display 28*a*. The display may be of a LCD type or other types known in the art. Incorporated with the display is a touch screen input device 28*b*, which are known in the art. The PCD also has a alphanumeric key pad 26, which includes many of the standard keys generally found on computer keyboards. The location of the keys, and the selection of the characters used on a single key, may be varied as desired. The PCD also has specialized keys 27*a-g, n* related to GPS, telecommunications, and other functions. Located on one side of the PCD are a number of input and output ports. In the embodiment shown, these ports include a modem output port 29*g*, a generalized communication port 29*f*, a power port 35*b*, an infrared port 29*e*, and a heads-up display interface port 25*k*. The location of these ports are shown for descriptive purposes only, the specific location of these ports on the PCD is not critical. The power port allows the PCD to be operated from an external power source (not shown). The communication port allows the PCD to be connected to printers, local computer networks, and the like.

Figure 3:
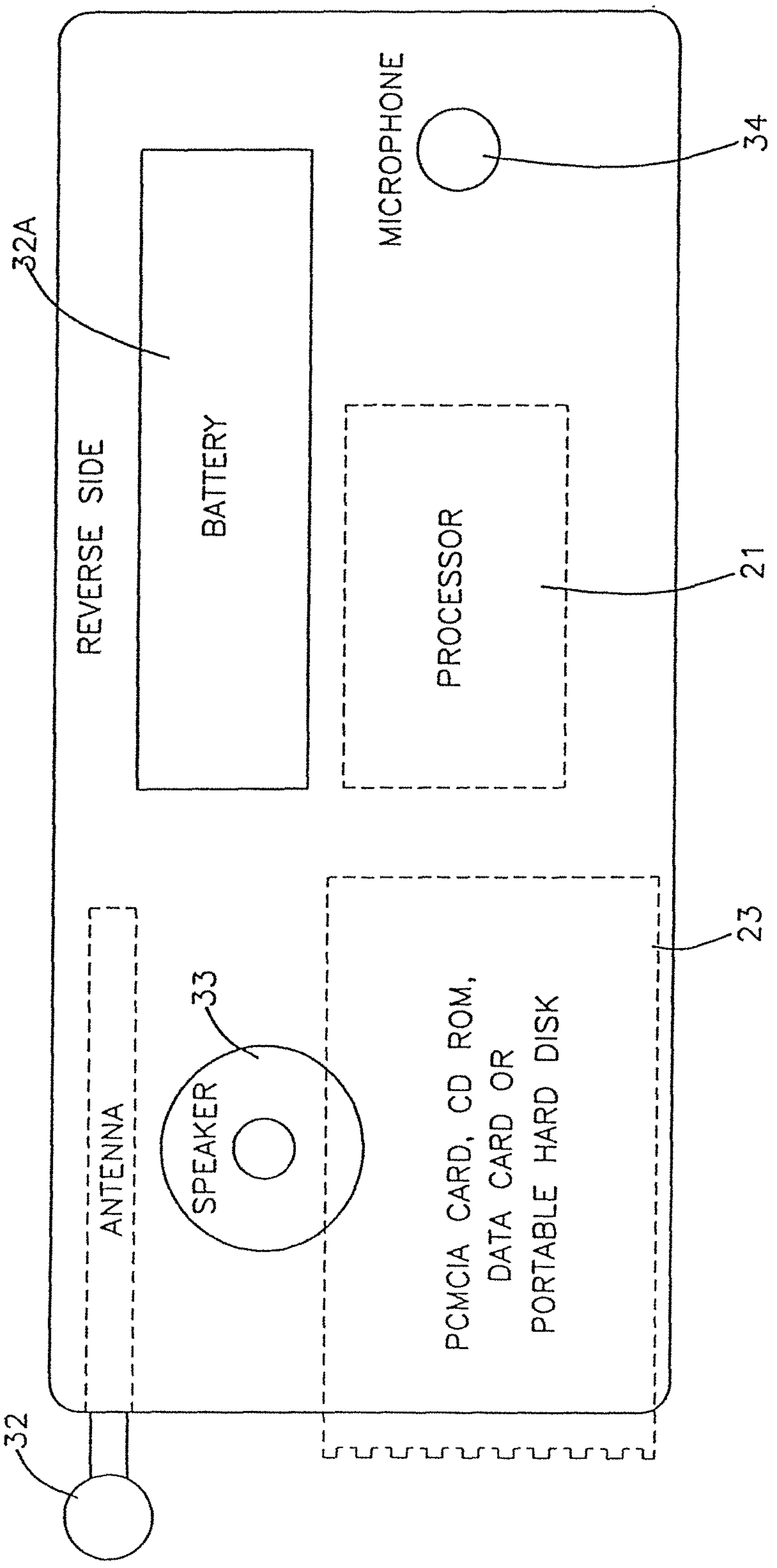
FIG. 3 is a rear view of the PCD of FIG. 2.

FIG. 3 shows a rear view of the PCD of FIG. 2. The rear of the PCD contains a microphone 34 towards one edge of the rear of the PCD and a speaker 33 towards the opposing edge. The layout of the microphone and the speaker is similar to that found in portable cellular telephones. An antenna 32 extends from the edge near the speaker to allow for communication in a cellular telephone network or via other electromagnetic spectrum means. The PCD contains a battery 38*a*. The battery allows for mobile operation of the PCD and is the selected power source if an external power source is not available through the power port. The PCD's operation is governed by a processor 21. A variety of microprocessors may be used, with the selection of such determined by processing power, power utilization, and other factors and requirements. The PCD has a slot 23 for a PCMCIA card, CD-ROM, or other computer accessory. The PCD is powered on when the power button 31 (shown in FIG. 2) is depressed. In the embodiment shown, at initial device power on, the processor causes the PCD to display the initialization screen 100 (shown in FIG. 2).

Figure 4:
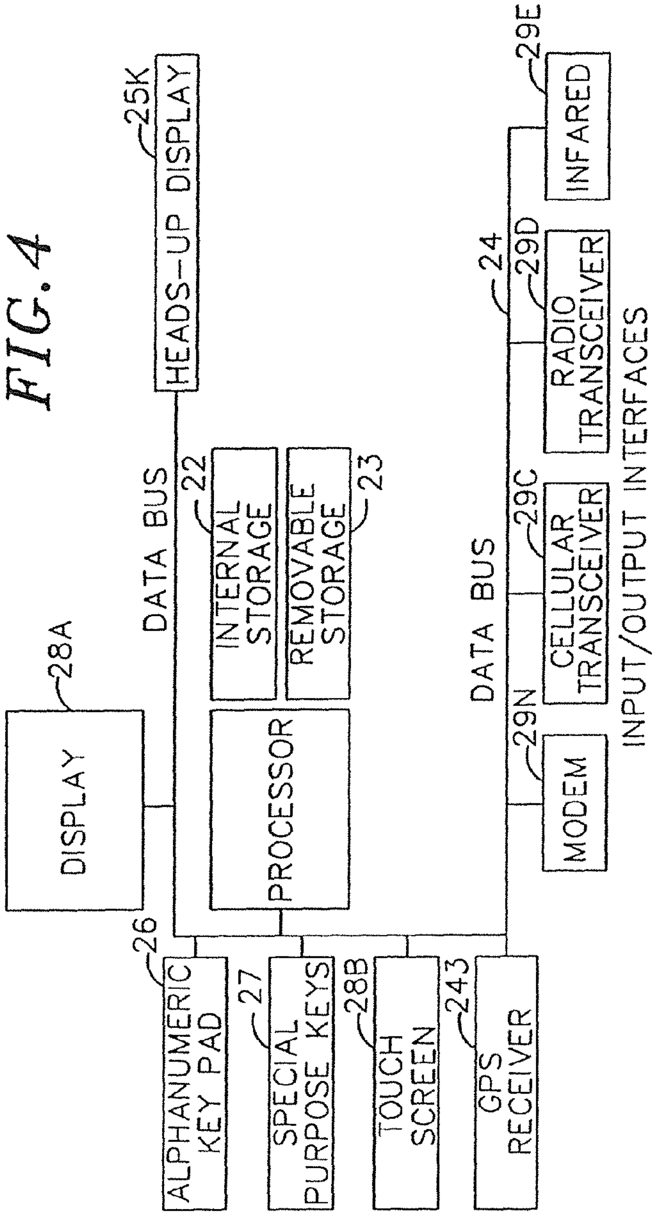
FIG. 4 is a block diagram of the PCD of FIG. 2.

FIG. 4 shows a block diagram of the PCD. Control and logic functions are performed by the processor 21. Internal data storage 22, which is provided by conventional memory such as RAM or ROM or variations thereof, may be accessed by the processor. The processor may also access removable data storage devices 23 such as a hard disk installed via the PCMCIA slot, a CD-ROM type device or other similar removable data storage devices. The processor is connected by a data bus 24 to a number of devices. These include the alphanumeric key pad and other special purpose keys, the touch screen, and other hard wired input devices. The heads-up display output port and the display screen are also connected via the data bus to the processor, it being recognized that a number of display related devices such as VGA cards, chips, and the like are also required to implement the display device functions and the other previously mentioned functions. The microprocessor may also access or control communications with telephone networks, either hardwired or cellular, radio transmissions, infra-red transmissions, or communications with other computer devices.

All known verbal commands from GPS systems can be implemented and attachment or inclusion of voice activation for map instructions relative to location, GPS and street designations, including heading descriptions, distance, and arrival time estimates can be included.

Figure 24:
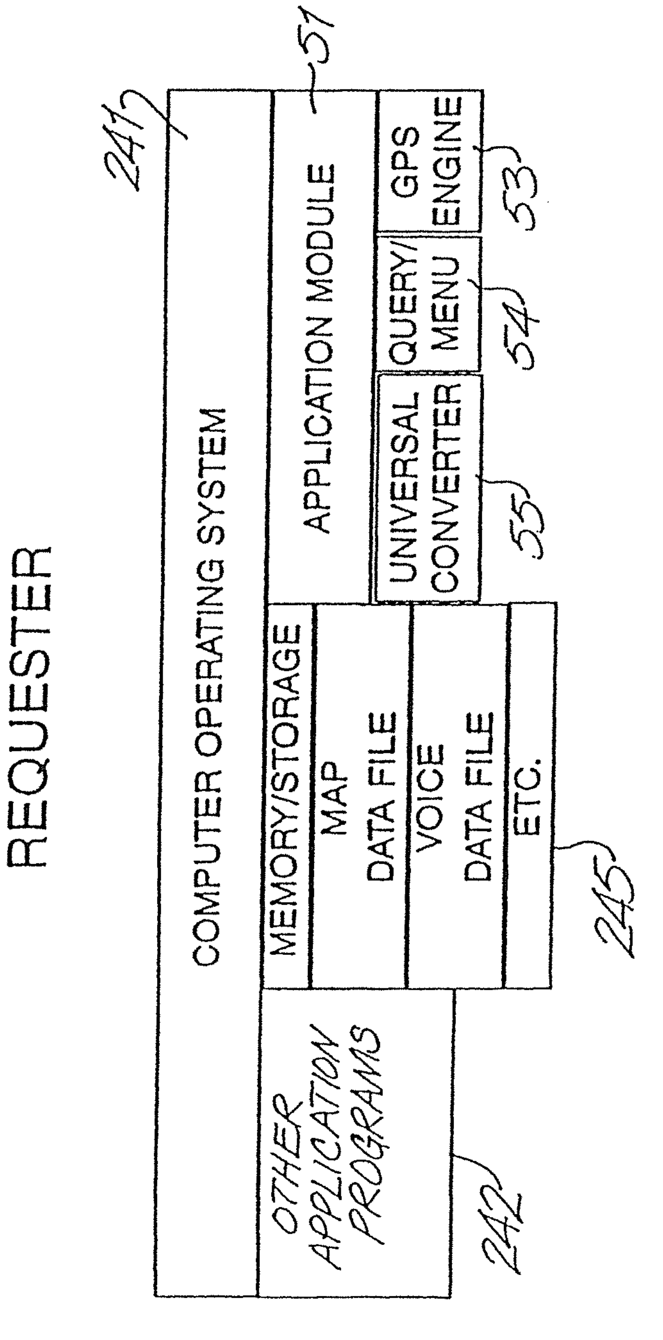
FIG. 24 illustrates a software module configuration of a requester.
Figure 25:
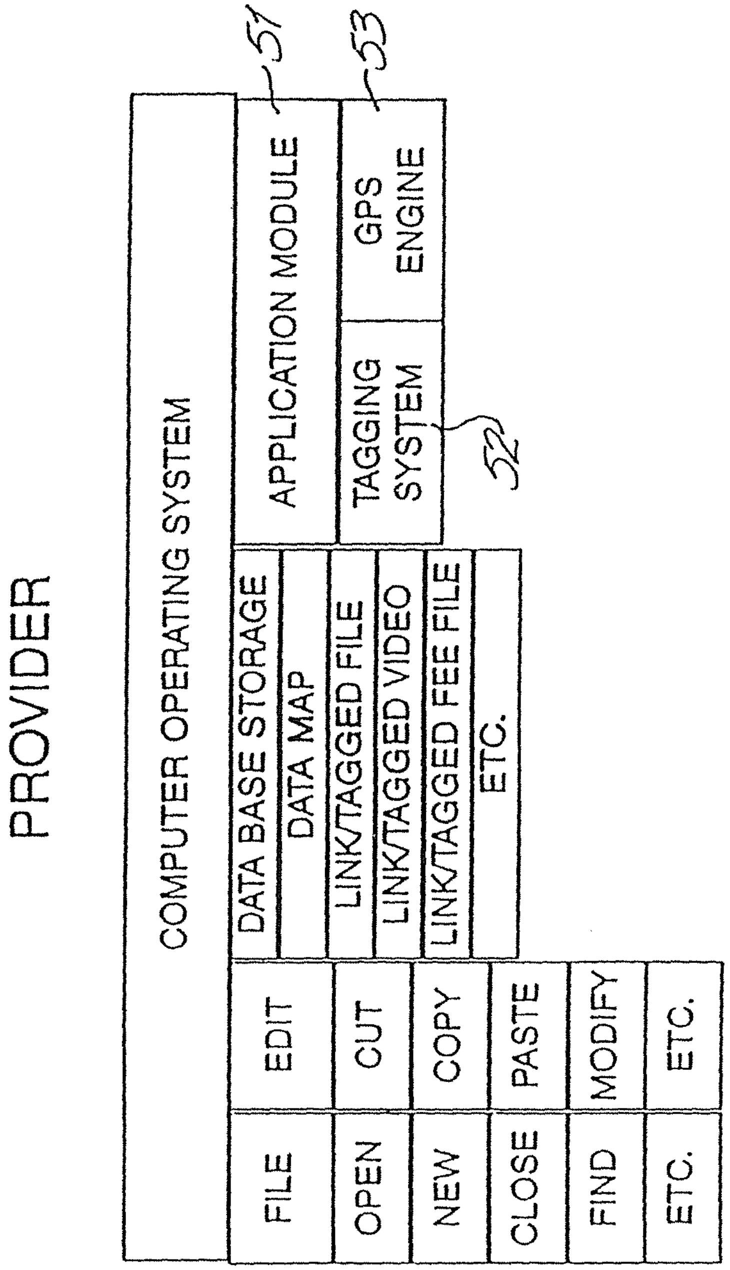
FIG. 25 illustrates a software module configuration of a provider.

FIG. 24 illustrates a block diagram of the PCD's software components. An application module or program 51 interfaces with the PCD's operating system 241. The operating system may be DOS, UNIX, Windows 95, Windows NT, O/S2 Apple McIntosh, Next Computer, or other operating systems, including operating systems well suited to devices with constrained memory or other limitations due to the small physical size of the PCD. The operating system additionally interfaces with other application programs 242 that provide standard file edit and other functions typically found in personal computers. The operating system, or other application programs interfacing with the operating system, provide for maintenance of data bases 245 used by the PCD. The application module includes a GPS engine 53 providing GPS functions, including interfacing with the GPS receiver 243 (shown in FIG. 4). A query menu program 54 of the application module controls the graphical user interface and related functions for the device. Included in the application module is a universal converter 55.

Figure 29:
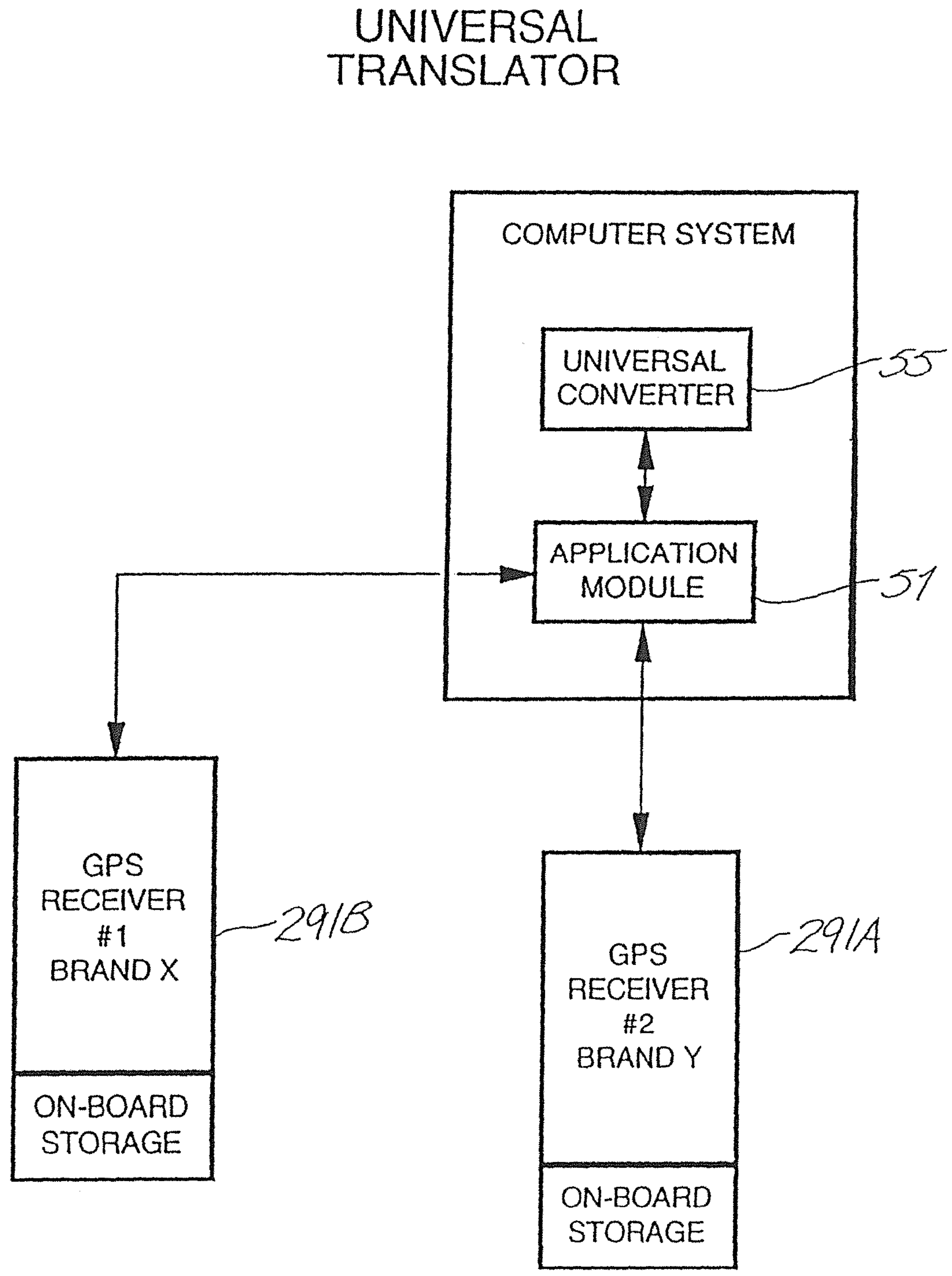
FIG. 29 illustrates a software module configuration of the universal translator.

As illustrated in FIG. 29, the universal converter enables the PCD to read in data provided by third parties 291*a, b* and convert or filter such data to a format useable by the PCD. The universal converter first inspects the received data to determine if the data is in a known format which can be converted to the format used by the PCD. If the format is not known by the device, the universal converter attempts to extract any ASCII data or format the data as a bit map as appropriate.

Figure 26:
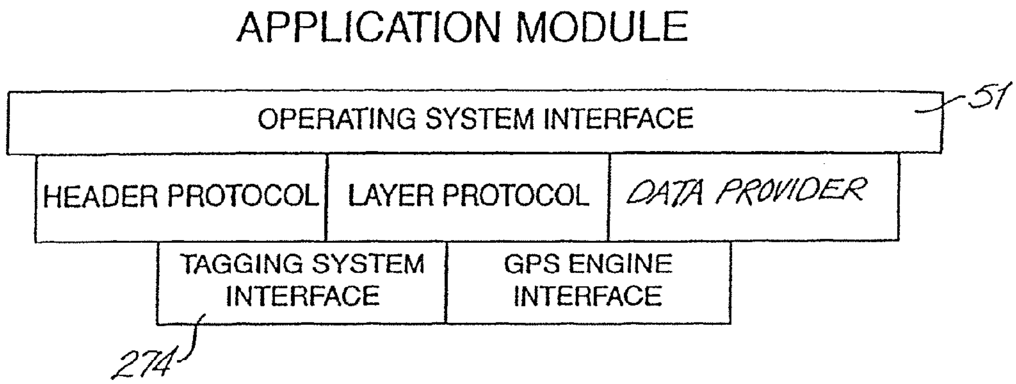
FIG. 26 illustrates a software module configuration of the application module.
Figure 27:
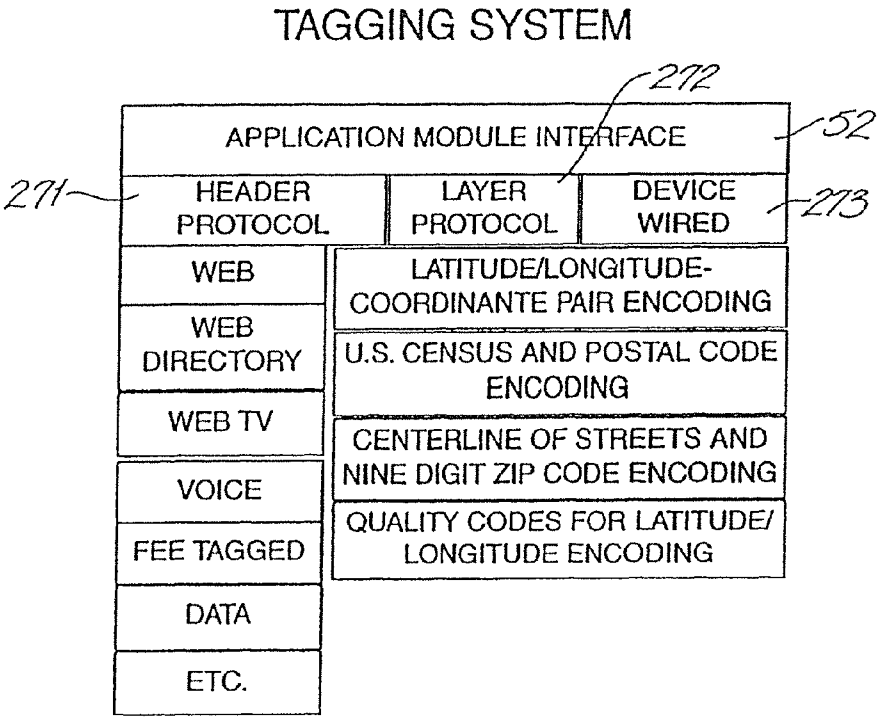
FIG. 27 illustrates a software module configuration of the tagging system.
Figure 28:
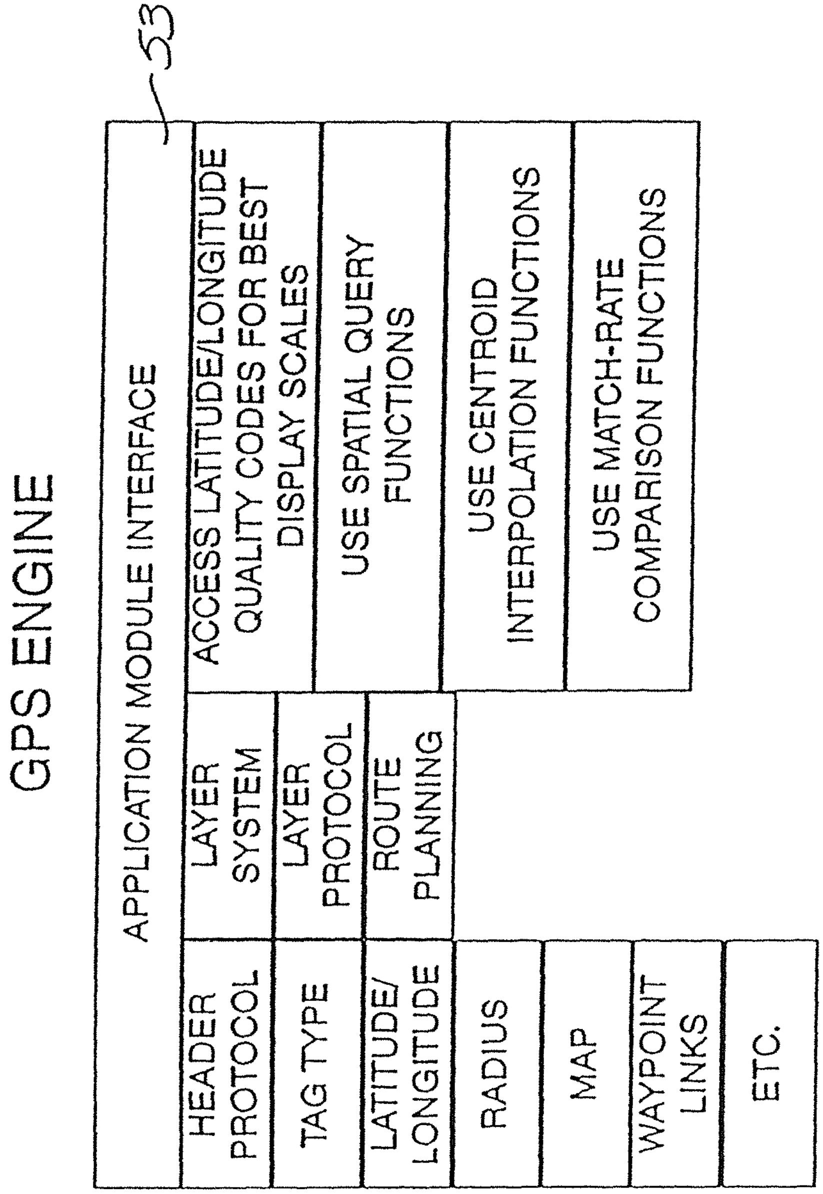
FIG. 28 illustrates a software module configuration of the GPS engine.

As illustrated in FIG. 26, the application module further includes programs to implement data formatting and communication protocols using header protocols 271, layer protocols 272, and data provider protocols 273. The application module also includes a tagging system interface program 274. The elements of the tagging system are illustrated in FIG. 27. The purpose of the tagging system is to provide a common universal data structure for requests and responding to requests. Various techniques common in the GEO coding industry, using U.S. Census bureau data and tiger files with certain modifications, can establish parameters for software suppliers to use latitude and longitude encoding as coordinate pairs, postal code encoding and street centering encoding, all for the benefit of accuracy in designating certain files as "tagged". The tagging system provides the ability to apply and strip header and layer information to and from data files.

Figure 4A:
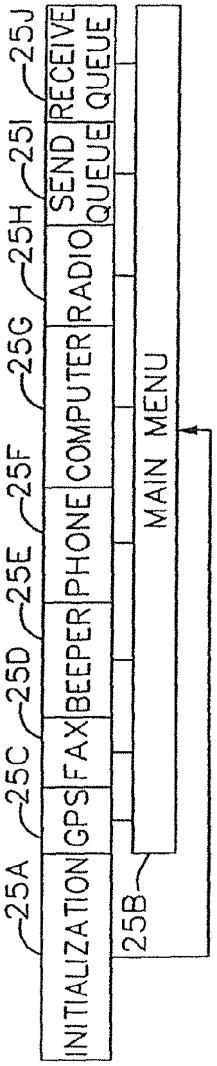
FIG. 4A shows a screen menu hierarchy of the PCD of FIG. 2.

FIG. 4A shows the top level page menu display hierarchy of the PCD. At initial power on the initialization page 25*a* (shown in FIG. 2) is displayed. The initialization page allows for the entry of a personal identification number and other data. Depressing the home button 27E (shown in FIG. 2) displays the Main Menu page 25*b*. A number of additional pages are available from the Main Menu page. These include the GPS 25*c*, Fax 25*d*, Beeper 25*e*, Phone 25*f*, Computer 25*g*, Radio 25*h*, Send Queue 25*i*, and Receive Queue 25*j* pages.

Figure 5A:
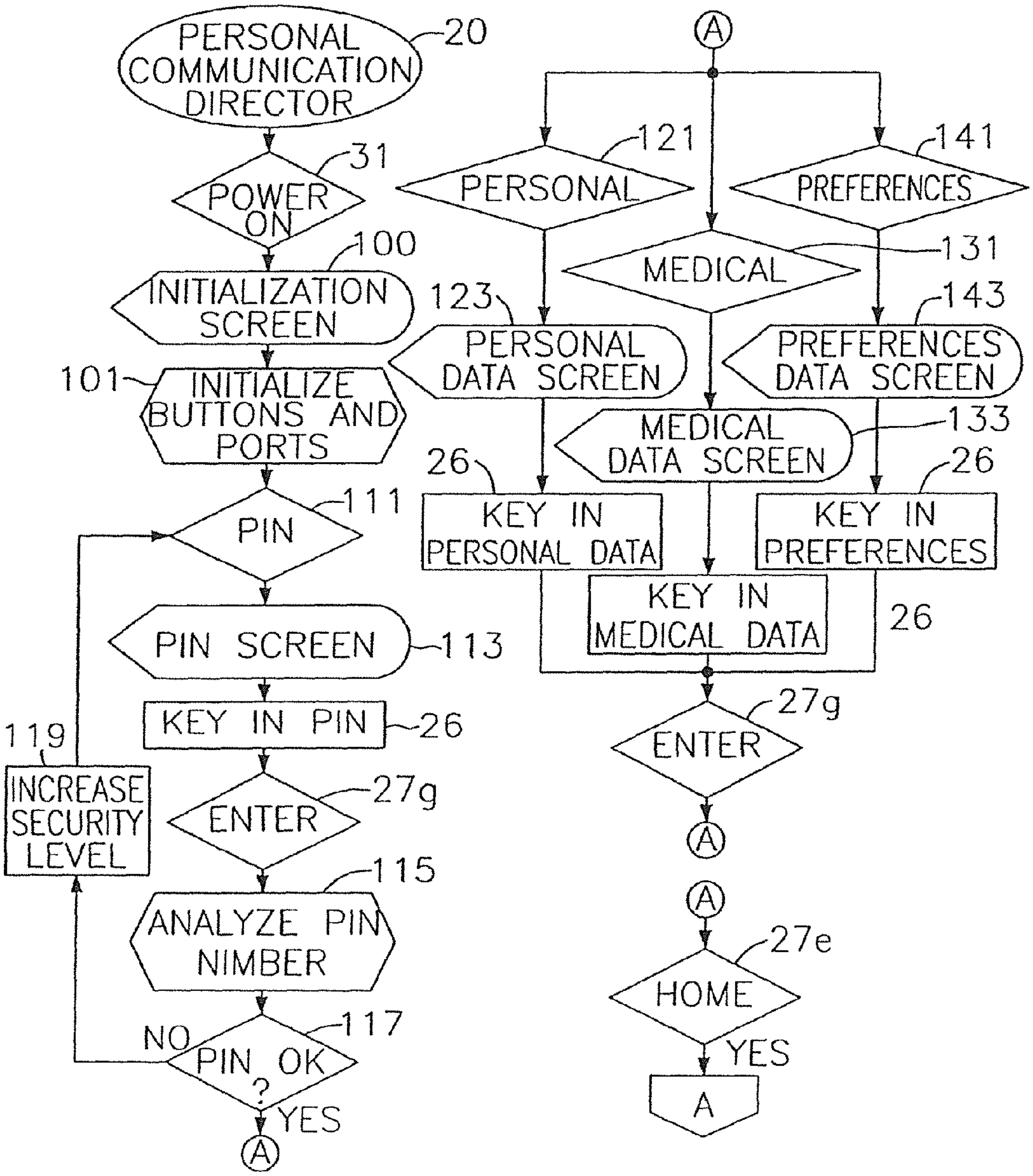
FIG. 5 A illustrates a flow chart depicting the program sequence for the entry of a personal identification number (PIN) and personal data into the PCD of FIG. 2
FIG. 5B illustrates a flow chart depicting the program sequence for the user to select a mode of operation using the PCD of FIG. 2.
FIG. 5C illustrates a flow chart depicting the program sequence for the user to control the GPS mode of the PCD of FIG. 2.
FIG. 5D illustrates a flow chart depicting the program sequence for the user to control the phone mode of the PCD of FIG. 2.
FIG. 5E illustrates a flow chart depicting the program sequence for the user to control the computer mode of the PCD of FIG. 2.
FIG. 5F illustrates a flow chart depicting the program sequence for the user to control the radio mode of the PCD of FIG. 2.

FIG. 5A lists a sequence for the operator of the PCD to answer certain questions, provide information for future access regarding handling of emergency events and handling of same by civil authorities or private individuals empowered to act on behalf of the operator. Access is denied or provided based upon user codes. The entry of a user code may allow for limited to full access of the data stored in the device and usage of same with different codes providing different levels of access and usage. Similar information and sequencing is provided by the application modules and operating system for medical and other information in the event of emergencies. In one embodiment of the preferences screen (not shown) information can be displayed in a specified manner, events recorded and equipment options listed. Specific usage of the device and furnished software would be recalled by each user having access and user codes to operate the PCD, each user having unique individual screens and setups based on that user's preferences. The initial setup of screen preferences and other user configuration details are well known in the art.

Selecting PIN 111 from the Main Menu page displays a screen 113 prompting the user to input a personal identification number. Using an alphanumeric key pad 26, the user inputs a personal identification number and presses ENTER 27*g*. The processor analyzes the entered personal identification number and determines if the number is valid 115 FIG. If the entered personal identification number is valid the processor enables PERSONAL 121, MEDICAL 131, PREFERENCES 141 touch points on the display screen. These touchpoints, and touchpoints later referred to, are selectable either by pressing the display screen at the touchpoint location or by selecting the underlying display item with the cursor. If the PCD already contains personal, medical and preference data, the HOME button 27*e* is enabled. If the personal identification number is not valid, the processor 21 will increase the device security level 119. This may include, but is not limited to, disabling the PCD operation for a specified time. Selecting PERSONAL 121, MEDICAL 131 or PREFERENCES 141 touchpoints displays the corresponding pages 123, 133, or 143. These pages request specific data, and allow the user to input data using alphanumeric key pad 26. Completion of data entry is indicated by pressing the ENTER button 27*g*.

In addition, the Initialization page 100 FIG. 2, as well as all other pages, displays the time and the date 103, touch points for QUE IN 550 and OUT 600 (described later in this document) and limited GPS information 107. The limited GPS information comprises of the user's location (latitude and longitude), an arrow pointing to north and an arrow indicating direction of device travel.

Figure 5B:
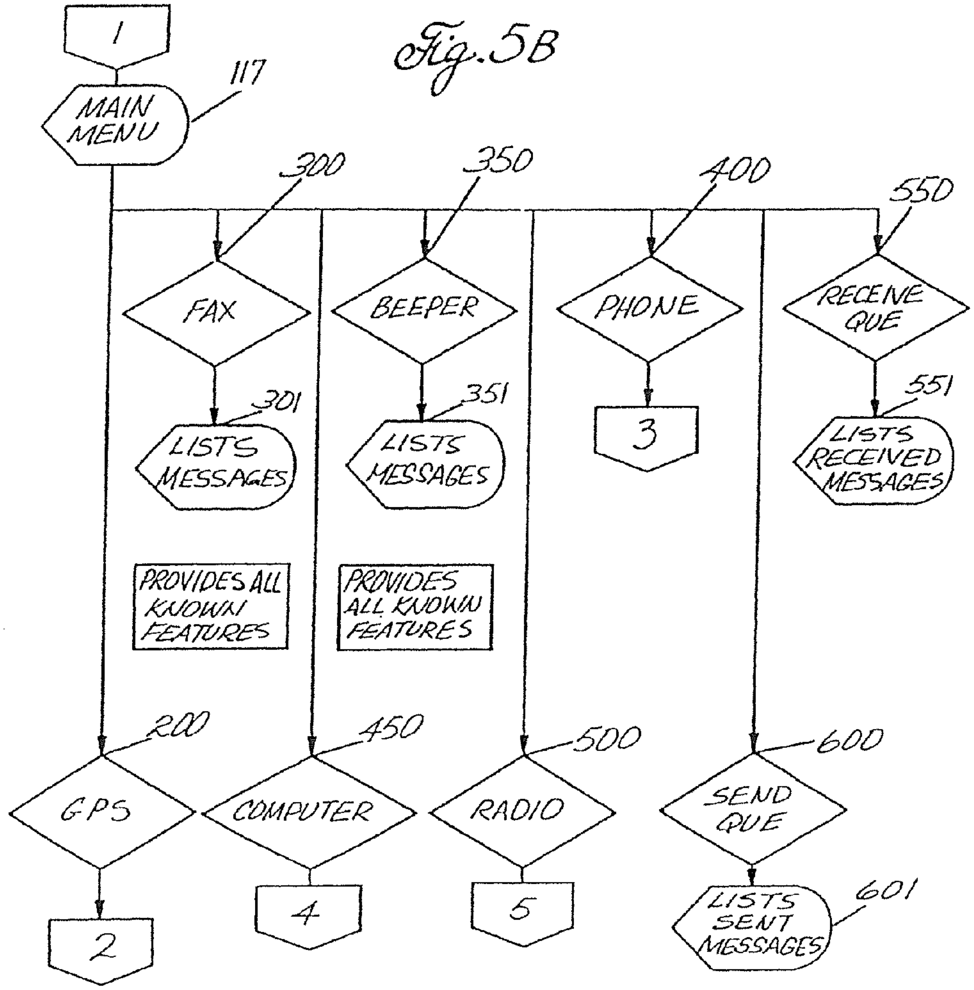
Figure 6:
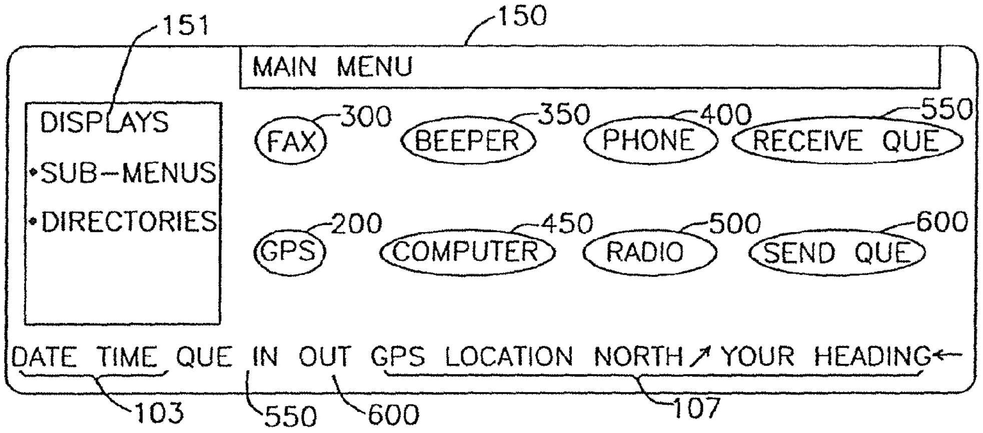
FIG. 6 illustrates the Main Menu page of the PCD of FIG. 2.

When enabled, pressing the HOME button 27*e* (FIG. 2) signals the processor to display the Main Menu page 150 FIG. 5B. As shown in FIG. 6, the Main Menu page allows the operator to use the touch screen to select the GPS 200, FAX 300, BEEPER 350, PHONE 400, COMPUTER 450, RADIO 500, RECEIVE QUE 550 and SEND QUE 600 touchpoints. The heading and directional information are displayed in real time and are dynamic. Pressing the FAX touchpoint causes the processor to display a Fax page (shown in FIG. 12) which lists received facsimile messages 301. The Fax page includes display interfaces appropriate for the sending and receiving of facsimile communications through the FAX Phone Modem port 29*g*, and such displays and functions are well known in the art. Pressing the BEEPER touchpoint causes the processor to display a Beeper page (shown in FIG. 13). The Beeper page displays received beeper messages 351 and allows for the deletion of such messages from the display and internal memory storage. Also, a sub-menu portion of the display 151 is reserved for sub-menus and directories.

Figure 5C:
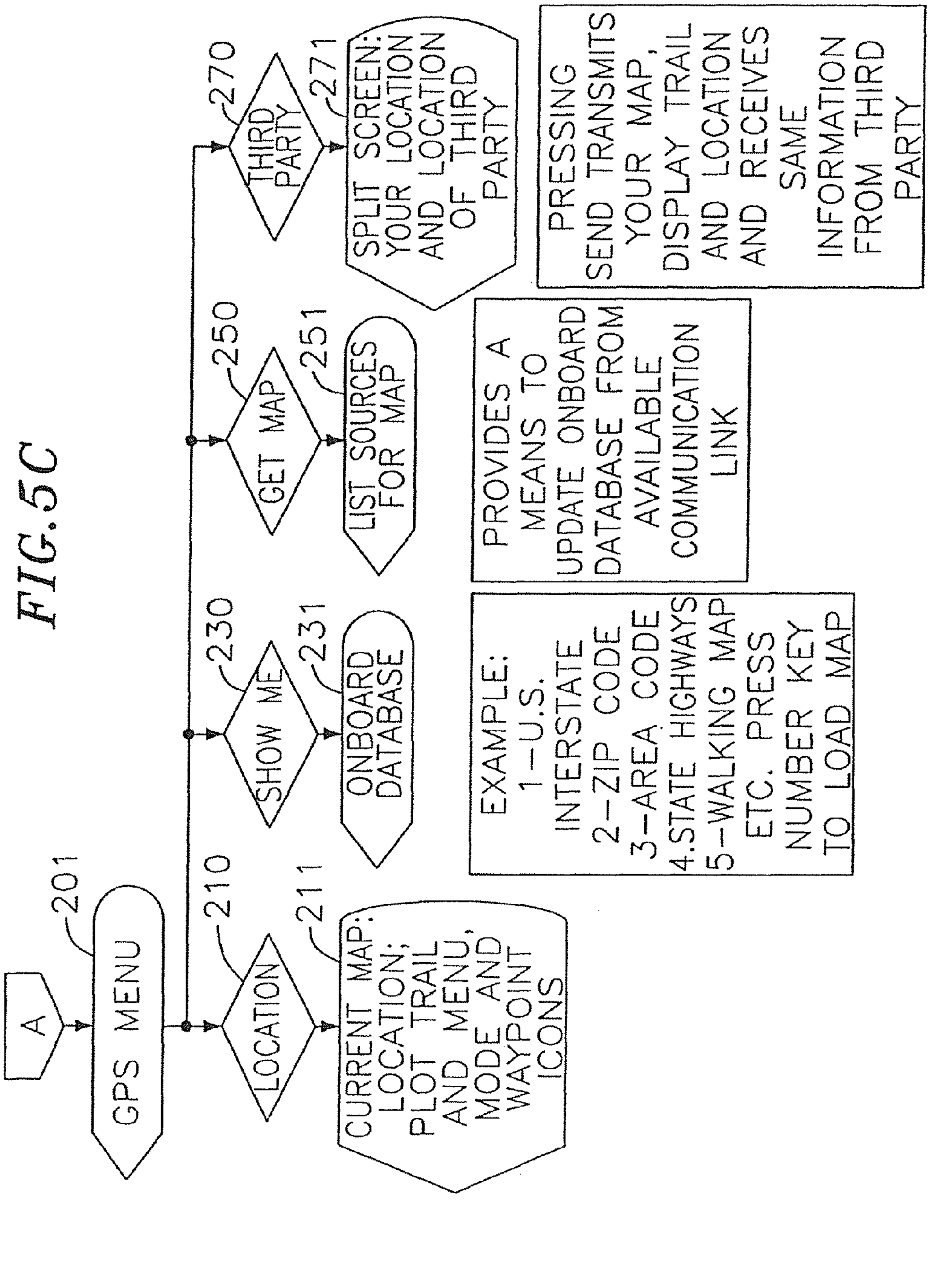
Figure 5D:
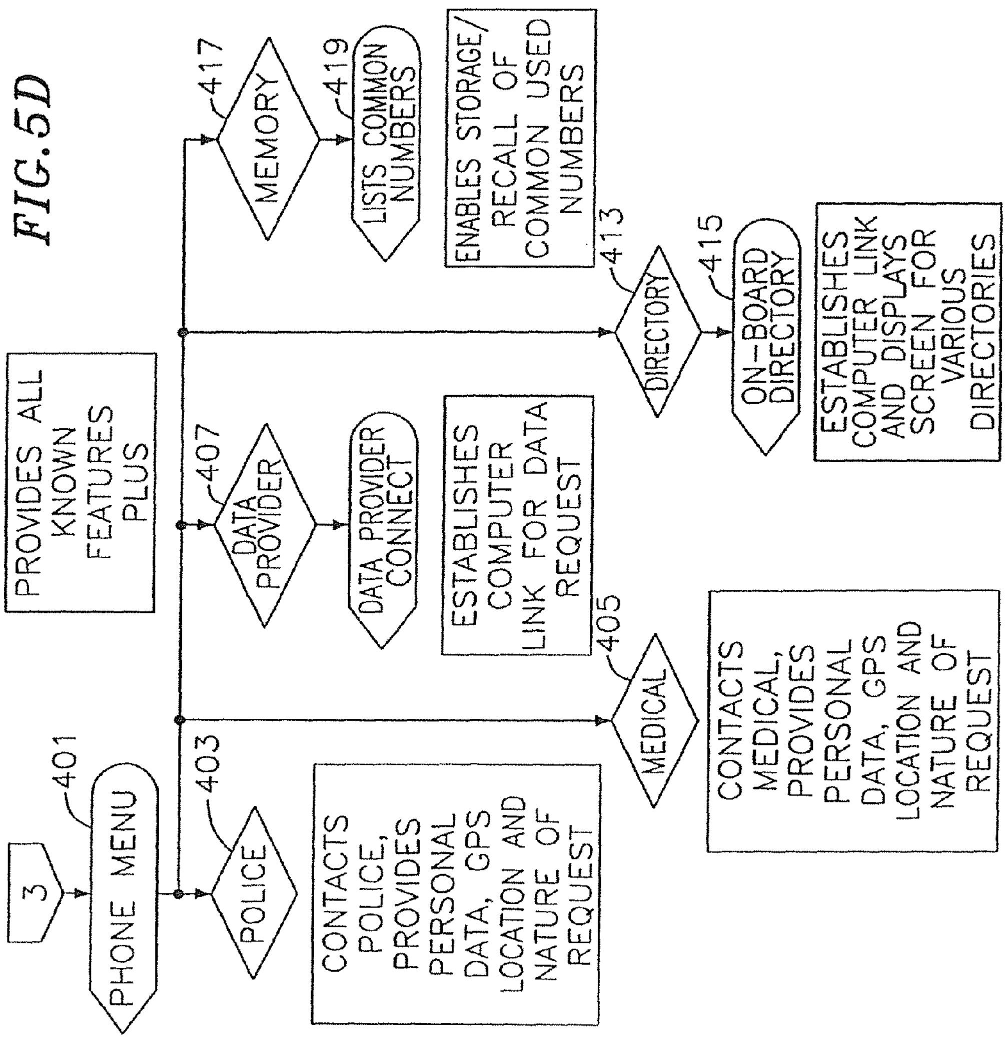
Figure 5E:
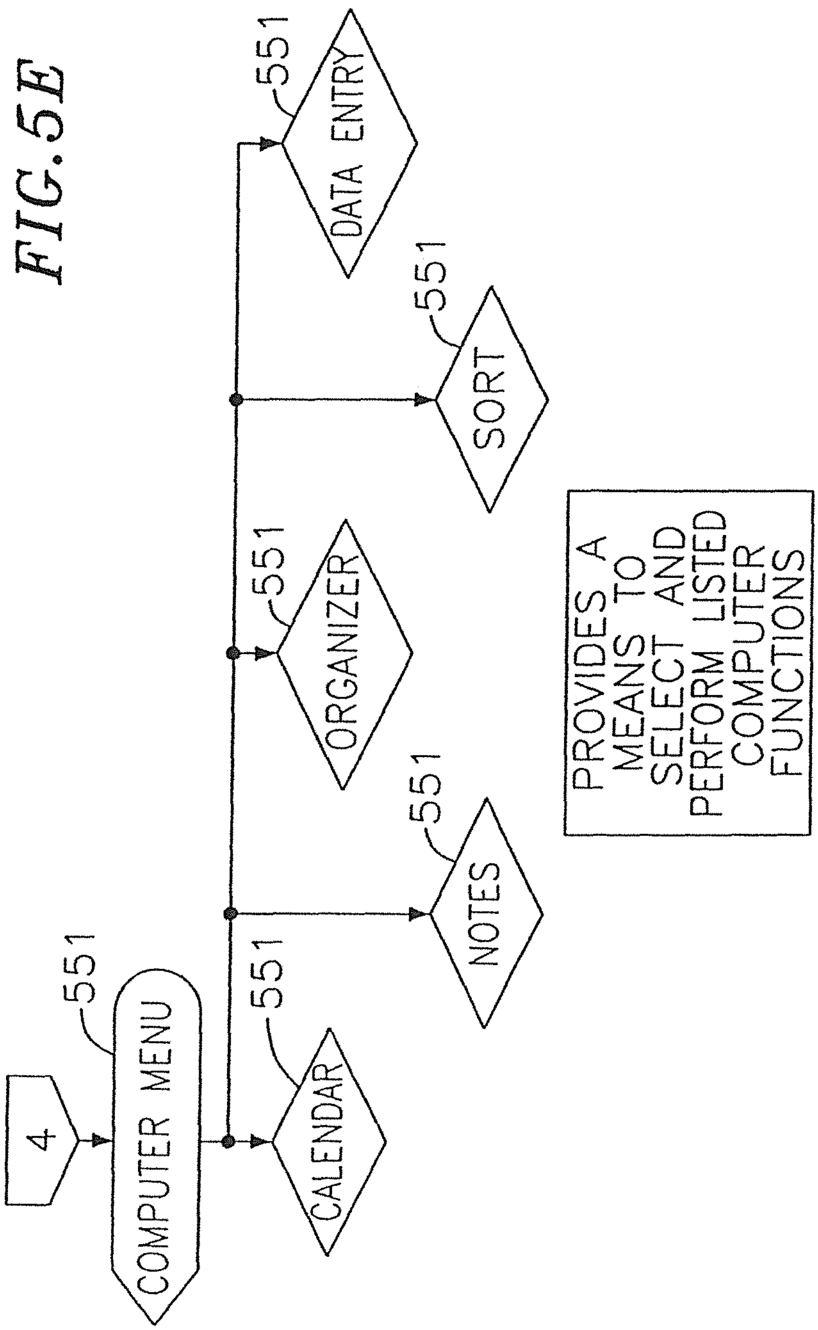
Figure 5F:
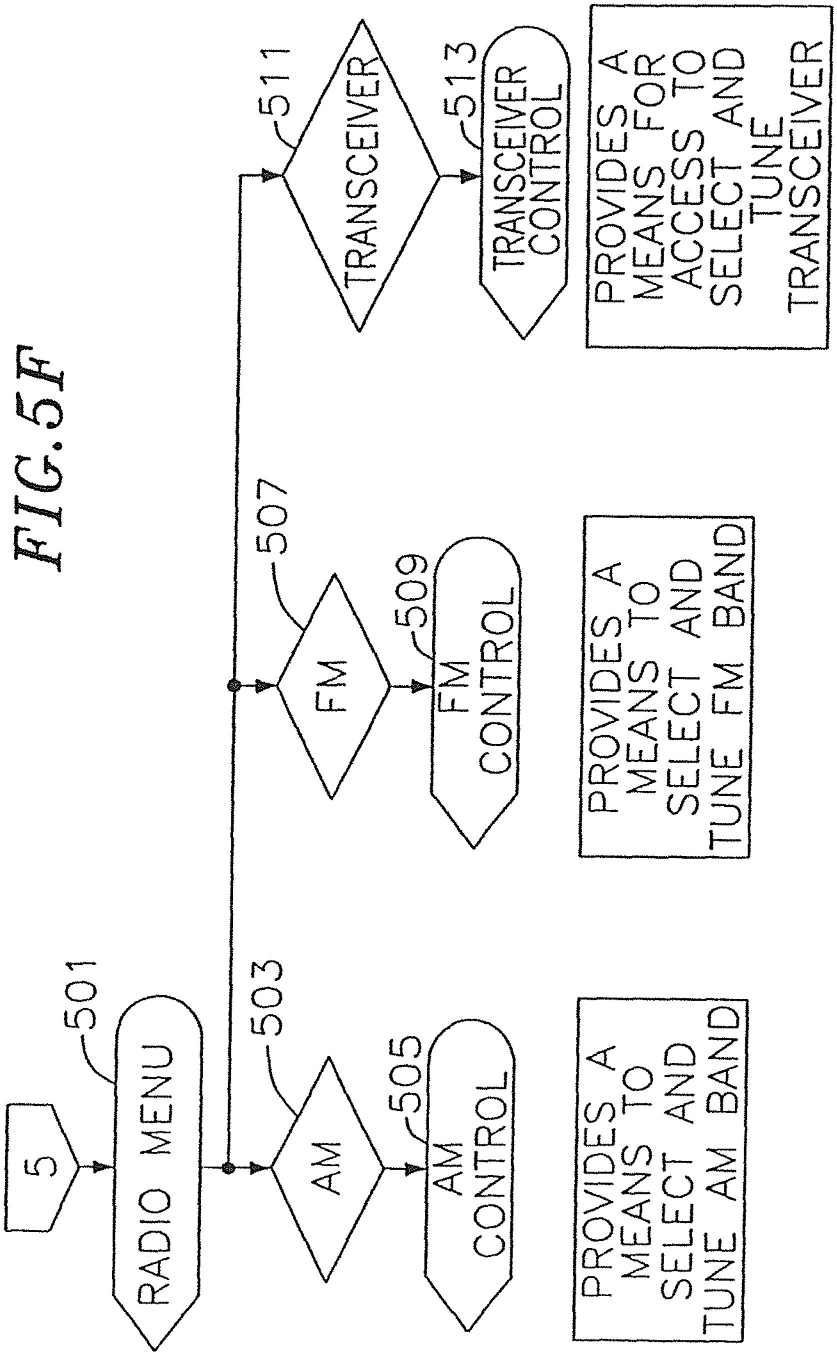
Figure 7:
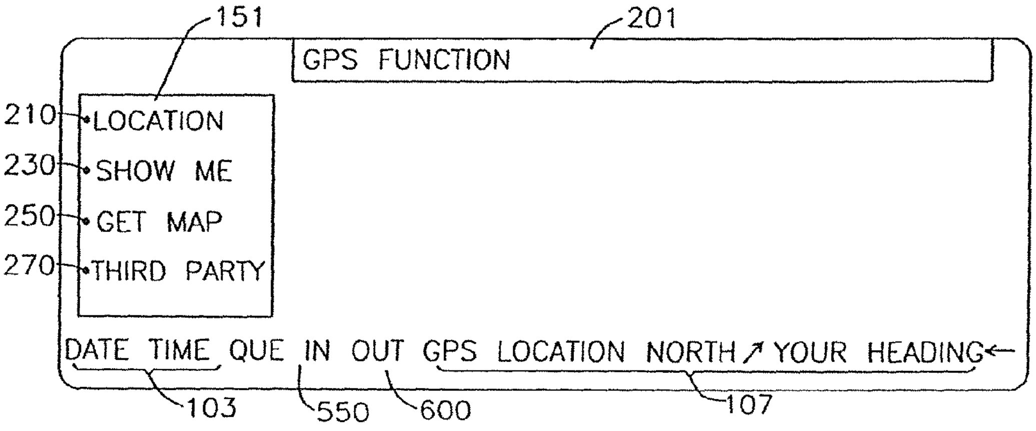
FIG. 7 illustrates the select GPS Function page of the PCD of FIG. 2.

Pressing GPS 200 causes the processor 21 to display a GPS Function page 201, which is illustrated in FIG. 7. The GPS page provides for selection of a GPS mode through touch points in the sub-menu portion of the display. The available modes are location 210, show me 230, get map 250 and third party 270 modes. The display returns to the GPS Function page when the PREVIOUS button 27*i* (shown in FIG. 2) is pressed. The display hierarchy for the GPS functions is illustrated in FIG. 5C. The Location, Show Me, Get Map, and Third Party pages descend from the GPS Menu page. The Location page comprises the current map, the location on the map of the device, and a plot of the trail of the device on the map. The sub-menu portion of the display provides for additional selection of still further pages. These pages include a Menu page, a Mode page, a Waypoint page, and a Preferences page.

Figure 8:
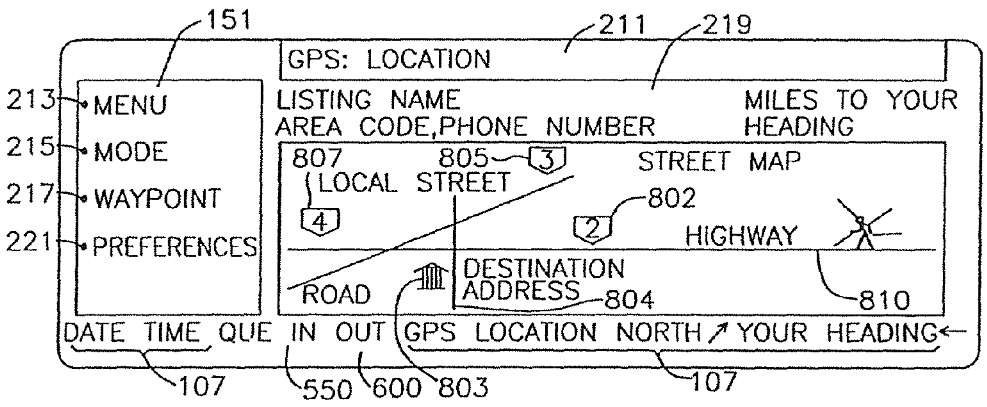
FIG. 8 illustrates the GPS: Location page of the PCD of FIG. 2.

The Location page is illustrated in FIG. 8. The Location page includes a GPS map 219 (latitude and longitude encoded coordinate pairs). The sample page shown is an encoded map showing the device position, plot trail and the encoded map location of the selected waypoint. The map displayed could be from on-board memory or sent by other third parties by way of communication links to the PCD. When map data files are encoded with location information, the location information can be referred to as waypoints. These tagged waypoints, with links to other data structures, can then be sent to users via an application to various communication systems. Closed-loop or proprietary GPS receivers can send/receive data to/from other third parties (Brand X, Brand Y) via their own proprietary format using an application system as a universal converter. The location information is dynamic and updated periodically by the PCD's communication system via link-up with GPS-based satellites. The Location page indicates the PCD position 801, indicated by a walking person, as being located on a highway 810. A waypoint 802 is along the highway en route to the desired destination address 803 located on a local street 804 which intersects the highway. A first point of interest 807 is also displayed as being along the highway, as is a second point of interest 805 along a second local road intersecting the highway. The limited GPS information, providing location, heading and north, is also displayed. The illustrated Location page display shows only one possible combination of a map layout. Other display sequences such as North up, course up, user at top of screen, user in middle, and other display sequences are possible. The dynamic nature of the PCD allows the PCD to display GPS encoded maps as the PCD progresses dynamically with relation to the maps.

Using interpolation techniques, performing spatial query analysis, and establishing layers for best display scale for any given map record allows the device to provide the user extended capability not possessed by traditional GPS devices. Applying various protocols and interpolation techniques allow files to be arranged geographically by distance from a designated point (usually the requesters latitude and longitude as the starting point, but other locations may also be used). The maps are also arranged in layers, menus, limited, listed, showed, displayed, and sorted.

The Location mode provides typical GPS system functions. The touch points MENU 213, MODE 215 and WAYPOINT 217 and PREFERENCES 221 provide access to the Menu, Mode, Waypoint, and Preferences pages. These pages, along with various buttons on the alphanumeric key pad 26 FIGS. 2 and 4 and special function buttons 27, are used to configure the display to the user's preference. The preferences page 221 enables selection of such features as voice, maps, scroll, offscreen maps away from cursor and other features. The listing name 219 portion of the Location page displays information pertaining to a waypoint selected through the use of the cursor.

Figure 9:
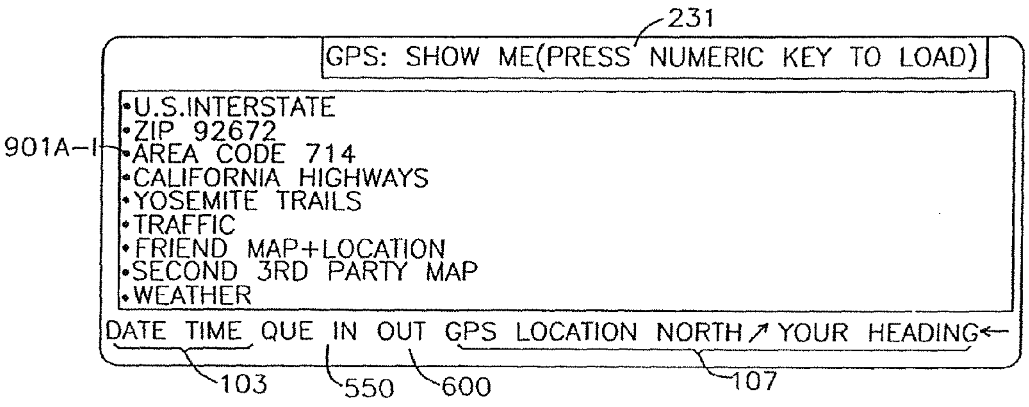
FIG. 9 illustrates the GPS: Show Me page of the PCD of FIG. 2.

FIG. 9 illustrates the Show Me page accessed from the GPS page. The Show Me page shows a list of available maps 901*a-i* stored on-board, which includes maps retrieved from the receive queue area of the PCD memory. The user can load a map into the location or third party pages by pressing the corresponding number key on alphanumeric key pad 26 (shown in FIG. 2) or by scrolling through the list to highlight the appropriate map and then pressing ENTER button 27*g*. Maps may also be removed from on-board storage using the DELETE button 27*h*.

Figure 10:
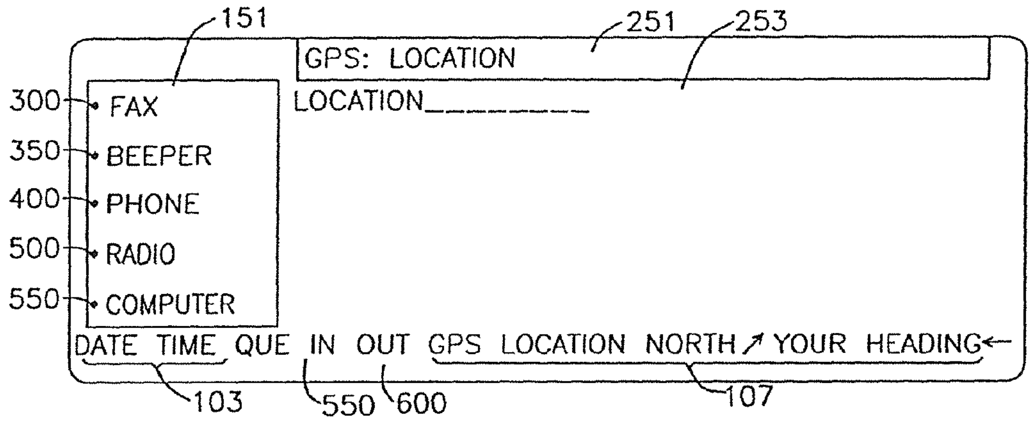
FIG. 10 illustrates the GPS: Get Map page of the PCD of FIG. 2.

FIG. 10 illustrates the Get Map page accessed from the GPS Menu page. The user of the PCD can request the map by location from PCD memory or an external source. The user may enter a desired map location. If a map location is entered, the PCD will only search PCD memory for a map for the entered location. Maps from an external source are downloaded via any of the communication links such as the FAX, BEEPER, PHONE or RADIO touchpoints provided in the sub-menu portion of the display 151. Depending on the user's requirements, several maps could exist showing similar map areas with different layers for viewing. By way of example, airport maps with air space requirements, coastal waterway, maps, and interstate maps, and even hand drawn maps scanned into a computer system all show different resources within a given geographic area. These maps, when presented on the PCD, could over-saturate the display map detail for any given map area. Therefore, it is preferred that the actual map displayed be selectable. Maps are retrieved by pressing QUE IN 550, scrolling to highlight the desired map, and pressing ENTER 27*g* FIG. 2.

Figure 11:
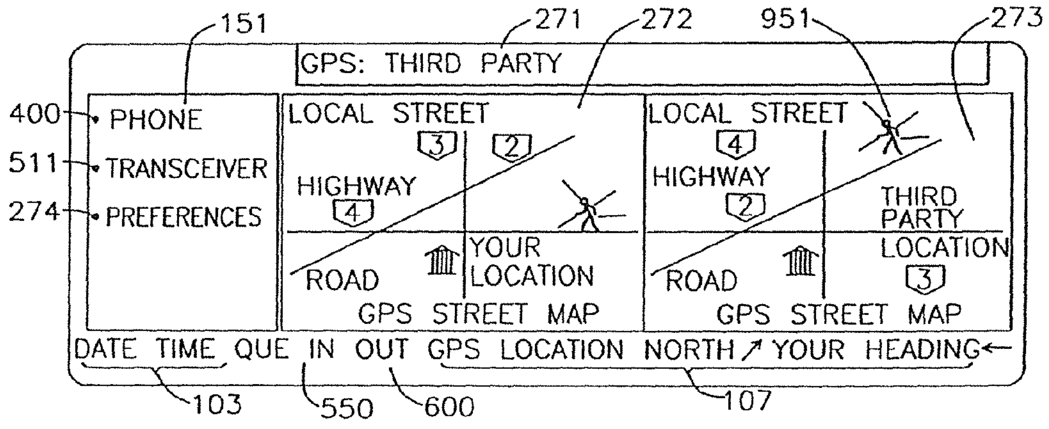
FIG. 11 illustrates the GPS: Third Party page of the PCD of FIG. 2.

FIG. 11 illustrates the Third Party page accessed from the GPS menu page. The Third Party page provides an interface to communications with a third party through touch points in the sub-menu display 151. In the display shown, a user can receive a third party's data and GPS encoded map for viewing on the device or save it for future usage. The user can also dynamically track the third party by periodically having the third party send updates via normal communication links. The third party location can be displayed on maps dynamically sent by map publishers, maps already on-board (furnished at some earlier date), or on maps sent by the third party. The PCD plots and interpolates the GPS data sent by the third party and places an icon 951 (GPS latitude and latitude coordinate pair) on the displayed map using spatial query analysis techniques performed by an application module. The information received from the third party may be other than maps or GPS encoded information, but may be information of any type. The data is received from the third party using phone 400 and radio communication links 500. A PREFERENCES touch point 274 enables entry of items such as phone numbers for automatic call back and time interval for automatic transmission of information. If the radio, a satellite phone, or other frequency based communications link is utilized, the PREFERENCES touch point allows entry of frequencies for use for automatic transmission of information. A split screen displays the user's location on a map on the left side of display 272 and, after contact with a third party via a communication link, the third party's map and location on the right side of display 273. If the third party's location is sufficiently close to the user's location, or if the user's displayed map covers a sufficiently large area, both the user's and third party's location can be shown on the same map without resort to a split screen display.

Figure 12:
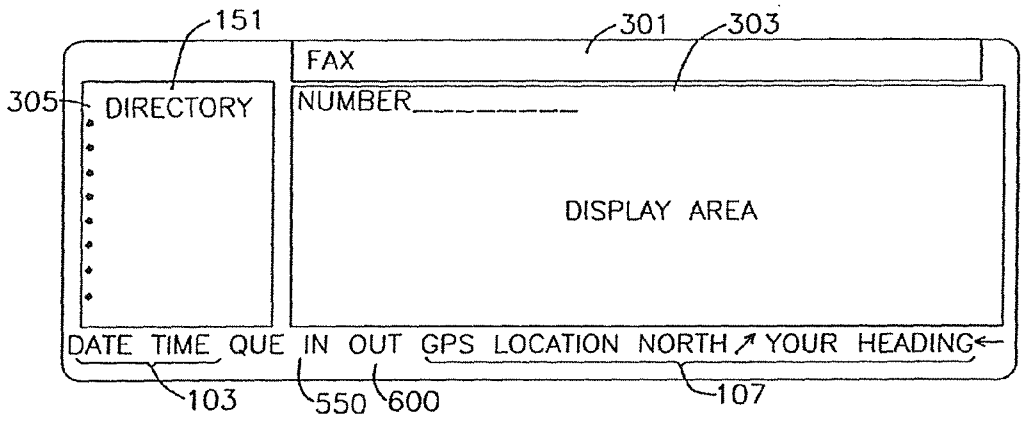
FIG. 12 illustrates the FAX page of the PCD of FIG. 2.
Figure 13:
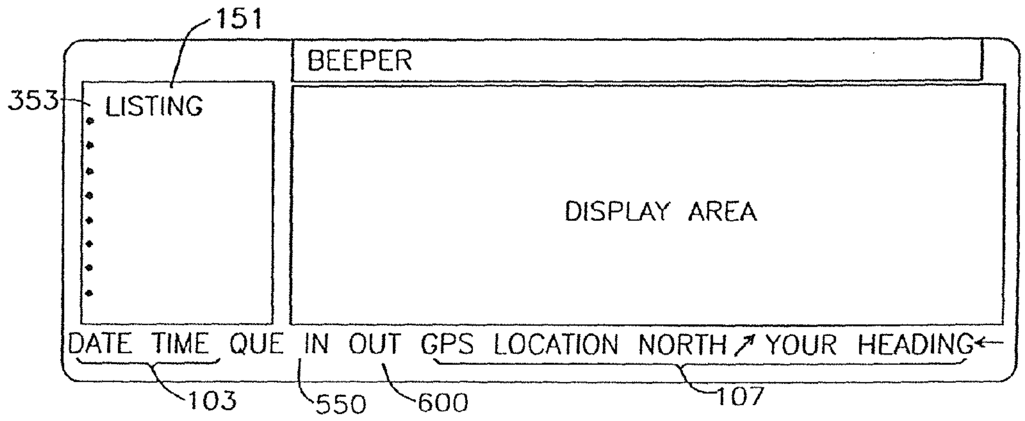
FIG. 13 illustrates the Beeper page of the PCD of FIG. 2.

The Fax page is accessed by pressing the FAX touchpoint on the Main Menu page. FIG. 12 illustrates the Fax page. The sub-menu portion of the display is available for listing previously stored phone numbers. These phone numbers are selectable as a facsimile destination. In addition, the user can directly enter the phone number to indicate the facsimile destination. As with other pages, the PCD continues to dynamically display the limited GPS information of location, north and heading. The PCD facsimile function is performed by application software executed by the processor. Multiple fax locations, time set, send after certain time, and other traditional functions of fax machines and their implementation are well known in the art. The Fax page provides for display of a message (not shown) entered via the alphanumeric key pad 26 (shown in FIG. 2) or through selection of messages stored in the send queue area of device memory. Messages stored in the queue area of PCD memory can be selected by scrolling through a directory 305 of all fax messages stored. To view a stored message the user uses the SCROLL button 27*a* (shown in FIG. 2) to highlight an entry, and then press ENTER button 27*g*. Pressing the SEND button 27*b* transmits the selected or entered facsimile. The user may also view received faxes using this mode by pressing QUE IN 550 FIG. 12, using the SCROLL button 27*a* to highlight the desired message, and pressing the ENTER button 27*g*.

The Beeper page is accessed from the Main Menu page. Pressing the BEEPER touch point on the Main Menu page causes the processor to display the Beeper page. The device contains capabilities consistent with common practices of beepers, also known as pagers, such as sending and receiving messages. These functions and their implementation are well known in the art. The PCD is also satellite communications capable. Beeper messages can be received by the PCD without interference to the other device capabilities. Therefore, the user could continue using the telephone or other features seemingly uninterrupted by the reception of digital beeper messages and display of those messages. The Beeper page provides a list of beeper messages (not shown) stored in the receive queue area. Messages stored in the receive queue can be selected by scrolling through listing 353 FIG. 13 of all beeper messages stored. To view a stored message, the user uses the SCROLL button to highlight a desired message and presses the ENTER button 27*g*. Messages are deleted when the DELETE button is pressed with at least one message selected.

Figure 14:
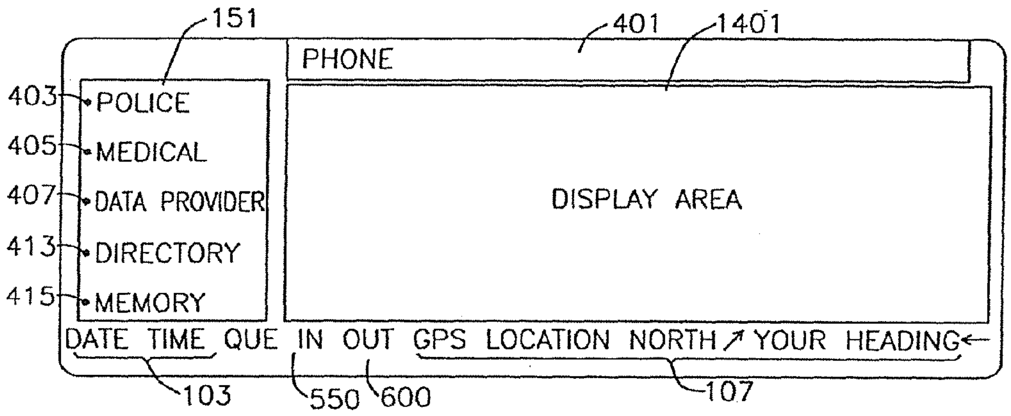
FIG. 14 illustrates the Phone page of the PCD of FIG. 2.
Figure 15:
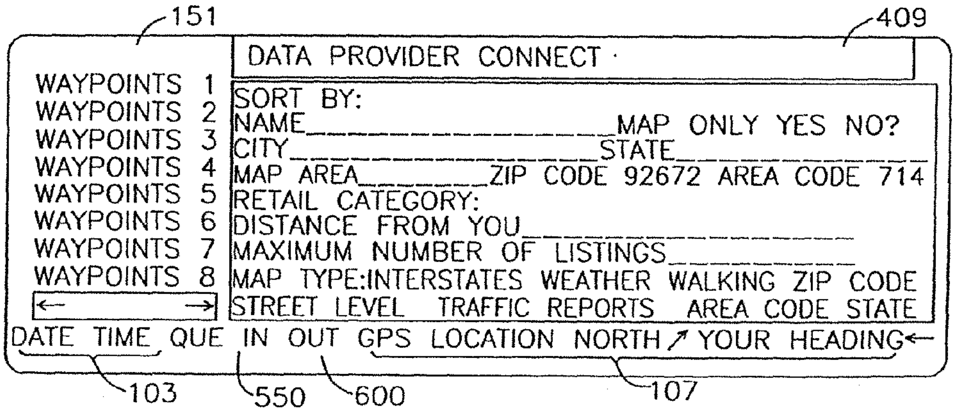
FIG. 15 illustrates an Information Request page of the PCD of FIG. 2.

The Phone page is illustrated in FIG. 14. The Phone page is accessed from the Main Menu page. Pressing the PHONE touchpoint on the Main Menu page causes the processor to display the Phone page. The Phone page is also accessed by pressing the PHONE touchpoint on the Get Map and Third Party pages. As with the other pages, the limited GPS data is continuously displayed showing PCD location, heading, and north. The PCD can access several areas of the display even while the PCD is being used as a telephone. Information provided in the display area 1401 will vary depending upon the page from which the phone page was accessed. The Phone page provides for selection of a function through touch points displayed in the sub-menu portion of the display. The selectable touchpoints are: POLICE 403, MEDICAL 405, DATA PROVIDER 407, DIRECTORY 413, and MEMORY 415.

When the POLICE touchpoint is pressed, the PCD places a call to emergency 911. The 911 telephone number is the default, another number could instead have been entered for any particular user through the preferences selection. Once the telephone call is answered, the PCD provides the information entered using the Preferences function and the device location. The user may also establish voice and data communications through the microphone 34 and speaker 33 (shown in FIG. 3).

The PCD performs equivalent functions when the MEDICAL touchpoint is pressed. As different phone numbers and information can be entered in the selection of user preferences, however, different phone numbers may be used and different information may be transmitted.

When the DATA PROVIDER touchpoint is pressed, the processor displays the Data Provider Connect page. The Data Provider Connect page provides a means to specify the type and amount of data to be downloaded from a specified data provider. The Data Provider Connect page has numerous data fields which are selected by use of the cursor. Once a field is selected, the user may enter data in that field using the alphanumeric keys. The data fields include data for name, city, state, map area, zip code, telephone area code, retail category, distance from device location, and maximum number of listings to be provided by the data supplier. Whether a map only is requested and what particular types of maps, such as interstate maps, walking area maps, zip code maps, street maps, area code maps, or state maps, are requested are also provided as options. Touch points for weather information and traffic reports are also provided. Once the appropriate data fields and/or type of data required is input or selected, pressing the send key transmits the data request to the data provider. Details regarding the method of transmission of the responsive data is automatically sent by the data provider to the data provider along with the data request.

The primary data providers may include the public telephone company networks but may also include other entities. The data providers maintain data, including maps, telephone yellow page entries, and other information such as traffic and weather reports. This information is maintained in a timely manner and is accessible through the use of data base methods well known in those in the art. Upon receiving a request for data, the data provider determines the nature of the data request, searches the appropriate data base or data bases, and transmits the requested information to the requesting device in the manner specified by the requesting device. The user, after the PCD receives the data as requested, disconnects, goes offline to review the information, deleting some, saving others, and storing other encoded information on the PCD. The user can now further edit the device's entire data base and decide a sequence for navigating to the locations listed in the various menus as waypoints. Thus users of the PCD can decide to navigate using the GPS features of the PCD and select certain waypoints and the order in which to proceed. By way of example, but not limited to same, users could select gas stations, banks, restaurants, shopping centers in unfamiliar areas, navigate today from one point of beginning and tomorrow continue navigating from another point of beginning, being assured that the device will always know how to get to various locations. Should the user require further locations to visit, the PCD is capable of obtaining new navigational data and adding to the already active route plan without having to completely start over.

Pressing the DIRECTORY touchpoint 413 displays an alphabetical listing (not shown) of phone numbers stored on-board. The user may scroll through the listing and select a desired phone number. Pressing MEMORY 415, displays an alphabetical listing (not shown) of frequently used phone numbers. The user may scroll through the listing and select a desired number. Pressing the SEND button causes the device to dial the selected phone number.

Figure 16:
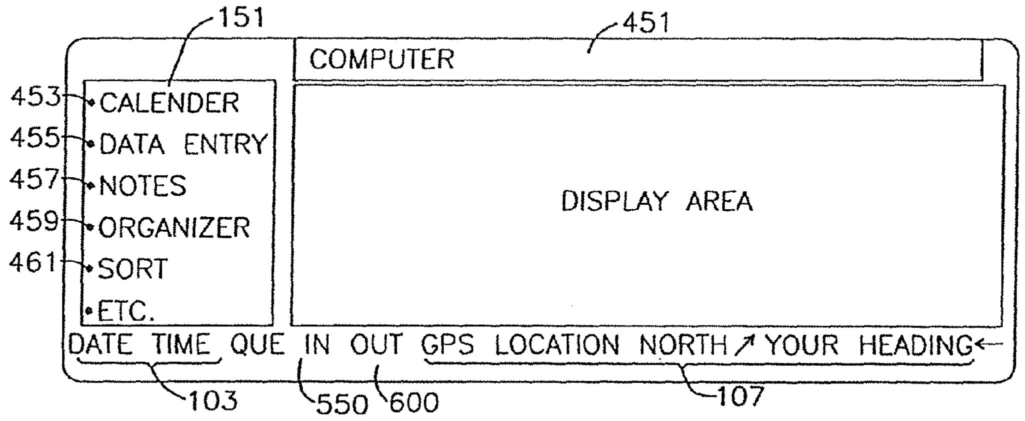
FIG. 16 illustrates the Computer page of the PCD of FIG. 2.

FIG. 16 illustrates the Computer page. The Computer page is accessed by pressing the COMPUTER touchpoint 450 (shown in FIG. 6) on the Main Menu page. The Computer page allows the user to operate the device as a standard personal computer utilizing application programs of the type normally present on personal computers. As examples, the display of FIG. 16 provides for touchpoints in the sub-menu portion of the display for calendar date entry, notes, and organizer application programs. As with the other pages, the limited GPS information is also displayed.

Figure 17:
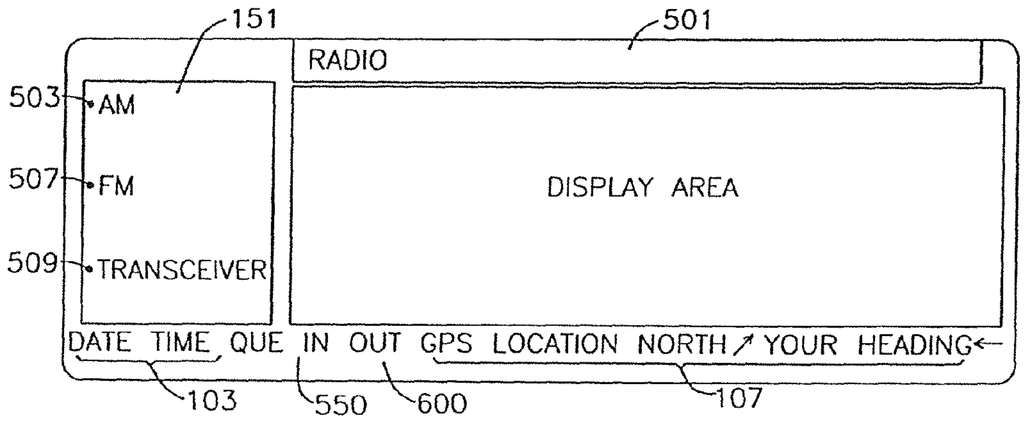
FIG. 17 illustrates the Radio page of the PCD of FIG. 2.
Figure 18:
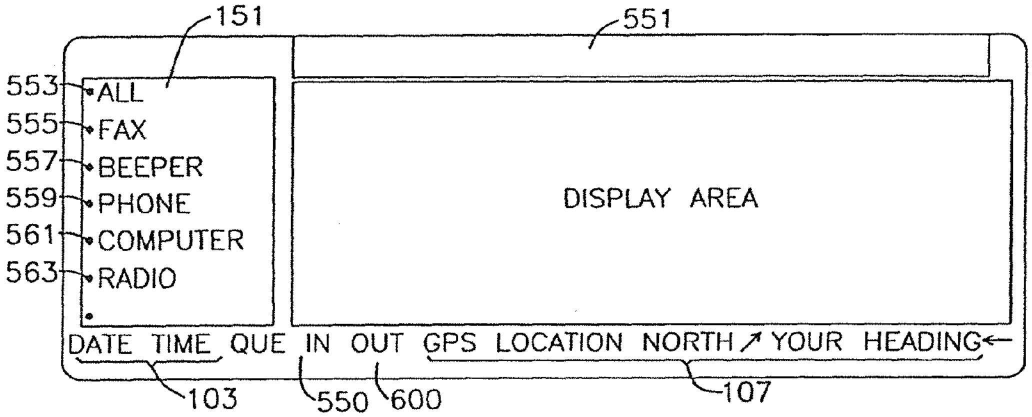
FIG. 18 illustrates the Receive Queue page of the PCD of FIG. 2.
Figure 19:
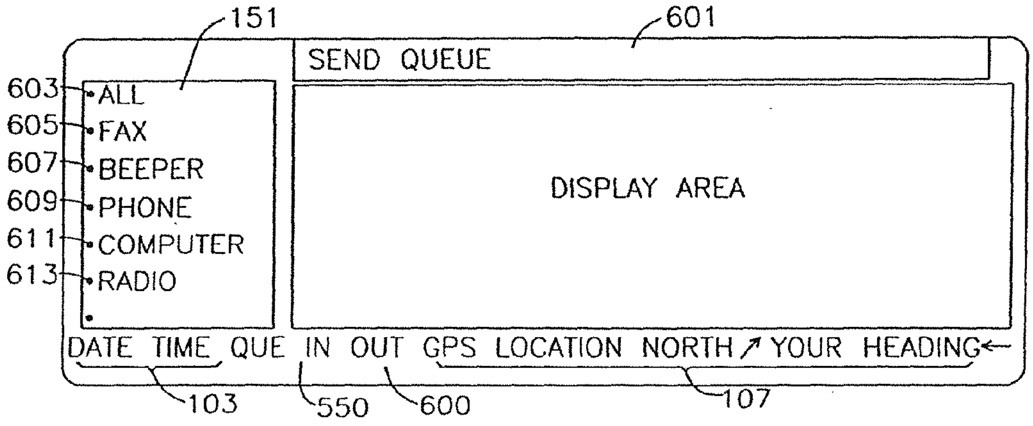
FIG. 19 illustrates the Send Queue page of the PCD of FIG. 2.

FIG. 17 illustrates the Radio page. The Radio page is accessed by pressing the RADIO touchpoint 500 on the Main Menu page. The radio mode provides the user with an interface for selecting the type of radio signal through touch points displayed in the sub-menu 151 area. The selectable types are: AM 503, FM 507 and TRANSCEIVER 511. Selecting any type will display a page (not shown) requesting frequency, volume, and other parameters relating to radio transmission and reception. The AM and FM are standard receivers. The device can thereby tune and listen to broadcasts that provide data links and receive data files using legal AM or FM radio bands (or any other radio band legal to access and provide radio station information). The device therefore allows users to communicate information amongst themselves without having to rely on telephone technology. This is especially valuable when telephone technology is not available.

The Receive Queue page displays stored received messages. The received messages may be displayed by reception type through selection of the transmission line type listed in the sub-menu portion of the display, the selectable types, through touch points displayed in the sub-menu 151 area, are: ALL 553, FAX 555, BEEPER 557, PHONE 559, COMPUTER 561 and RADIO 563. Selecting a type, will sort (by specified type) and display (by date and time) all messages received. By way of example, the radio queue contains GPS-encoded voice mail or digital files (containing information to various sites) provided by private third-party sources. The phone system queue contains previous calls with digital messages linked to web pages containing voice and video data. The computer which may be queued contains personal letters, calendars, notes and the like from more traditional sources or user created tagged files for storage. The fax queue contains traditional faxes which may illustrate maps with waypoints. The beeper mode queue contains received beeper messages (digital and voice).

The Send Queue page is accessed by pressing the SEND QUE touchpoint on the Main Menu page. The Send Queue page includes similar functions as the receive queue, except the Send Queue is a staging area for sending messages. The Send Queue page displays sent or to-be-sent data and an interface for selecting the specific type of queue. The selectable types, through touch points displayed in the sub-menu portion of the display 151, are: ALL 603, FAX 605, BEEPER 607, PHONE 609, COMPUTER 611 and RADIO 613. Selecting a type, will sort (by specified type) and display (by date and time) all messages sent or waiting to be sent.

Figure 23A:
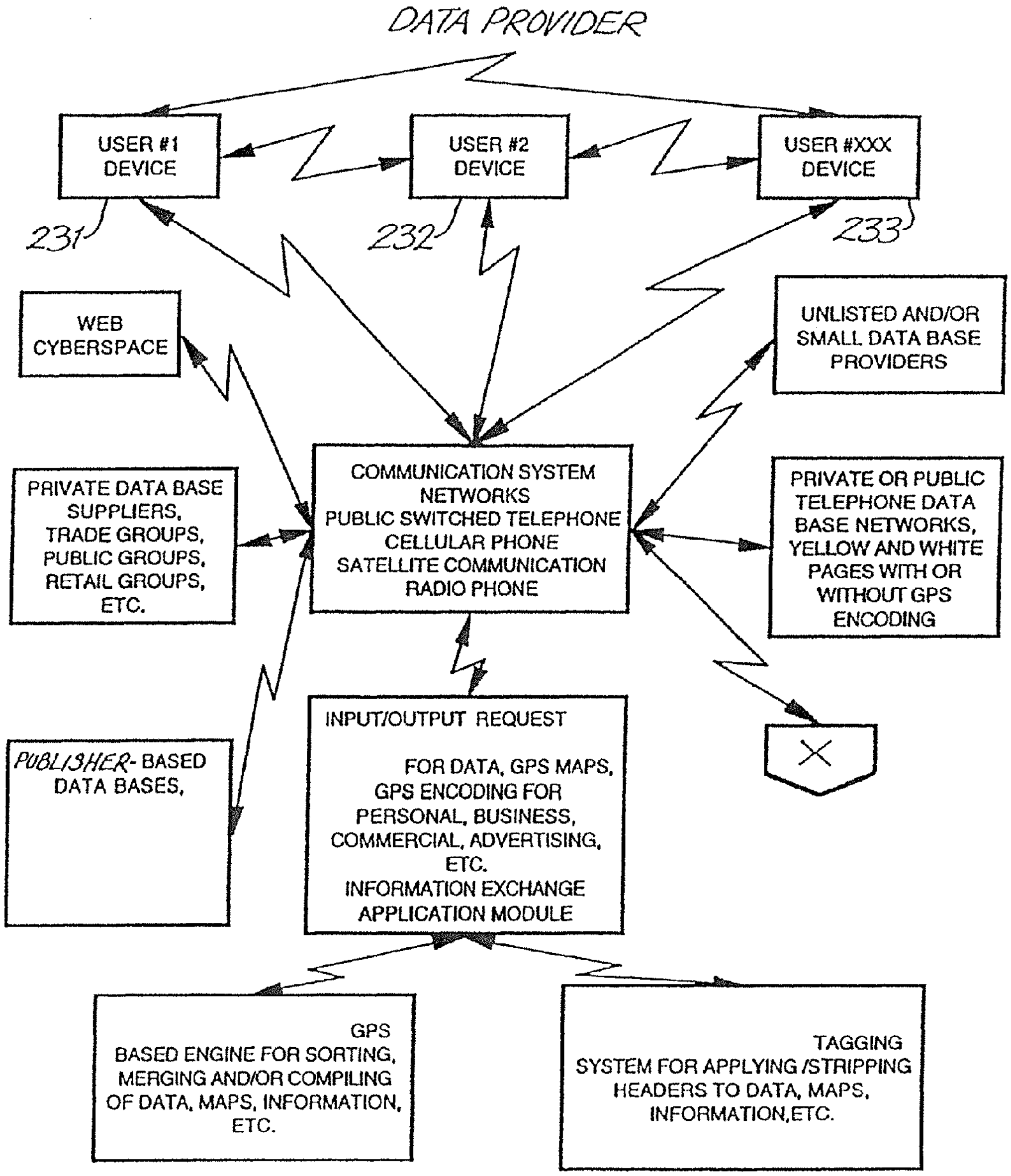
FIG. 23A illustrates an exemplary data provider.

FIGS. 23 A and B are a system block diagram including a block diagram of a data provider. A plurality of PCDs 231, 232, 233 communicate with each other using the aforementioned communication means. The PCDs also communicate with various data base information suppliers including private data base information suppliers, publisher data base information suppliers, telephone service data base information suppliers, and a data base provider. The data base provider receives digital requests for map information or other data regarding a geographic area. The data provider collects map data and other data and tags the other data to the map data and maintains the map and location tagged data in a data base. Human intervention is not required in responding to data requests.

Figure 23B:
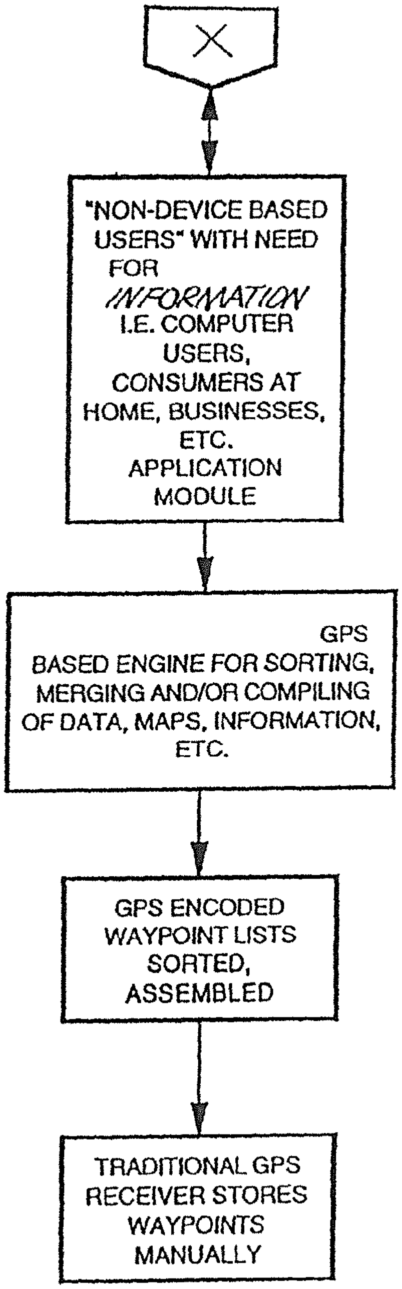
FIG. 23B illustrates an exemplary configuration of a non-PCD computer utilizing a modified application module.

As shown in FIG. 23B, the application module of the device is ported to a computer system not GPS capable, or merely not portable so as to have no need for a GPS receiver. The application module allows non-PCD based computer users to provide data to the data provider in the correct format, as well as receive data from devices or the data provider. This allows the non-device base computer user to track the location of devices and to collect information to be manually entered into a traditional GPS capable device as an aid in future trip planning.

Figure 21:
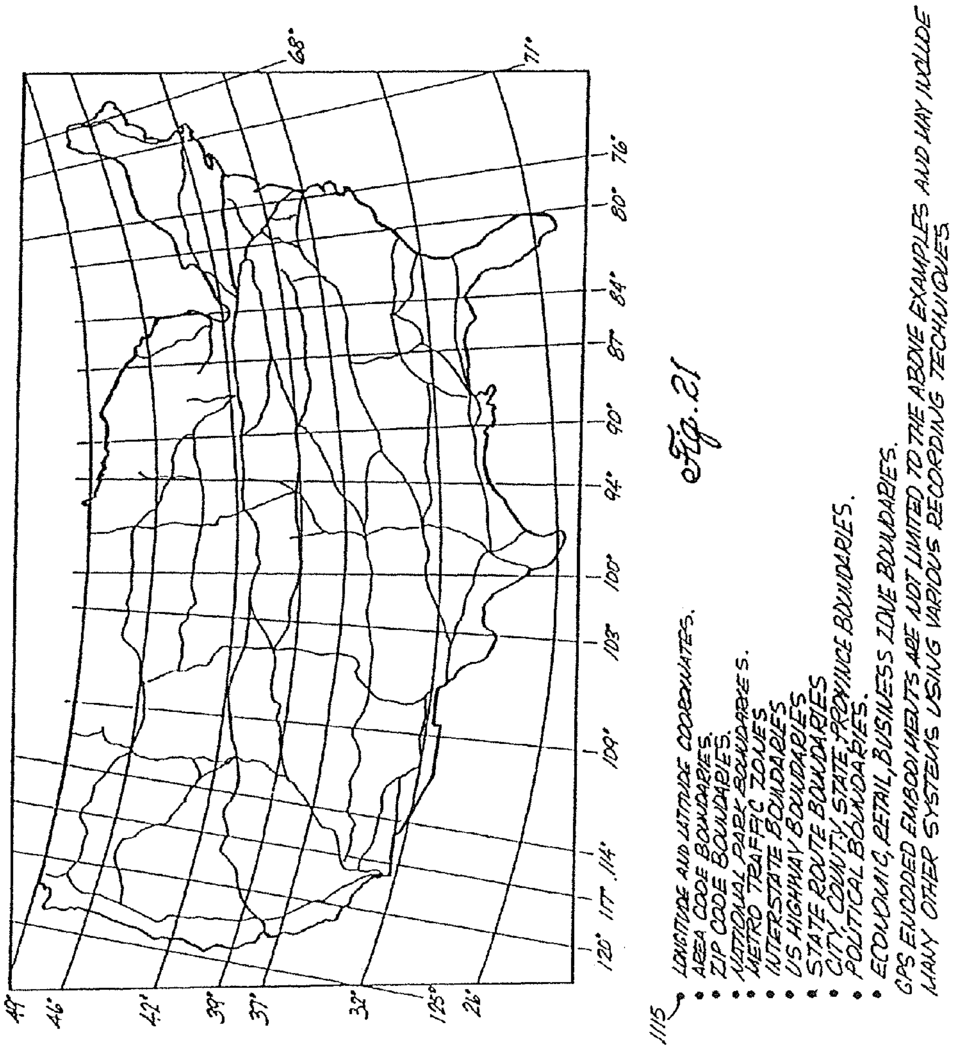
FIG. 21 illustrates a typical GPS encoded map downloaded from a data provider.

FIG. 20 illustrates a list of GPS encoded data for a restaurant listing of restaurants in a requested area. This list may have been furnished by third parties or a data provider. The PCD has stored this information in digital format and is displayed on a GEO coded map, GIFF map or any other map the PCD stored in memory or receives from a third party or data provider. The information can be arranged by the PCD using criteria enabling the user unlimited access to the data. If the user chooses to navigate to these locations singularly or as a group, the GPS engine performs these functions, allowing a user of the device to accurately travel to the desired restaurant. As shown in FIG. 21, the PCD can use any scale of map or combinations and other types of maps as shown. The user of the PCD selects certain maps for storage and recalls same when needed for navigation. By way of example, the user's device could have a local Los Angeles street map, an interstate map (as shown in FIG. 21), and a New York city map in device memory. The user could navigate to the airport using the GPS functions and stored Los Angeles map, fly to New Jersey, rent a car and navigate to New York using the interstate map and, finally, find a specific restaurant in New York City by using the third map stored in PCD memory.

Figure 22:
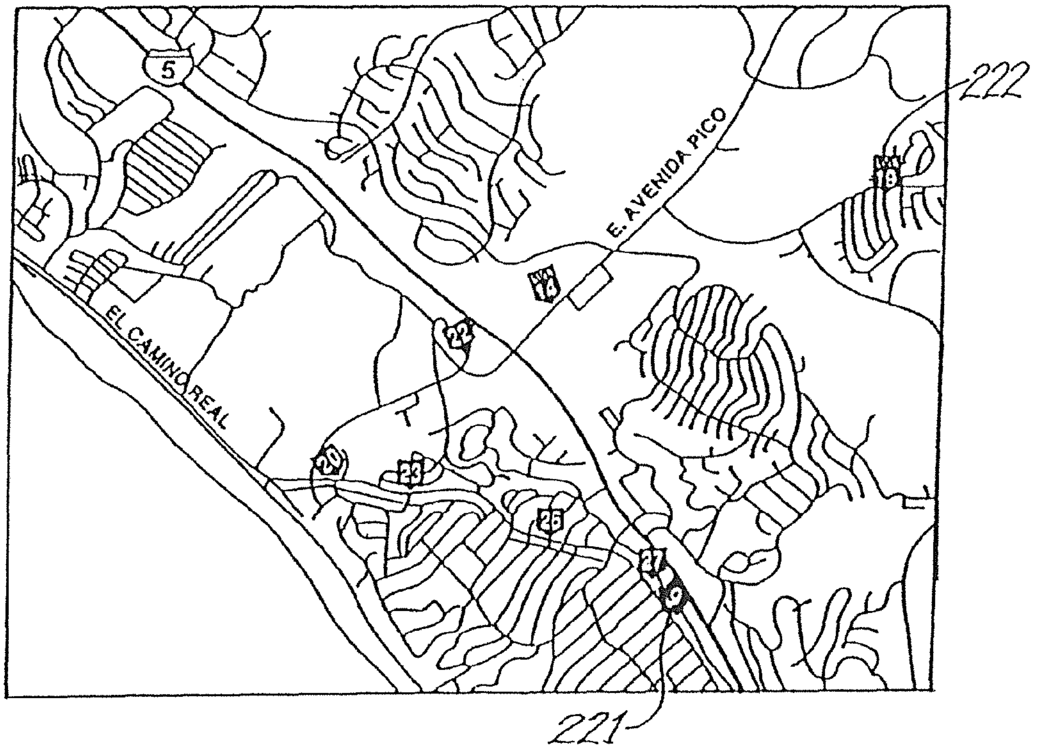
FIG. 22 illustrates a typical GPS encoded map with waypoints locating restaurants within a specified radius.

As shown in FIG. 22, the PCD contains a map with various waypoint locations the user has selected. These waypoints are both standard waypoints 221 and linked waypoints 222. The waypoints are indicated by a marker on the display. Standard waypoints indicate identifiable locations of interest. Linked waypoints have additional data associated with the waypoint. The additional data may be text data, visual data such as a photographic image of the waypoint, or an audio data file. When the marker for the linked waypoint is selected using the touch screen or other input device, the processor determines if the additional data associated with the waypoint is available in the PCD memory. If the additional data is not available in the PCD memory, the PCD automatically requests the additional data from a data provider. Once the additional data is available, the PCD displays or otherwise makes use of the additional data.

Using the map of FIG. 22, the user could navigate to a school, restaurant, bank, gas station, government office using the PCD to interpolate using spatial query techniques to find the best routes to each location. The PCD can re-collate the list for the most efficient route using the application and GPS engine modules. Using software programming techniques and math formulas, persons skilled in the arts will utilize spatial analysis queries and functions to determine best routing and "closest to" scenarios. In addition, centroid interpolation functions arid match-rate comparison functions used by the GEO coding community will further enhance this application's ability to universally communicate with other systems.

Figure 30:
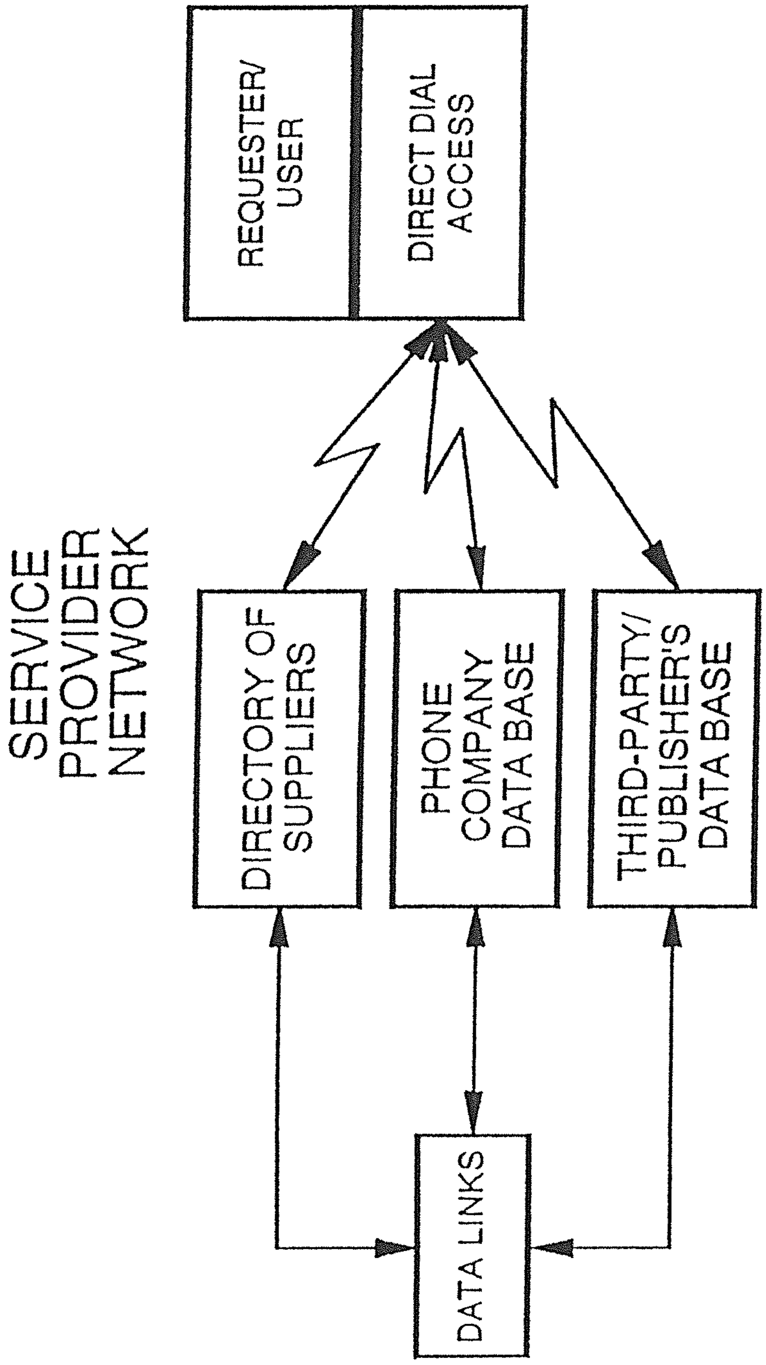
FIG. 30 illustrates a typical configuration of the service provider.

FIG. 30 further illustrates a system whereby the user uses a PCD to dial a direct access number similar to dialing 411, but all requests are requested and serviced automatically. Upon connection to the system, the user makes keyboard requests to the PCD or traditional computer system using the application program of the PCD. Upon requests being received by the data provider or similar information provider, the provider or supplier searches the data base for data responsive to the request. The provider or supplier can access further data through data links to other third party sources and continue to provide all data required by the requester. This system is consistent with the world wide web, linking data through hypertext connections and designations. This invention's system converts information requests to data requests, not verbal requests, as presently being practiced in directory assistance type services. This narrow usage of the application module allows convenient access to directory assistance that primarily provides data and chunks of information in a short period of time consistent with directory assistance today.

Figure 31:
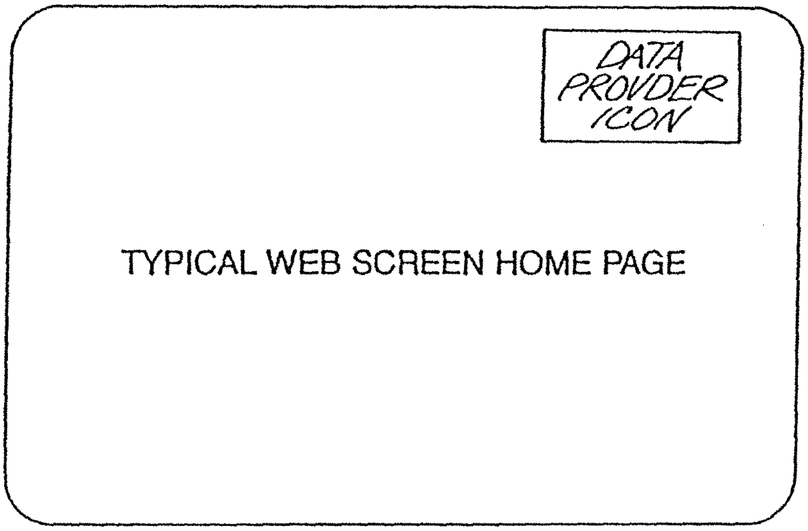
FIG. 31 illustrates a possible configuration of the digital web TV.

FIG. 31 shows a web page screen with a data provider icon displayed on the device. Pressing or otherwise selecting the icon will enable a menu for the requester to specify a data request. Download will be in the form of a compressed digital data file that may include video, sound, or other digitally encoded data.

Figure 32:
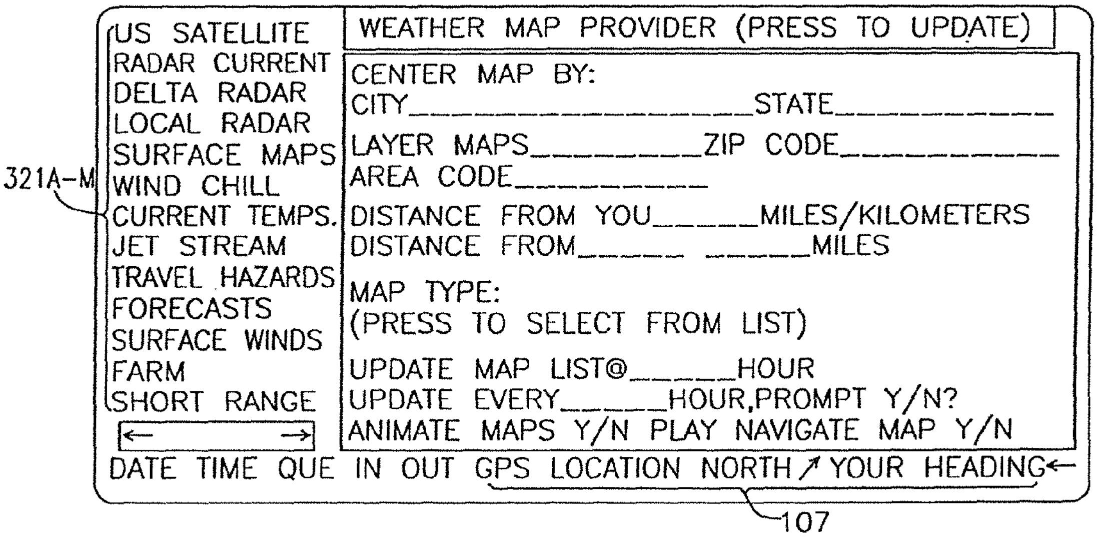
FIG. 32 illustrates the Weather Map Request page of the PCD of FIG. 2.

FIG. 32 illustrates a Weather Map Request page. The Weather Map Request page is accessed by pressing the Weather button 27*n* (shown in FIG. 2) on the PCD. The Weather Map Request page allows the PCD user to specify the map location and scale, the map type, whether the selected map should be automatically updated at specified intervals, and whether a set of maps should be displayed in a sequential fashion. The PCD displays a number of different types of weather maps, including satellite images, radar maps, temperature maps, wind chill maps, and any other type of weather map available. Some weather information is more perfectly provided by showing a sequence of displays indicating the change in weather over time. Therefore, the PCD allows the operator to sequentially display a set of maps, thus providing an animated map display.

Figure 33:
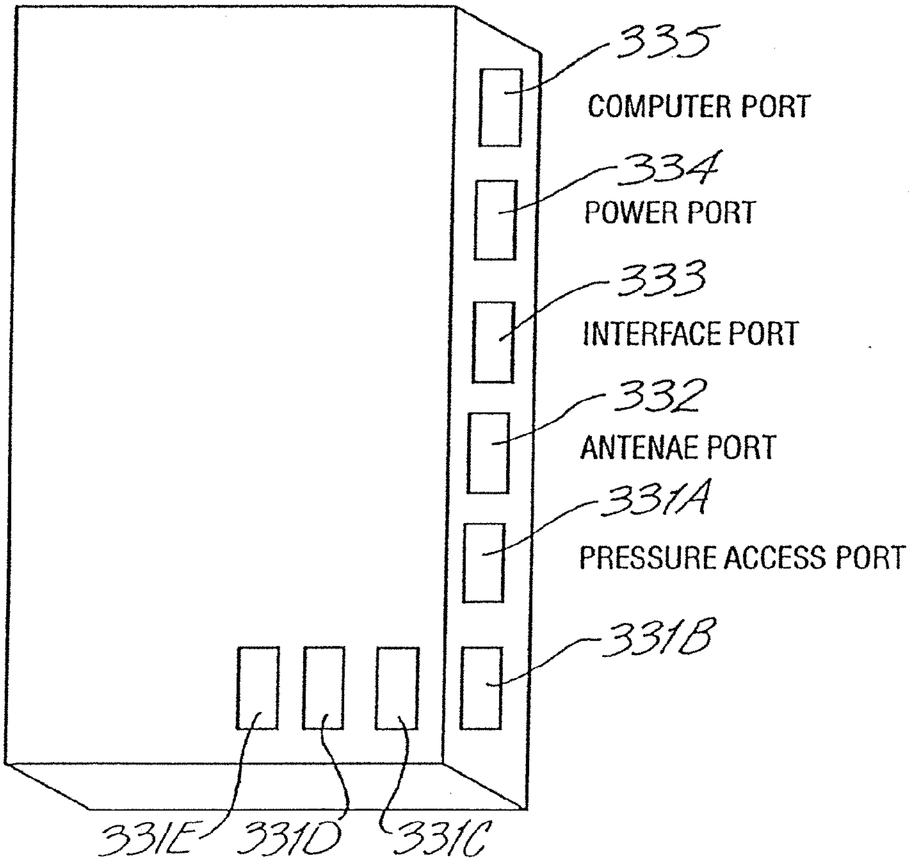
FIG. 33 illustrates a weather reporting device.
Figure 3A:
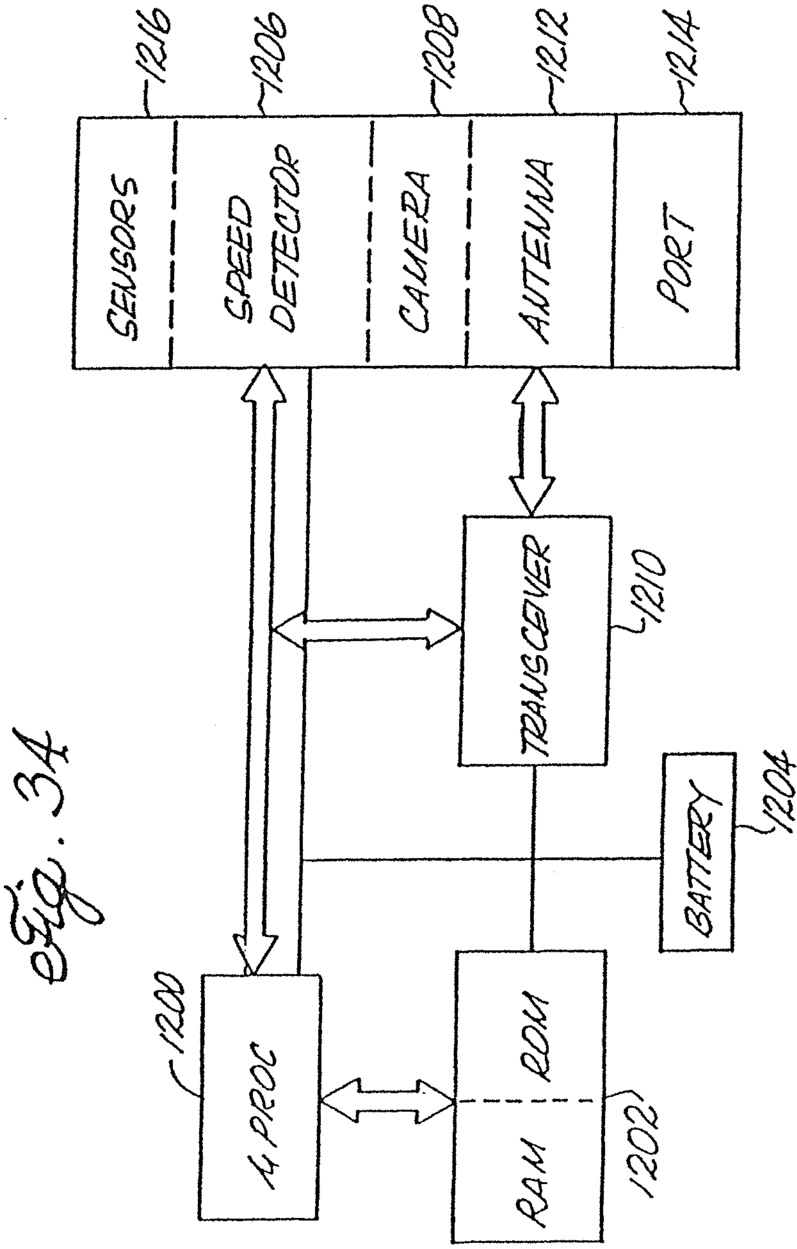

FIG. 33 illustrates a weather reporting device. The weather reporting device has a power port 334 to provide electrical power to the weather reporting device. As with the PCD, the weather reporting device may also be powered by a battery (not shown). The weather reporting device also has a computer port 335, an interface port 333, an antenna port 332, a pressure access port 331*a*, and a number of auxiliary ports 331*b-e*. The computer port provides a communications interface to a standard personal computer or the PCD. The interface port provides an interface to systems with weather detection features, such as aircraft with weather radars or lightning strike finders. The antenna port allows an external antenna to be connected to the weather reporting device, thereby providing remote operation capability. The pressure access port provides external access for an internal pressure sensitive device (not shown) for the determination of barometric pressure. A plurality of auxiliary input ports 441*b-e* provide an interface for connecting the weather reporting device to external weather detection sensors such as temperature sensors, wind sensors, and other weather sensing devices.

In one embodiment the weather reporting device additionally includes a coaxial cable port, a fiber optics port, and a telephone line port. The coaxial cable port allows the weather reporting device to be attached to a cable television distribution system. Attachment to the cable distribution system allows the device to transmit information over the cable distribution system to a central office of a cable television network. The fiber optic port similarly allows the weather reporting device to be attached to a fiber optic communications network. The fiber optics communication network may be either a cable television distribution system or a telephone distribution system. The telephone access port allows for the connection of the weather reporting device to a standard telephone network.

A condition reporting device is a weather reporting device, but with increased capabilities. The condition reporting device further includes a radio radar unit similar to those used by police agencies to detect automotive vehicular speed. Alternatively, the condition reporting device may be equipped with sonar, infrared, or other distance measuring devices.

FIG. 34 illustrates a block diagram of the condition reporting device (CRD). The CRD includes a processor 1200, memory 1202, a battery 1204, a speed detector 1206, a digital camera 1208, a radio transceiver 1210, an antenna 1212, a coaxial cable port 1214, and sensors 1216. The memory stores data pertaining to operation of the CRD, including instructions for execution by the processor which controls operation of the CRD. Specifically, the processor reads data from the various sensors and transmits data via the transceiver. In one embodiment the memory additionally stores data pertaining to normal expected conditions, such as normal temperatures or traffic flow, at the CRD location. This data could take the form of merely the average normal temperature at the site, but more preferably provides daily or hourly normal temperatures and hourly traffic pattern information.

With respect to the use of the radar or other similar unit, the condition reporting device may be mounted on the sides of freeway overpasses or poles adjacent a vehicular arterial route to determine automotive vehicular speeds on the freeway or arterial route. Alternatively, the radar unit may be replaced by a sonar unit wherein the use of sound waves are used in place of radar waves to determine vehicular speed on the freeway or arterial route.

The condition reporting device additionally includes sufficient computer memory to store at least a single digitized video picture. The single picture is provided to the condition reporting device through the digital camera, which may be a charged coupled device (CCD) coupled to the condition reporting device through one of the auxiliary input ports. The condition reporting device may also obtain data representing the single digitized video picture via a direct transmission to the condition reporting device through the antenna of the condition reporting device. Thus, photographs in digital format obtained by others, such as television news helicopters, may transmit a digital picture to the condition reporting device for storage.

Figure 35:
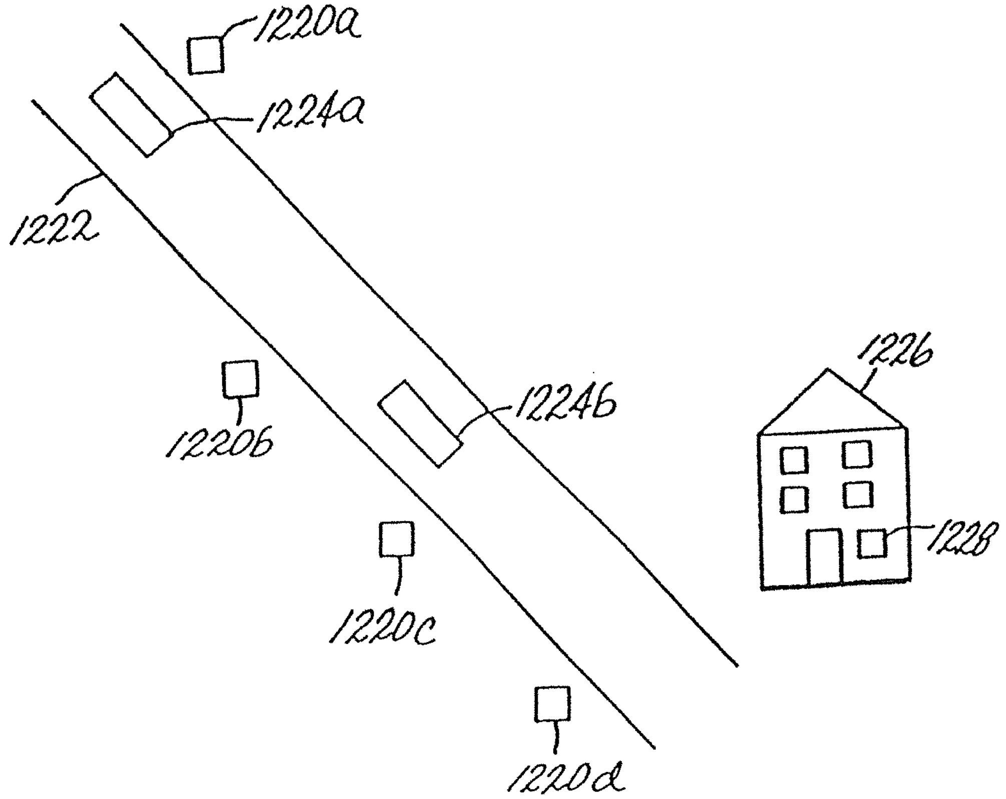
FIG. 35 illustrates several condition reporting devices of FIG. 34 deployed along an arterial route.

The radio transceiver unit allows the condition reporting device to transmit information via radio signals both to end-users and to other condition reporting devices. As illustrated in FIG. 35, first through fourth condition reporting devices 1220*a-d* are located alongside an arterial route 1222. Traveling along the arterial route are automobiles 1224*a,b*. A home 1226 equipped with a radio receiver 1228 is located near the arterial route. Specifically, the home is located most near the fourth condition 1220*d* reporting device, and most distant from the first condition reporting device 1220*a*. The automobiles receive information from the condition reporting devices via radio signals, as does the home, and thus end-users in the automobiles and the home receive up-to-date information regarding conditions along the arterial.

The end-users, however, may not desire information regarding road conditions from condition reporting devices which are close enough for the end-users to receive radio transmissions. Accordingly, the condition reporting devices are two-way daisy-chained together. That is, the second condition reporting device receives information broadcast from the first condition reporting device and the third condition reporting device. The second condition reporting device also transmits the information received from the first condition reporting device and the third condition reporting device in addition to the information specific to the second condition reporting device.

In one embodiment, the transmission of information is accomplished using a time-interleaf method in which the second condition reporting device transmits the information received from the first condition reporting device over a first time interval, and transmits the information specific to the second condition reporting device over a second time interval. In this time-interleaf method each condition reporting device in the daisy-chain is programmed with the number of other condition reporting devices in the daisy-chain, the transmission frequency the two closest condition reporting devices in the two-way daisy-chain, the total number of condition reporting devices in the chain, and the position of the condition reporting device in the chain.

The condition reporting device uses this information to determine the time necessary to receive transmissions from the two closest condition reporting devices in the chain and to determine the total transmission time for each cycle of transmission of the condition reporting device. For example, if each condition reporting device is allocated 30 second for transmitting their own information, the total cycle transmission time is two minutes if the first through fourth condition reporting devices are two-way daisy chained together.

Figure 36:
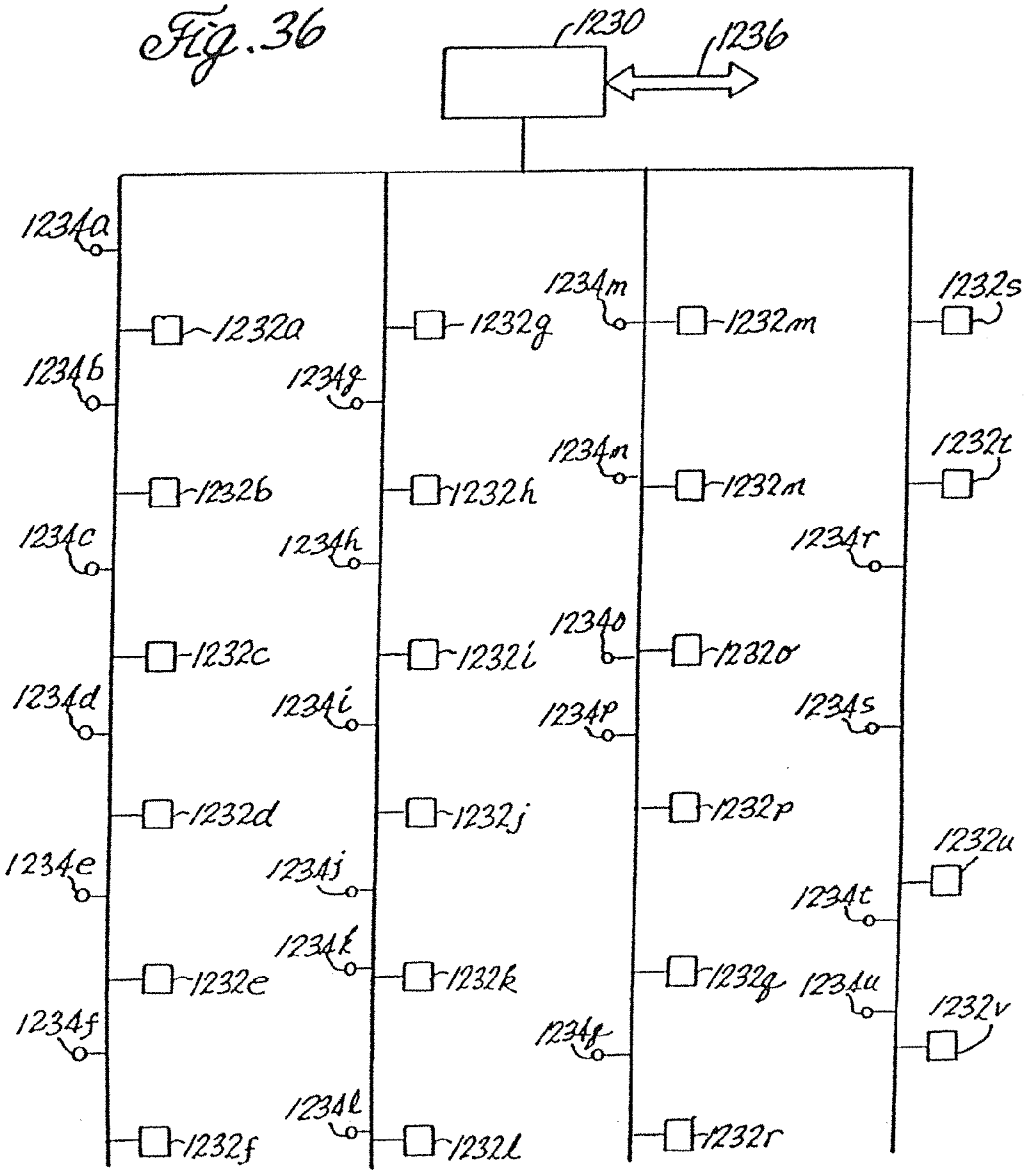
FIG. 36 illustrates a block diagram of a cable television distribution system for condition reporting devices of the present invention.

FIG. 36 illustrates a block diagram of a cable television distribution system for the weather reporting and condition reporting devices. A central cable television office 1230 provides for transmission of television signals over land line 1231 to various locations 1231*a-v*. The various locations may be residences, businesses, or other users of cable television distribution services. The land lines may be coaxial cable or fiber optic land lines. A central cable television office also provides links 1236 to telephone and computer networks for the transmission of Internet-related data. Thus, the land lines provides two-way communication between the central cable television office and the various locations.

Also attached to the land line are condition reporting devices 1234. The condition reporting devices are attached to the land line either through the cable access port or the fiber optic access port, depending on the nature of the land line to the condition reporting devices. The condition reporting devices transmit digital data corresponding to the data received by the devices input sensors over the land line to the central cable television office. The central cable television office then transmits digital information received by the condition reporting devices to the residences in other locations, with each condition reporting device provided a separate cable television channel.

Thus, in one embodiment condition reporting devices may be located in a variety of geographic locations throughout a cable television distribution area. Receivers of cable television may set their channels to a channel for a specific condition reporting device and obtain weather, traffic, and video information for a specific location within the cable television broadcast area. Moreover, condition reporting devices located in bars, restaurants, and other venues may transmit video pictures of the interior of such establishments as a form of advertising for the establishments, as well as for the entertainment of television viewers at home or elsewhere.

The locations of the condition reporting devices are also tracked by a central computer system. The central computer maintains a database of the locations of condition reporting devices. For condition reporting devices located along roadways such as streets and highways, the central computer system also stores in the database an indication of the road or highway along which the condition reporting device is located. Further, many organizations, particularly state highway departments, maintain digital cameras providing roadway information available over the World Wide Web (WWW or WEB). The central computer system also tracks locations of these digital cameras, as well as other non-condition reporting devices.

Figure 37:
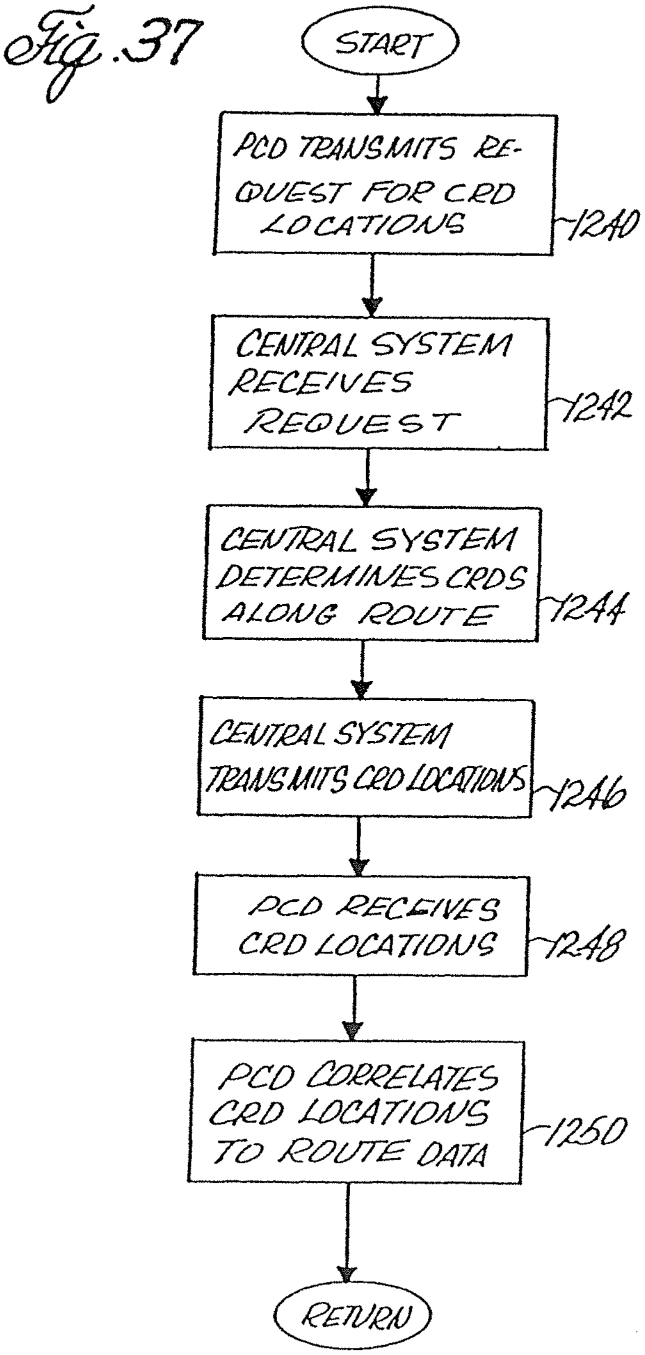
FIG. 37 illustrates a process for using route information to obtain information concerning the availability of condition reporting devices.

CRD location data may be used in conjunction with route information (plot trail) stored by the PCD. FIG. 37 illustrates a process for using the route information stored by the PCD to obtain information concerning the availability of condition reporting devices from the central computer system along the route stored by the PCD. In step 1240 a request for condition reporting device locations is transmitted by the PCD to the central computer system. Any of the communication means included with the PCD may be used to form such transmission, with one embodiment using cellular telephone communication. Included with the request for condition reporting device locations is data indicating the route information maintained by the PCD. The route information includes waypoint information for waypoints along the route. Road and highway identifiers are also transmitted when the route information also includes road or highway identifiers.

In step 1242 the central computer receives the condition report device request from the PCD. In step 1244 the central computer system determines the locations of condition reporting devices along the route. If the route information includes road or highway identifiers, then the central computer system identifies condition reporting devices along such roads or highways, and also determines the condition reporting devices along such roads or highways within the latitude and longitude constraints, as indicated by waypoints, of the route. This process is performed for each road or highway identified in the route information as being along the route. If the route information does not include road or highway identifiers, then the central computer system determines the locations of condition reporting devices within one-tenth of a mile of the route. The central computer system of course need not be limited to reporting condition reporting device locations within one-tenth of a mile of the route. Other distance values may be used, and the PCD may also transmit a requested search criteria to the central computer system for use by the central computer system.

In step 1246 the central computer system transmits condition reporting device locations along the route to a PCD. For each such condition reporting device, the central computer system also transmits information identifying methods of communication with the condition reporting devices. For example, some condition reporting devices may make data available over computer networks such as the Internet or World Wide Web. Other condition reporting devices may only transmit information via radio communications within a small area, or may be part of a linked condition reporting device system allowing for radio communication over larger areas.

In step 1248 the PCD receives the locations of reporting devices. In step 1250 the PCD correlates the condition reporting device locations to the route information and forms a map display indicating the trail plot and the condition reporting device locations the process then returns.

Figure 38:
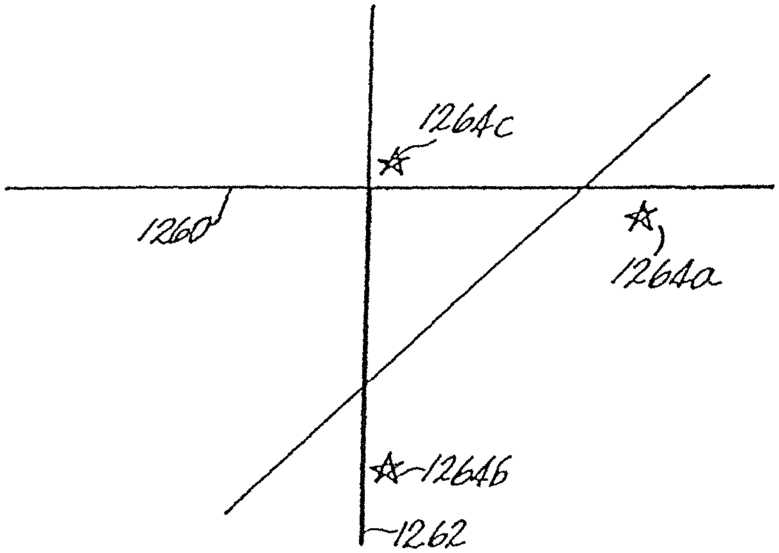
FIG. 38 illustrates a PCD displaying a trail plot with condition reporting device locations.

FIG. 38 illustrates a display of a PCD displaying a trail plot with condition reporting device locations. As illustrated, the trail plot is indicated by a thick line. The thick line follows a first route 1262 until the first route intersects a second route 1260. The plot trail thereafter follows the second route. The locations of condition reporting devices 1264*a-b* are indicated along the route by star symbols (☆).

Three methods are used by the PCD to obtain condition reporting device information, a manual method, an automatic hand-off method, and an automatic sequence method.

Figure 39:
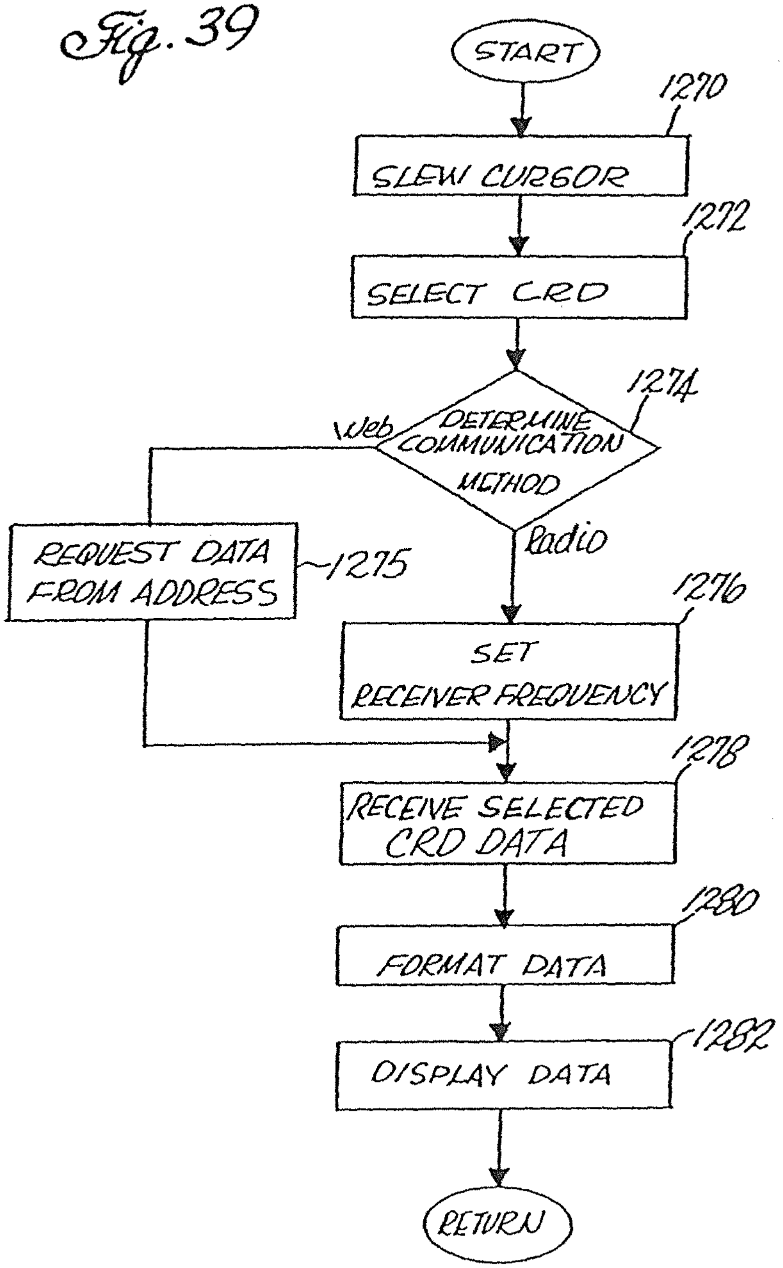
FIG. 39 illustrates a process of a manual method of obtaining condition reporting device information.

FIG. 39 illustrates a process of the manual method. In the manual method the user of the PCD slews the cursor over the reported location of the condition reporting device in step 1270. In step 1272 the user selects the condition reporting device identified by the cursor. In step 1274 the PCD determines whether the condition reporting device is communicated with a via a computer network or via radio transmissions. If the condition reporting device is communicated with via a computer network, then the PCD transmits a request to the condition reporting device for data over the computer network in step 1275. If the condition reporting device transmits information via radio communications, then the PCD sets its radio receiver to the appropriate frequency for receiving transmissions from the condition reporting device in step 1276. In step 1278 the PCD receives the information from the condition reporting device. The PCD then formats the data in step 1280 and displays the data in step 1282.

Figure 40:
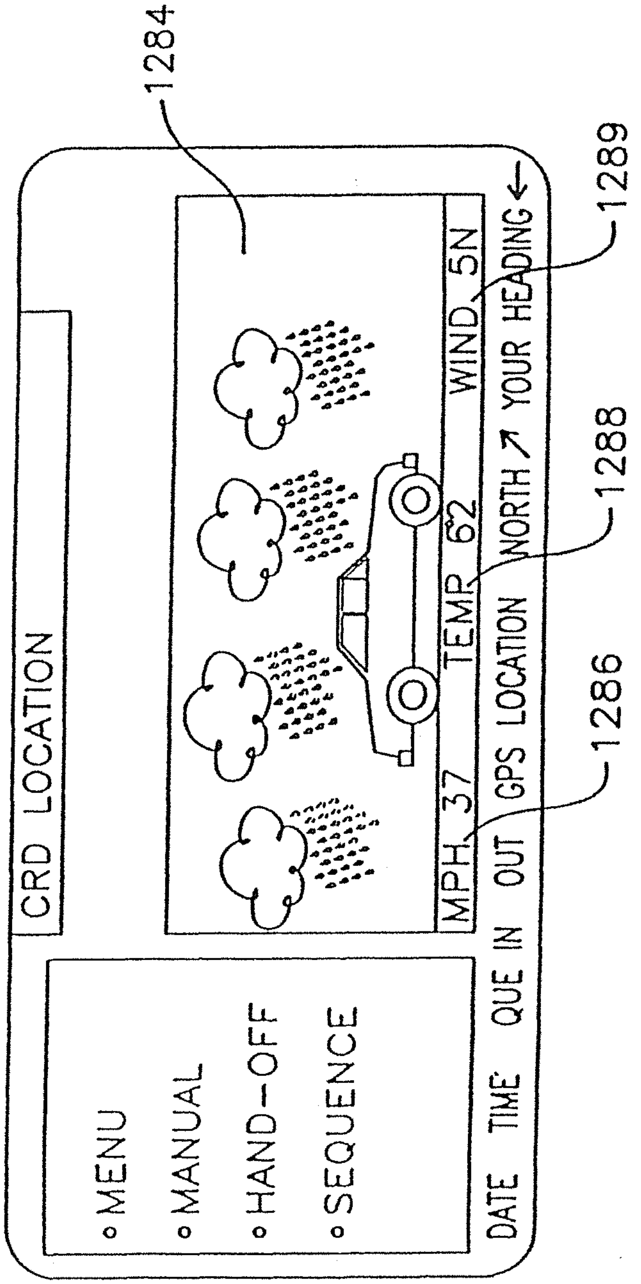
FIG. 40 illustrates a PCD display showing information received from a condition reporting device.

FIG. 40 illustrates a PCD display showing information received from the condition reporting device. The information from condition reporting device includes a single digital photo 1284. The information received from the condition reporting device also includes traffic speed indications 1286 and current weather information, including temperature 1288 and wind speed 1289.

Figure 41:
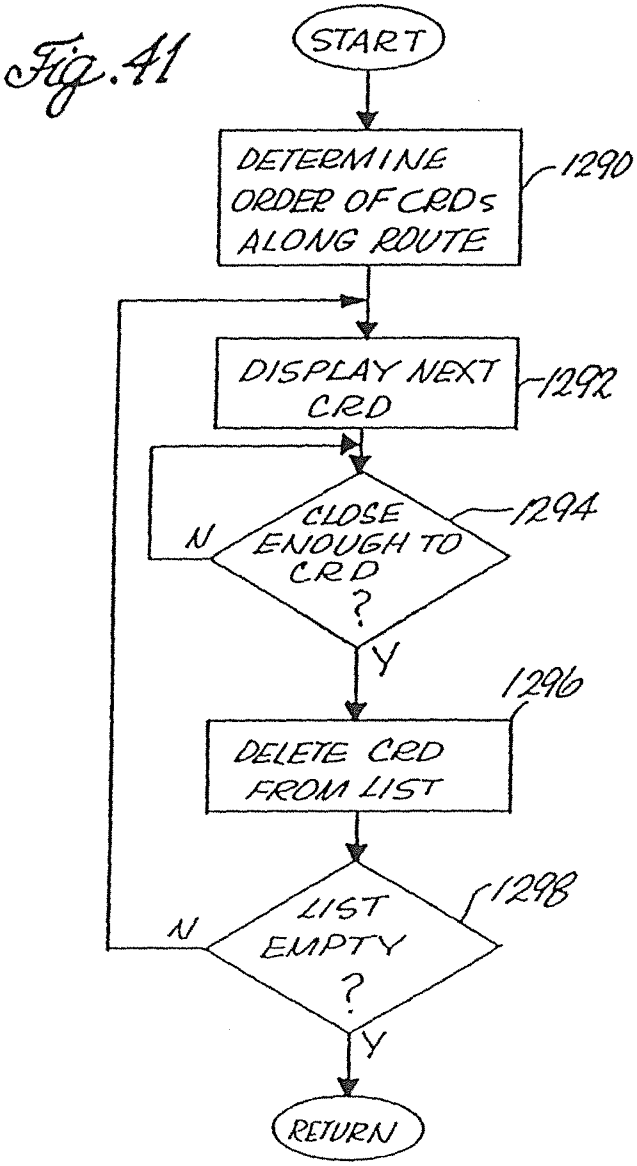
FIG. 41 illustrates a process of the automatic handoff method for obtaining condition reporting device information.

FIG. 41 illustrates a process of the automatic hand-off method for obtaining condition reporting device information. The automatic hand-off method is similar to the manual method, but the user of the PCD is not required to select condition reporting device locations with the cursor. Instead, the PCD maintains a sequential list of condition reporting device locations along the route. The sequential list is ordered by condition reporting device locations along the route such that a first condition reporting device expected to be encountered along the route is placed first in the list, and the last condition reporting device expected to be encountered along the route is placed last in the list. As the PCD travels along the route condition reporting devices are removed from the list when the PCD comes within a predetermined distance, one-tenth of a mile in the preferred embodiment, of the condition reporting device location.

When the user selects COND RPT on the PCD display the PCD determines which condition reporting device is currently first on the list. The PCD then contacts the condition reporting device, as in the manual method, and displays the condition reporting device information, also as in the manual method. Once the PCD comes within the predetermined distance of the condition reporting device the PCD removes the condition reporting device from the list, and automatically requests information from the next condition reporting device along the route and displays such information.

Thus, as illustrated in FIG. 41, the process determines an ordered list of CRDs along the route in step 1290. In step 1292, the process causes information from the next CRD to be displayed. In step 1294 the process determines if the CRD whose information is being displayed is within a predefined distance of the PCD. Once the CRD is within the predefined distance the process deletes the CRD from the ordered list in step 1296. In step 1298, the process determines if the list is empty. If the list is empty, the process returns. Otherwise, the process displays information from the next CRD in the list to be displayed in step 1292.

Figure 42:
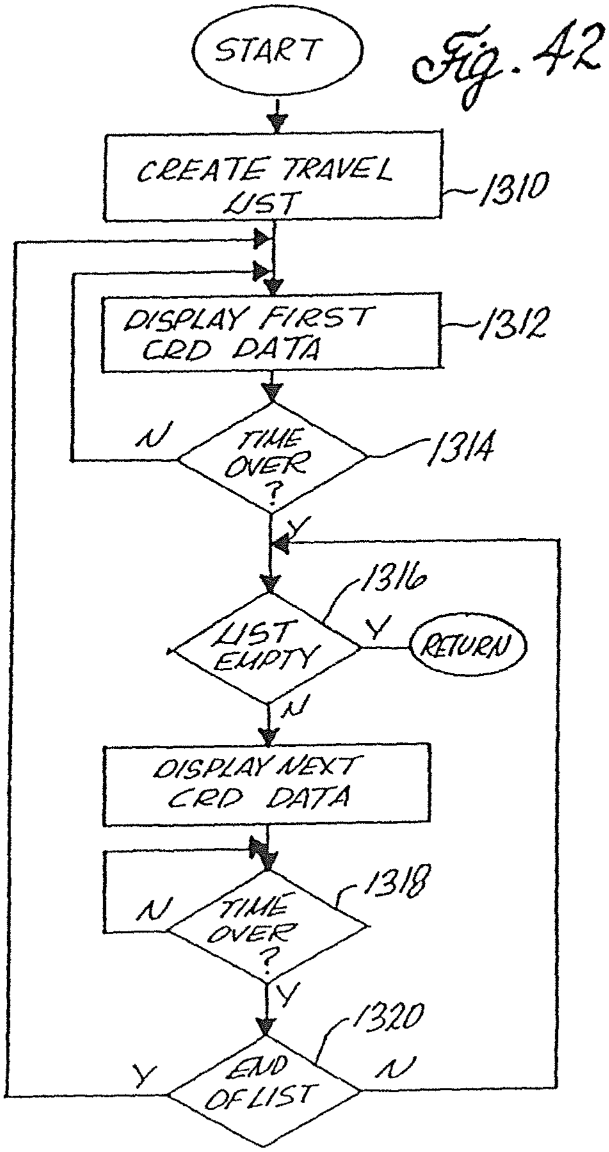
FIG. 42 illustrates a process of the automatic sequence method for obtaining condition reporting device information.

FIG. 42 illustrates a process of the automatic sequence method for obtaining condition reporting device information. As in the automatic hand-off method, the PCD maintains a sequential list of condition reporting device locations along the route. The sequential list is ordered by condition reporting device locations along the route such that a first condition reporting device expected to be encountered along the route is placed first in the list, and the last condition reporting device expected to be encountered along the route is placed last in the list. Information from each condition reporting device in the sequential list is displayed for a period of time, in one embodiment ten seconds, and then the next condition reporting device in the sequential list is displayed. After information from the last condition reporting device in the sequential list is displayed, the PCD displays information from the condition reporting device first in the sequential list. As in the automatic hand-off method, as the PCD travels along the route, condition reporting devices are removed from the list when the PCD comes within a predetermined distance of the condition reporting device location.

Thus, as illustrated in FIG. 42, in step 1310, the process creates a travel list comprising a sequential list of CRDs expected to be encountered over the route. The process causes data from the first CRD in the list to be displayed in step 1312. The process then determines if a predefined time period has elapsed in step 1314. Once the predefined time period elapses the process determines if the list is empty in step 1316. If the list is empty the process returns. If the list is not empty the process causes display of data from the next CRD in the list in step 1317. The process then waits predefined time period in step 1318, When the predefined time period elapses the process determines if the end of the sequential list has been reached in step 1320. If the end of the list has been reached the process causes display of information from the first CRD in the list in step 1317. Otherwise, the process causes display of information from the next CRD in the sequential list in step 1317.

Thus, in either the automatic hand-off mode or the automatic sequence mode, the user may have a PCD in his automobile and be automatically informed of current road conditions along the expected route. If road conditions are reported as unpassable due to weather or traffic, then the user may appropriately plan to take alternate routes.

The use of the PCD in conjunction with CRDs accordingly provides the PCD user the capability to receive up-to-date detailed information regarding conditions along the PCD user's route. This allows the PCD user to plan use alternative routes as conditions warrant. Such planning is further enhanced by an alternative route (ALT RTE) function of the PCD.

The ALT RTE function of the PCD uses current speed information from CRDs along the user's route, and alternatives to the user's route, to determine travel times. FIG. 43 illustrates a PCD display showing a user's route 1300 comprised of multiple segments 1300 *a-d*. The user's route follows a first street 1300*a*, a first highway 1300 *b*, and a second highway 1300*c*. Roads and highways near the users route include a second street, a third street 1304, and a fourth street 1306. The user's route includes a segment A which follows the first street 1300*a* in a southerly direction to the first highway 1300*b*, which runs in a east-west direction. The user's route then has a segment B which follows the first highway 1300*b* in a westerly direction until the first highway intersects the second highway 1300*c*, which runs in a north-south direction. The user's route then has a segment C which follows the second highway 1300*c* until the termination of the route at the intersection of the second highway 1300*c* and the fourth street 1306.

Alternatively, the user could take a route including a second street 1302 which runs in a east-west direction, a third street 1304 which runs in a north-south direction and intersects the second street and the fourth street 1306. The second street is comprised of a segment D from the user's start point to the third street, and a segment E from the third street to the second highway. The third street is similarly comprised of a segment F and a segment G.

Condition reporting devices 1308*a-j* are located at various points along the streets and highways. The condition reporting devices provide traffic speed and weather indications through the PCD via methods discussed above. The map information made available to the PCD and stored by the PCD contains distance information. The PCD therefore is able to make use of the traffic speed information and the distance information to determine travel times for the various route and route alternative segments. Real time calculation and display of segment travel times accordingly allows the PCD user to accurately determine and estimate travel times to particular destinations over a plurality of different roads and road segments.

Figure 47:
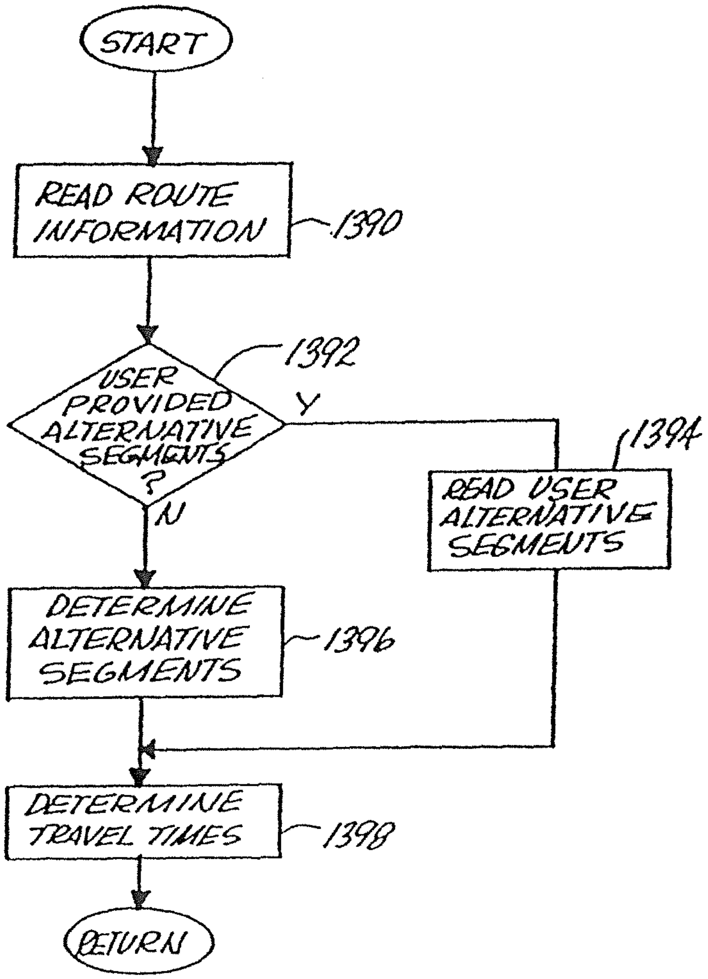
FIG. 47 illustrates a process of determining alternative route travel times.
Figure 48A:
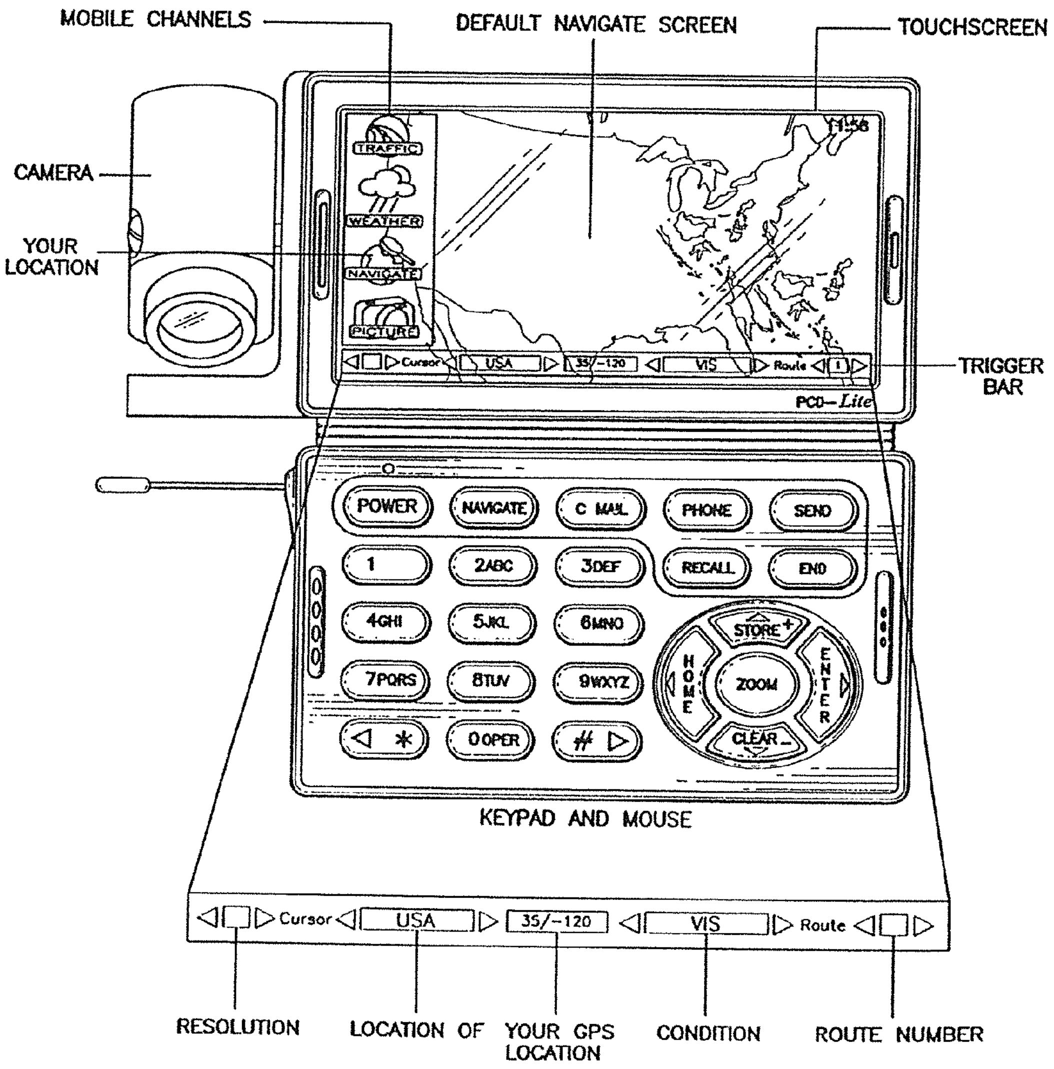
FIG. 48A-H illustrate an alternate embodiment of a PCD of the present invention.
Figure 48B:
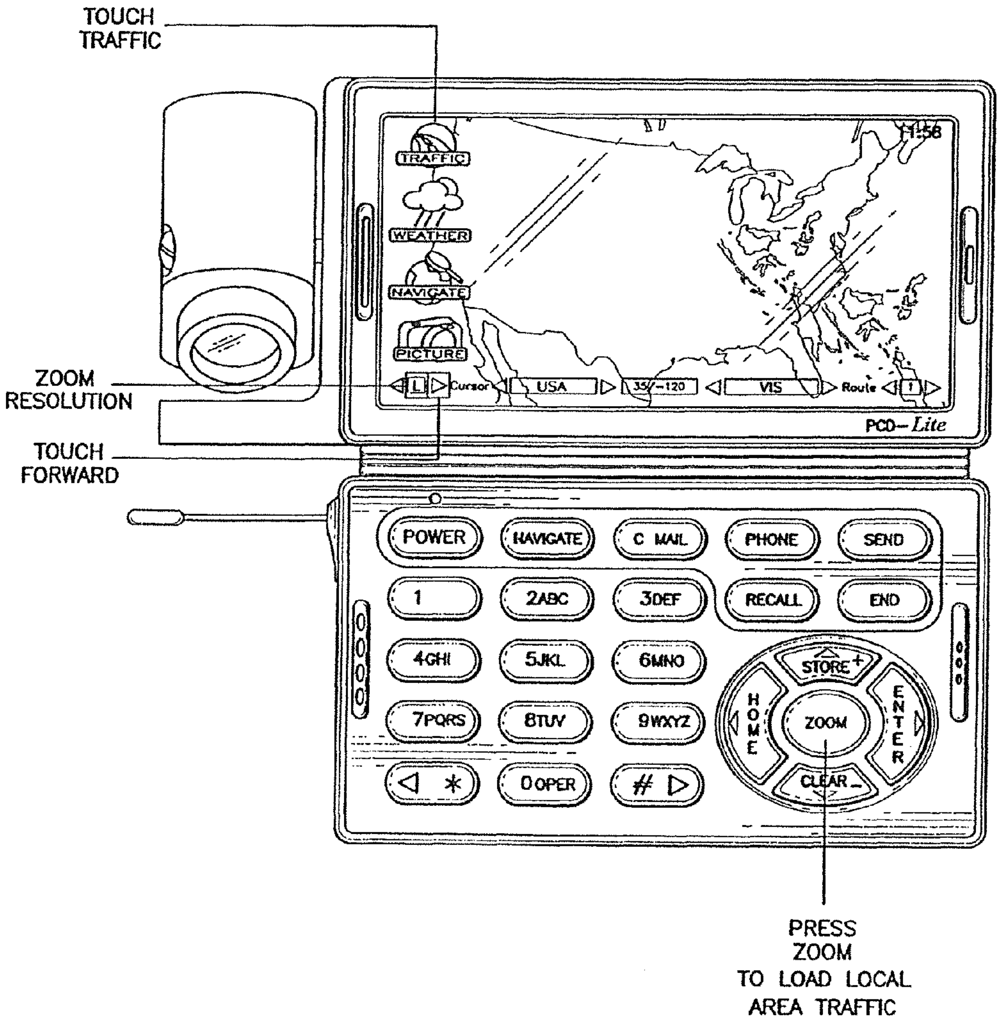
Figure 48C:
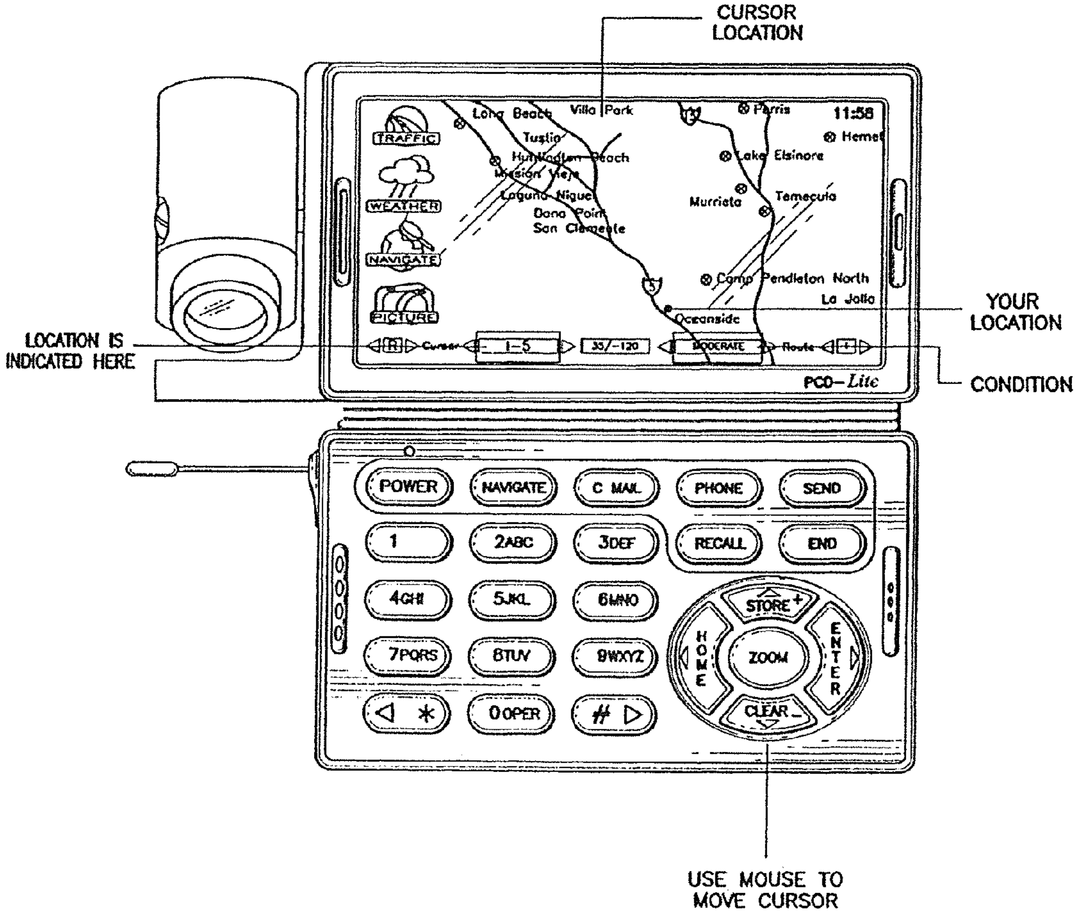
Figure 48D:
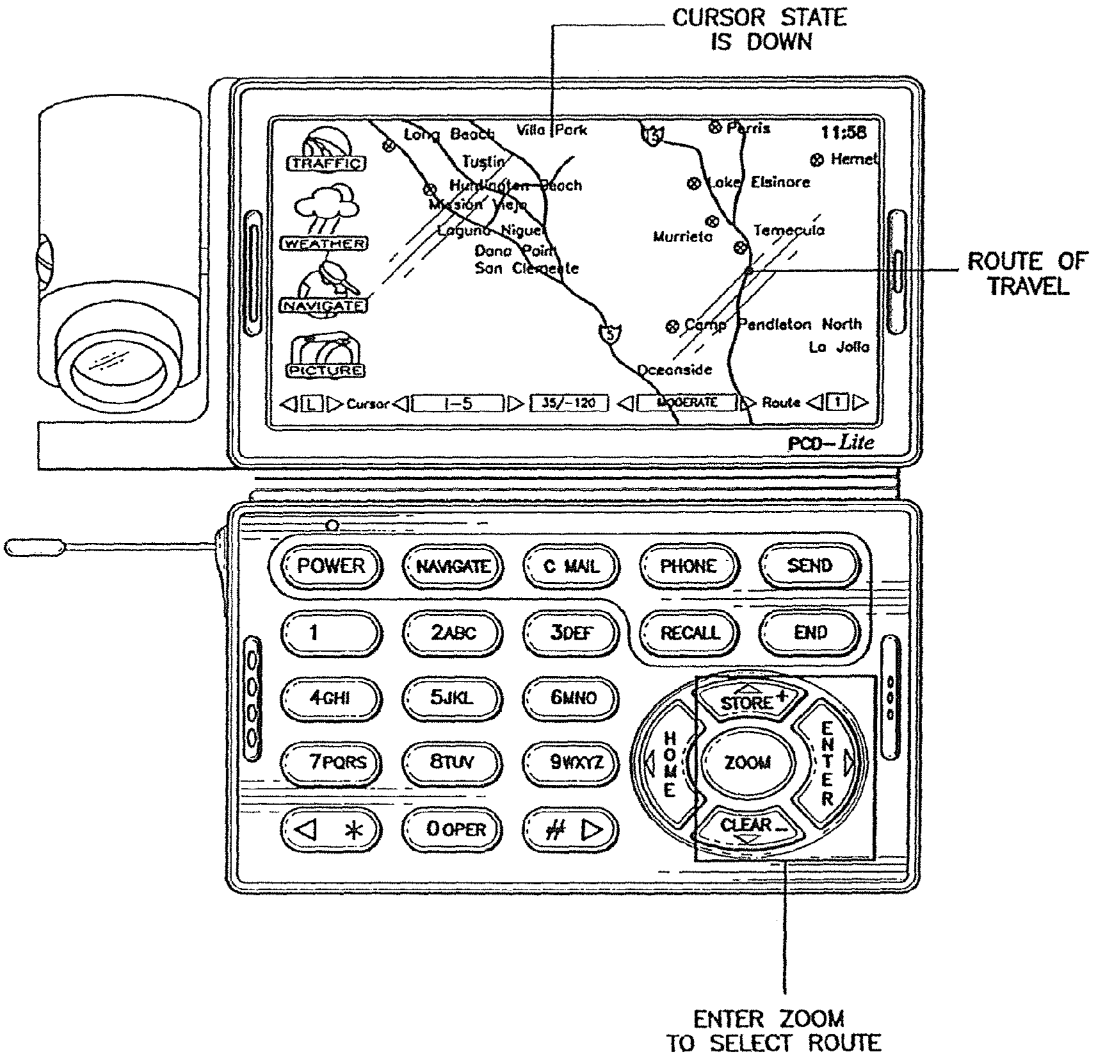
Figure 48E:
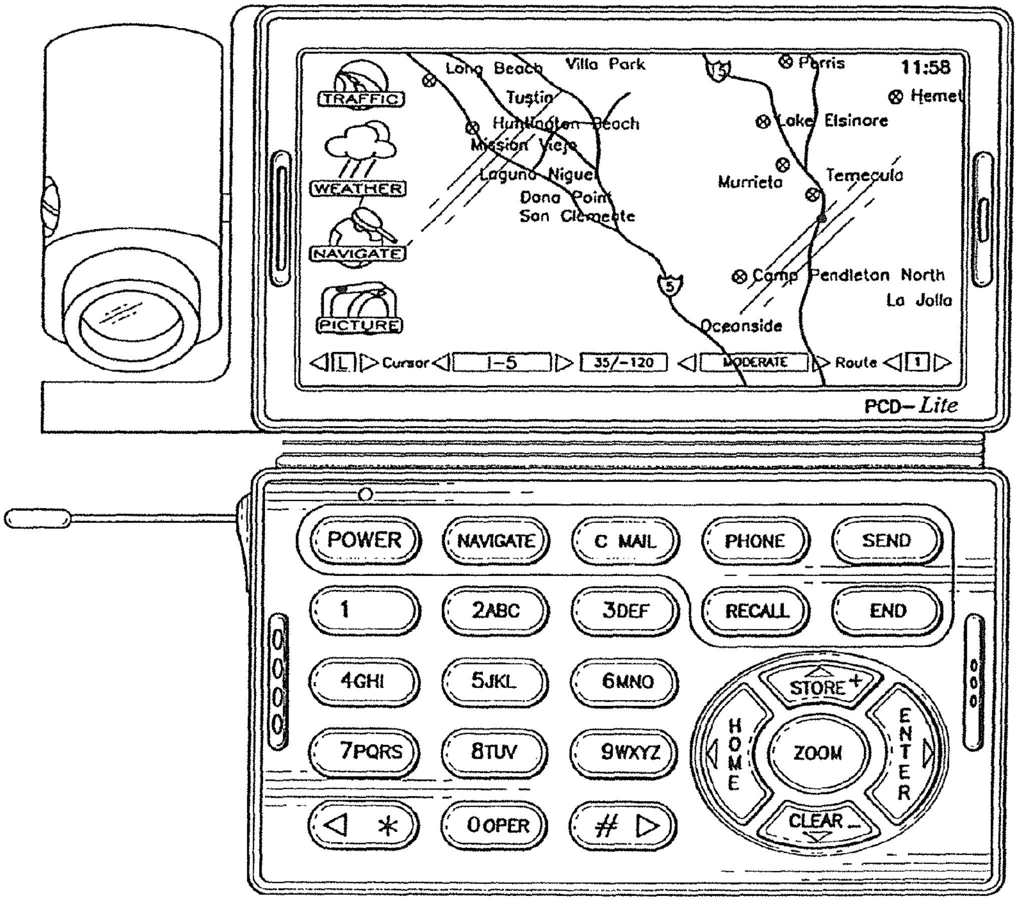
Figure 48F:
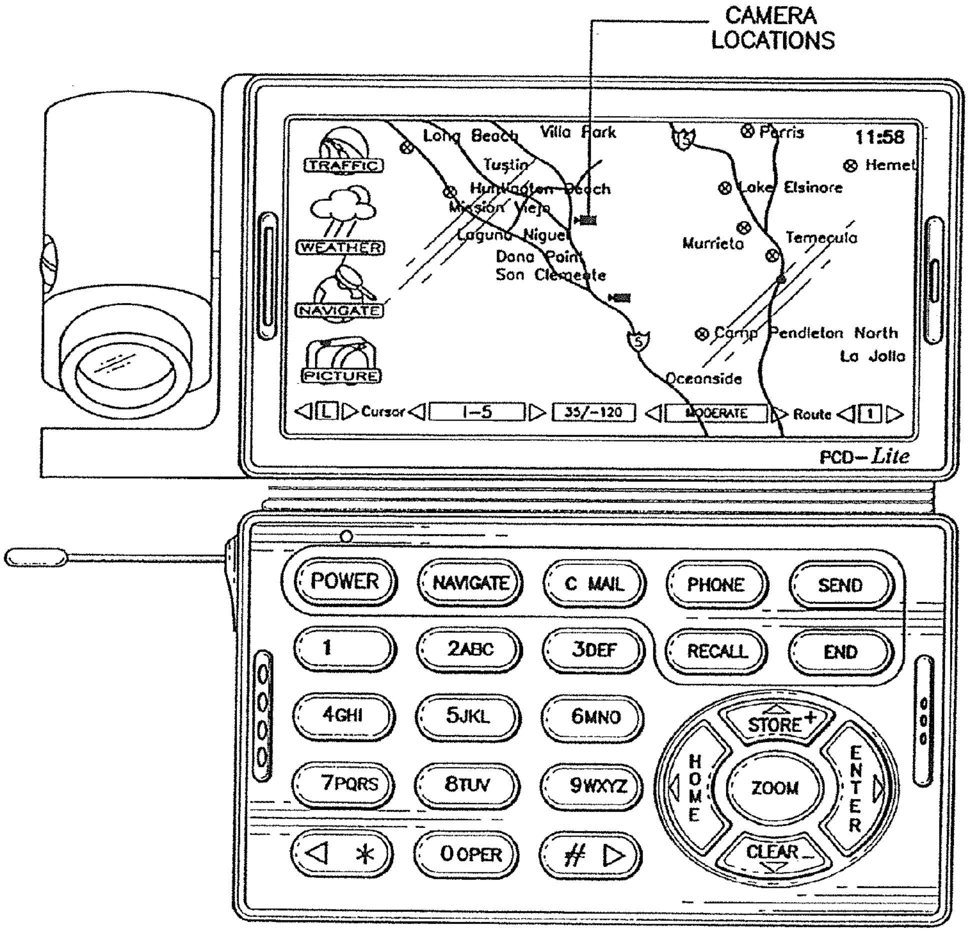
Figure 48G:
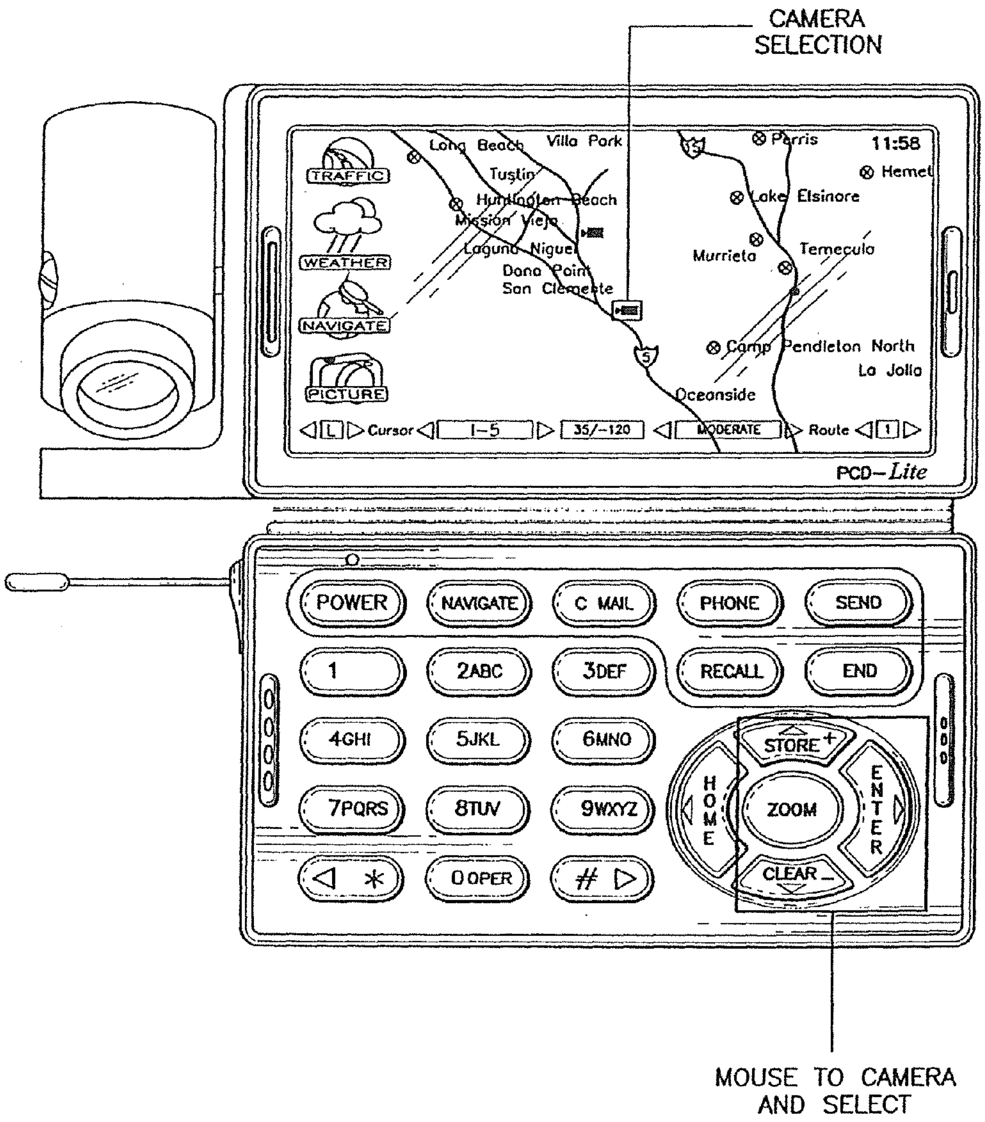
Figure 48H:
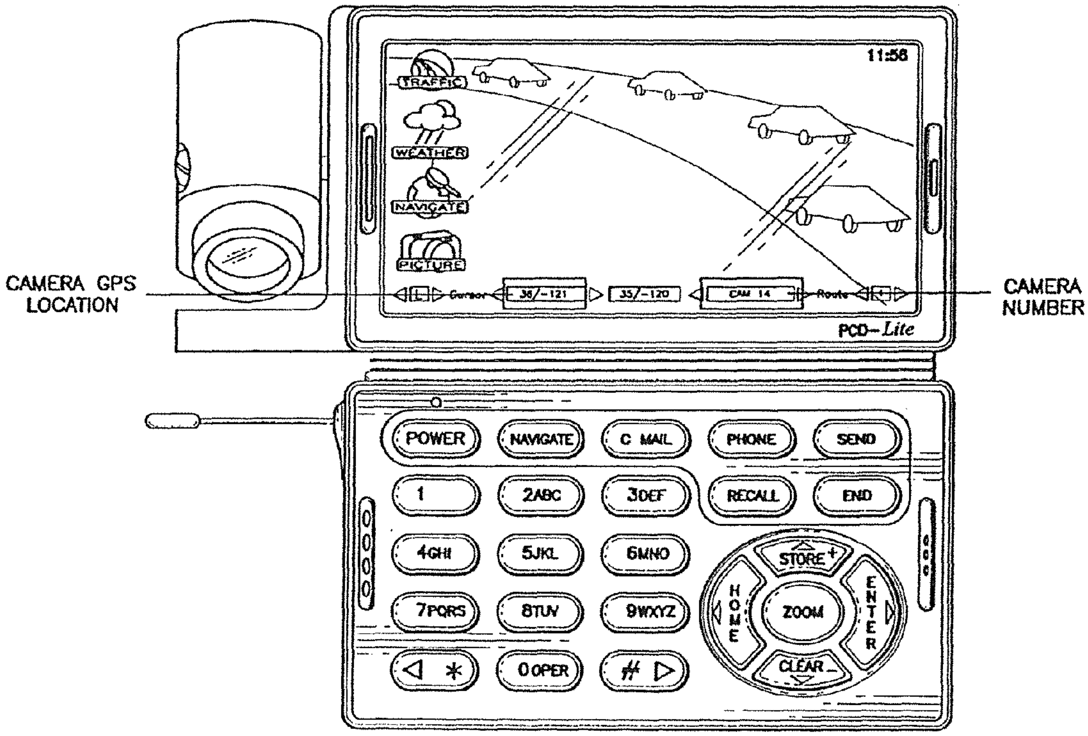
Figure 49A:
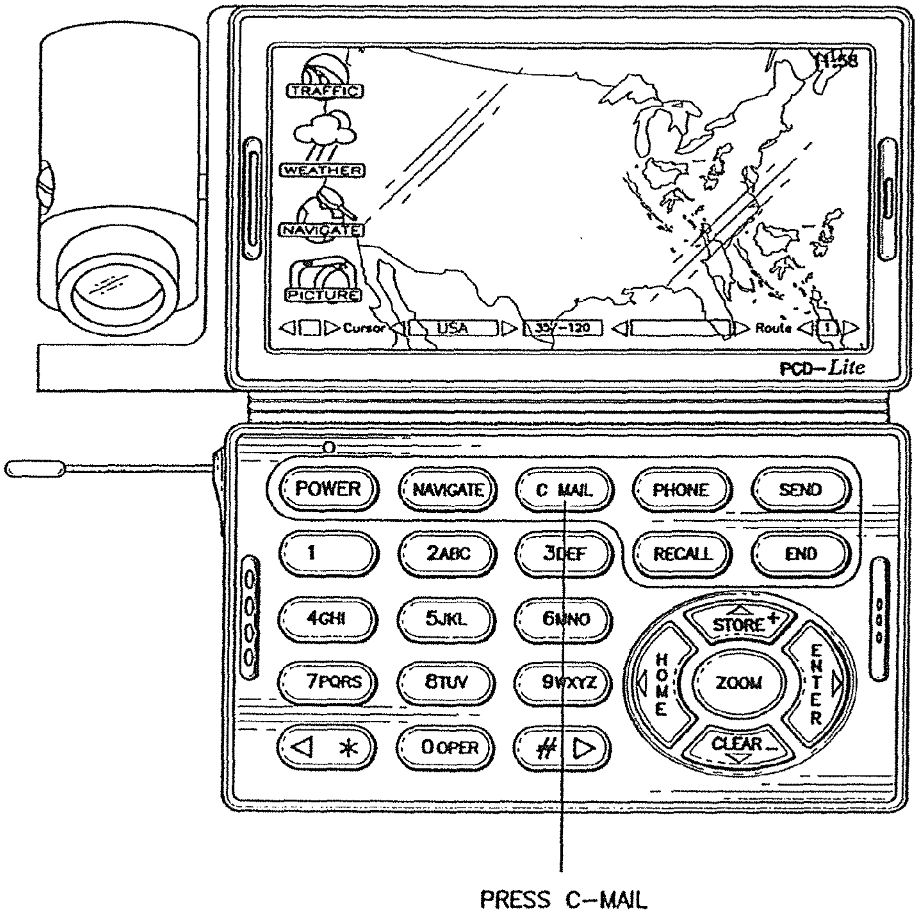
FIGS. 49A-G illustrate the alternate embodiment of a PCD of FIGS. 48A-H.
Figure 49B:
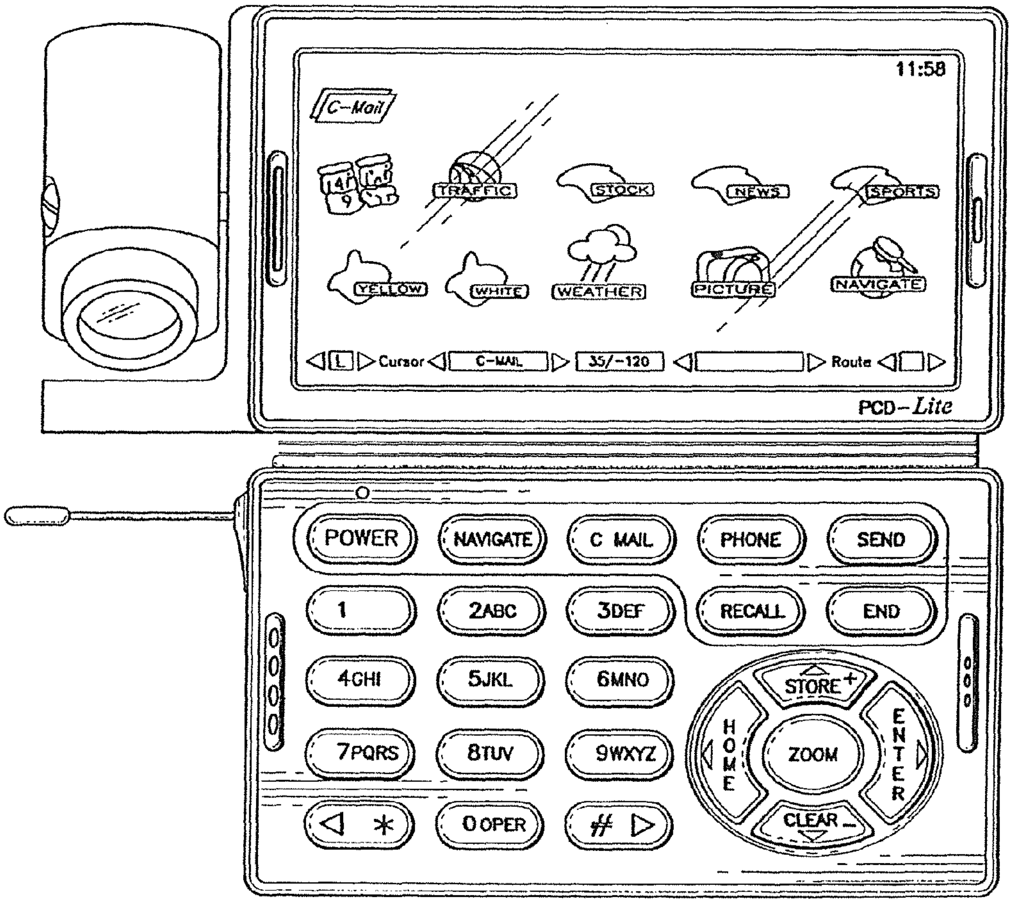
Figure 49C:
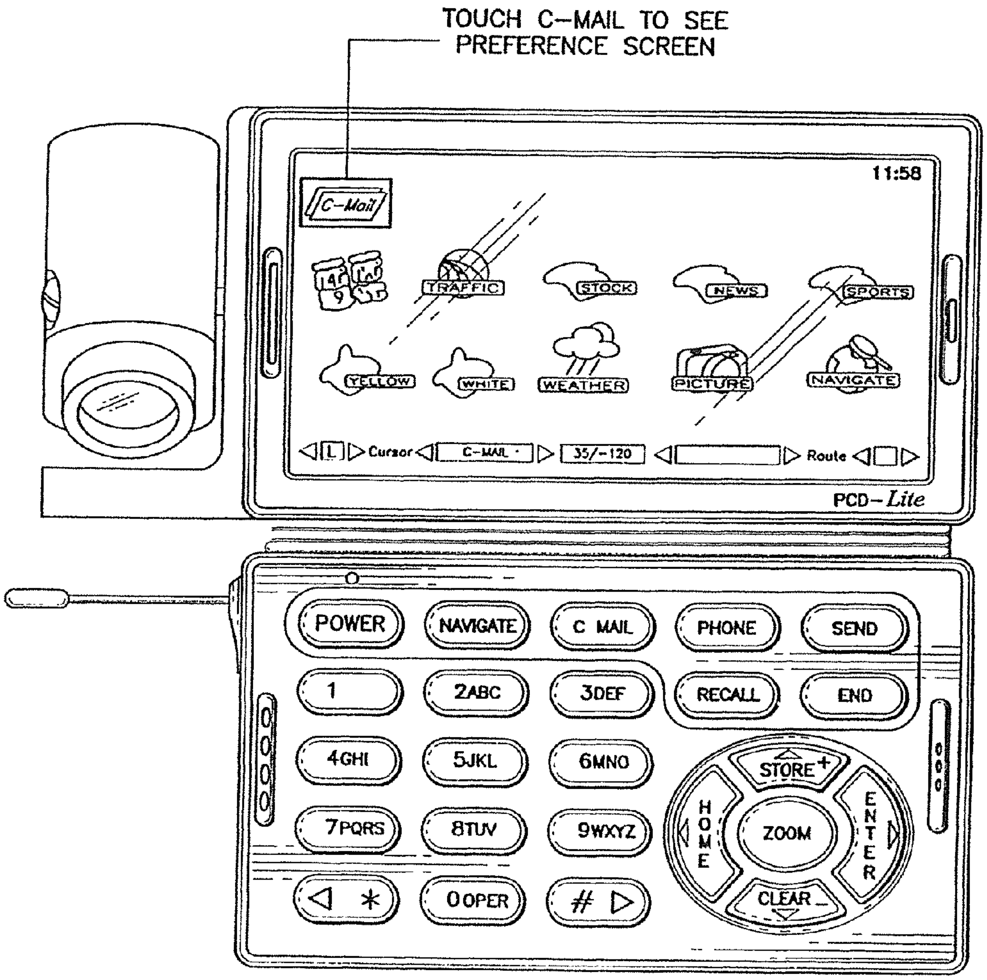
Figure 49D:
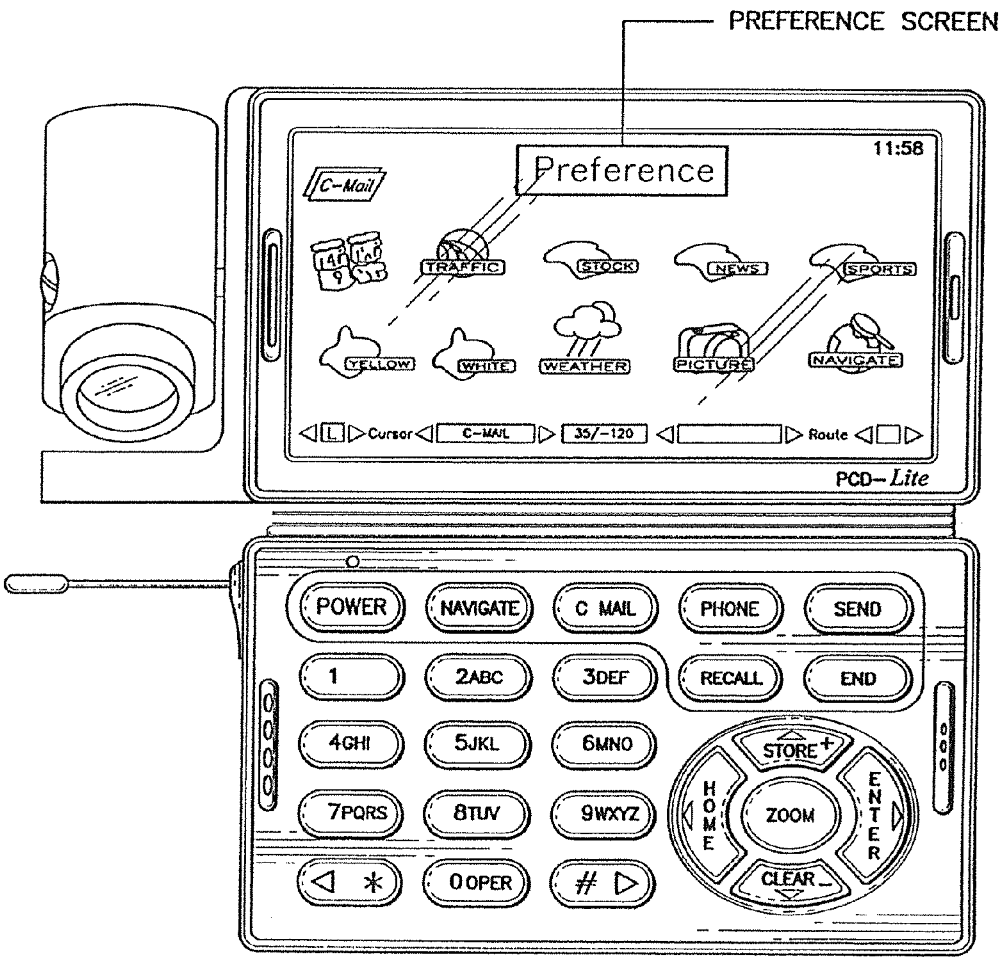
Figure 49E:
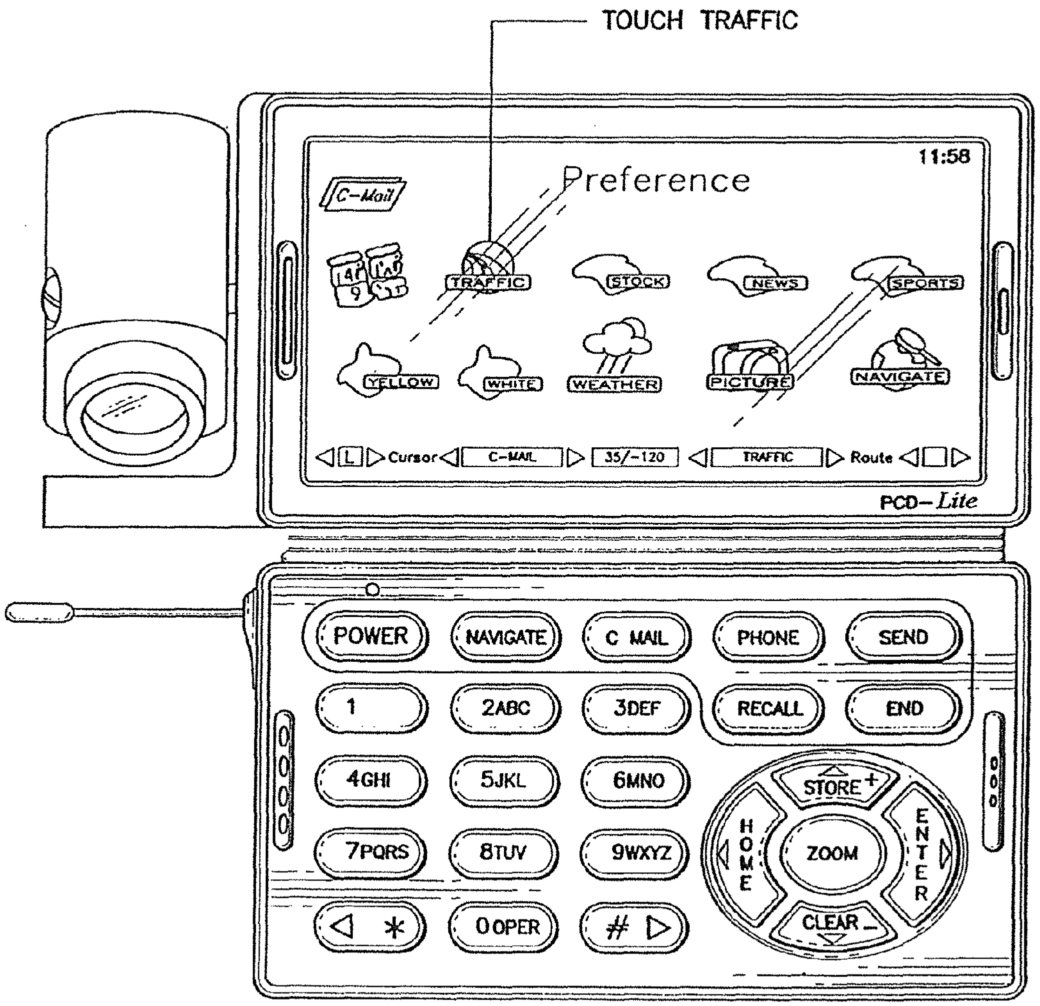
Figure 49F:
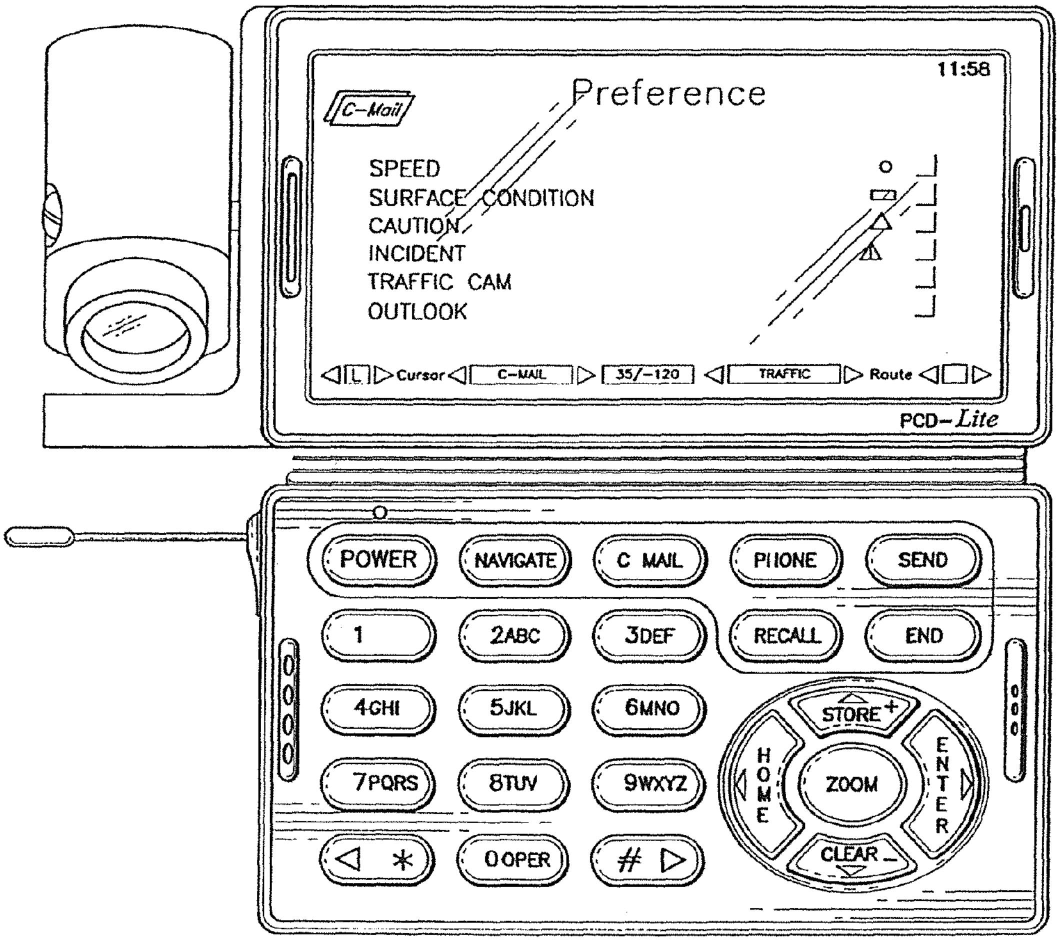
Figure 49G:
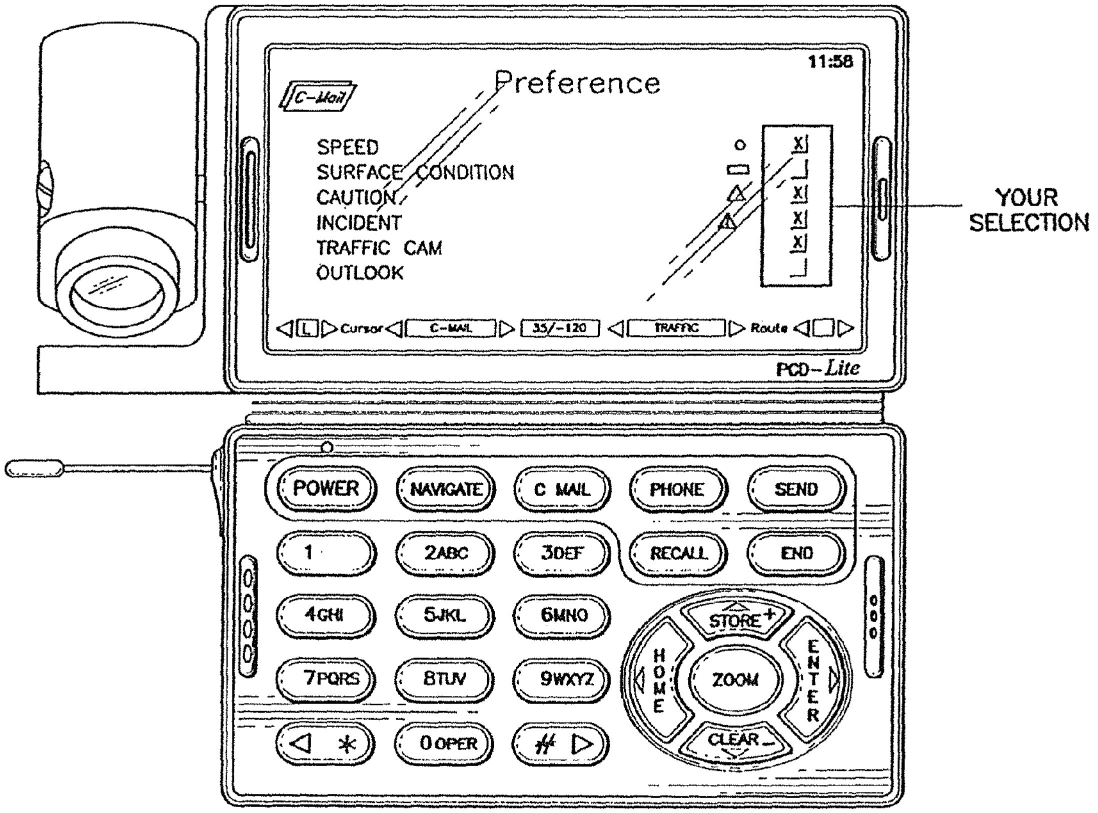

FIG. 47 illustrates a process of determining travel times. In step 1390, the process reads route information stored by the PCD. In step 1392, the process determines if the user has provided alternative route segments. If the user has provided alternative route segments the process reads information describing the alternative route segments in step 1394. Otherwise, the process determines alternative route segments in step 1396. Regardless, if the source of the alternative route segments, the process determines travel times for each of the route segments; and the route as a whole, in step 1398. The process then returns.

FIGS. 48A-H and FIGS. 49A-G illustrate an alternate embodiment of a PCD. The alternate embodiment includes an alphanumeric keypad with special function keys, a display screen, a microphone and speaker, an antenna, and a digital camera. The alphanumeric keypad includes a power button, alphanumeric keys corresponding to those keys generally found on cell phones, and special function keys. The special function keys include a Navigate key, a C-Mail key, and a Phone key. The special purpose keys further include a Store key, a Zoom key, and a Clear key, as well as an Enter key and a Home key and a Send, Recall, and an End key. As with the previously described version of the PCD, the PCD is equipped with a GPS receiver system so as to be able to use the global positioning satellite system to accurately determine the location of the alternate PCD.

The camera is a digital camera, which includes a sensing housing containing a charge coupled device (CCD) or other digital imaging device. The image formed by the digital camera is stored on memory contained within the PCD device, along with a GPS stamp. The GPS stamp is placed within the picture image in a manner similar to the placing of a time or date stamp on a digital image picture. Of course, methods and apparatus such as those described in U.S. Pat. No. 4,402,588, the disclosure of which is incorporated herein by reference, may be used. However, in the embodiment described the GPS stamp is placed into the image by overriding areas of memory with the GPS provided data. The GPS stamp provides latitude and longitude information, and serves as a convenient way of accurately placing the location of images.

In addition, the use of a camera with the PCD device allows the PCD device to serve as a mobile condition reporting device (CRD). The image taken using the PCD camera, along with the appropriate GPS stamp, is provided by the cellular communication capability, included with the device, to a central computer storage system. The central computer storage system then makes the CRD device data available, in the manner as previously described, to those requesting condition reporting device data.

In one embodiment, operators of the PCD device with camera can also indicate road status information. Road status information may be important, for example, in the event that a road is closed. In such an occurrence, viewers of CRD data might believe that a road is free and clear of traffic, when in fact the road is impassable. Furthermore, images of the roadway may not accurately describe all of the road conditions, such as ice or high winds, which may also impact roadway usage. Accordingly, the user has the option of tagging each image with a roadway status, with the possible status being open, closed, or caution. In one embodiment the central computer facility, however, will only include roadway status information if the person providing the roadway status information supplies a specified security code. This allows for only authorized personnel to update road status information. This prevents users from changing roadway status information so as to affect traffic patterns in such a manner that they may more freely use roads.

In one embodiment, all images taken using PCDs are automatically provided to the central computer facility. In another embodiment, users provide security level information for each image, which may be provided via default security level, with only images of a certain predefined security level transmitted to the central facility.

FIG. 44 illustrates a block diagram of a local area transmission system for providing multimedia information using GPS navigation system coordinates. Data 1330 pertaining to a local geographic area is maintained by cellular telephone system providers or other entities. The particular local geographic locations are based on the locations of cell sites for cellular telephone networks, and the location specific data is transmitted by a cell site 1332 both over a standard radio broadcast system using a radio transmitter 1334 and by request to the cell site via a telephone access number. This data includes ASCII or other text formats, digital graphical images, including maps, digital photo-based images, and audio data.

In the radio broadcast system method of transmitting data, a first radio frequency is used to inform receivers of the radio broadcast of specific frequencies to be used to obtain particular types of data. The specific frequencies continually transmit data pertaining to services and information of the type specified for the particular frequency. The data includes text and graphics normally including names, addresses, phone numbers and GPS locational information for providers of the services of the type for that frequency. Additionally, digital GPS maps for the particular cell site broadcast location are also included.

Similarly, each cell site location is provided a specific telephone number. Users of cellular telephone-capable devices call the number and are in turn provided a list of telephone numbers for providing data equivalent to the data provided by the radio broadcast system. Two sets of phone numbers are provided. The first set provides voice audio information, and the second set provides information in digital form. In one embodiment, users of a PCD then direct the PCD device to obtain digital text, graphical maps, and GPS location information from the cell site telephone number. This information may then be used by the user of the PCD device to determine route information and to obtain data in the same manner as from other GPS tagged data providers.

Figure 45:
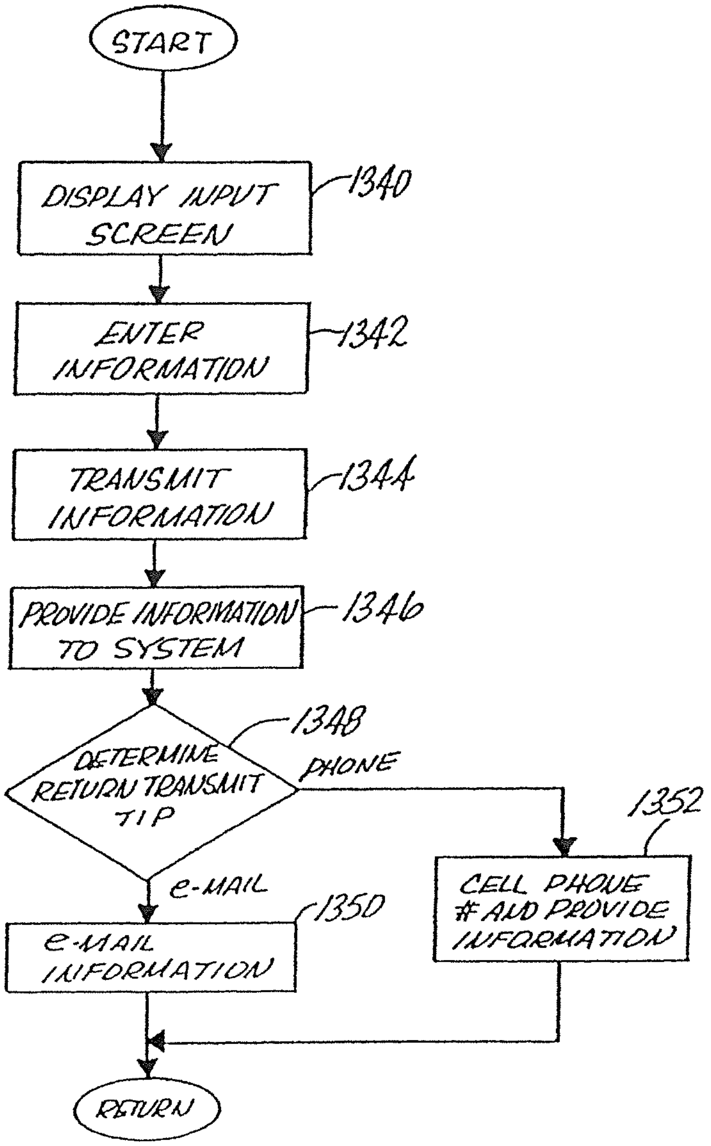
FIG. 45 illustrates a process of obtaining cell site based information.

FIG. 45 illustrates a method of directing a PCD to obtain restaurant-related information from the cell site telephone number. In step 1340 the PCD displays a screen having MIN #, PHN/EMAIL, and RTN ADDRS entry fields. The user enters the cell site telephone number in the PHN U entry field, P or E in the PHN/EMAIL entry field, and either the phone number of the PCD or an e-mail address in the RTN ADDRS entry field. In step 1342 the user enters information in the PHN #, PHN/EMAIL, and RTN ADDRS entry fields. If the user enters P in the PHN/EMAIL entry field, then the user should also enter the phone number of the PCD in the RTN ADDRS entry field. If the user enters E in the PHN/EMAIL entry field, then the user should enter an e-mail address in the RTN ADDRS entry field.

In step 1344 the user selects the TRNSMT option and the information entered by the user in step 1342 is transmitted by the PCD to the cell site telephone number. In step 1346 the cell site computer system determines which information pertains to the cell site telephone number. In step 1348 the cell site computer system determines whether the information transmitted by the PCD included a P or an E in the PHN/EMAIL field. In step 1352 the cell site computer system instructs the cell site to transmit the information pertaining to the cell site telephone number to the phone number transmitted by the PCD in the RTN ADDRS field if the PHN/EMAIL field contains a P. In step 1350 the cell site computer system transmits an e-mail message to the e-mail address transmitted by the PCD in the RTN ADDRS field if the PHN/EMAIL field contains an E.

Each cell site data provider additionally provides traffic and weather information for the cell site. By way of example, a central data provider may receive weather and traffic information from weather reporting devices and condition reporting devices and store that data by the latitude and longitude location of those devices. This data may be then transmitted over a particular frequency or made accessible by having users call a particular telephone number so that individuals may obtain accurate and timely weather and traffic information regarding specific localities.

The PCD also serves as a position monitoring device. To begin the position monitoring function the user selects the monitor on the PCD. Upon selecting the monitor function, the PCD displays a menu including INTERROG, AUTO-TIMED, and MOVE options. When the INTERROG function is selected the PCD will display an e-mail entry field allowing input by the user of an e-mail address. After the e-mail address is entered, the PCD responds to appropriate interrogatories by transmitting its current position. An appropriate interrogatory includes the security code active when the INTERROG mode was selected and an Internet e-mail address. Upon receipt of an appropriate interrogatory the PCD will transmit the GPS receiver determined latitude and longitude of the device to the e-mail address.

If the user selects the AUTO-TIMED option the PCD displays a time entry field and an e-mail address entry field. After entry of the time entry field and the e-mail address, the PCD will count down the time period entered by the user, and, upon the completion of the time period, transmit an e-mail to the entered e-mail address indicating the PCD location. After transmitting the PCD location to the e-mail address, the PCD will begin counting down the time period previously entered by the user, and once again transmit the PCD location upon the completion of the time period. Thus, for example, if the user enters the time 30 minutes into the time field and the e-mail address of abc@def.com, then every 30 minutes the PCD will transmit the PCD location to abc@def.com.

When a user selects the MOVE option the PCD displays a distance entry field and an e-mail address entry field. After entry of the distance field and the e-mail address field, the PCD transmits an e-mail containing the device location to the e-mail address specified in the e-mail field whenever the PCD moves a distance greater than the distance entered in the distance field. When the PCD transmits an e-mail indicating the device position, the current device position is stored and the PCD waits until the device has moved the distance specified in the distance field from the current location prior to again transmitting the PCD location to the e-mail address specified in the e-mail address field.

Figure 46:
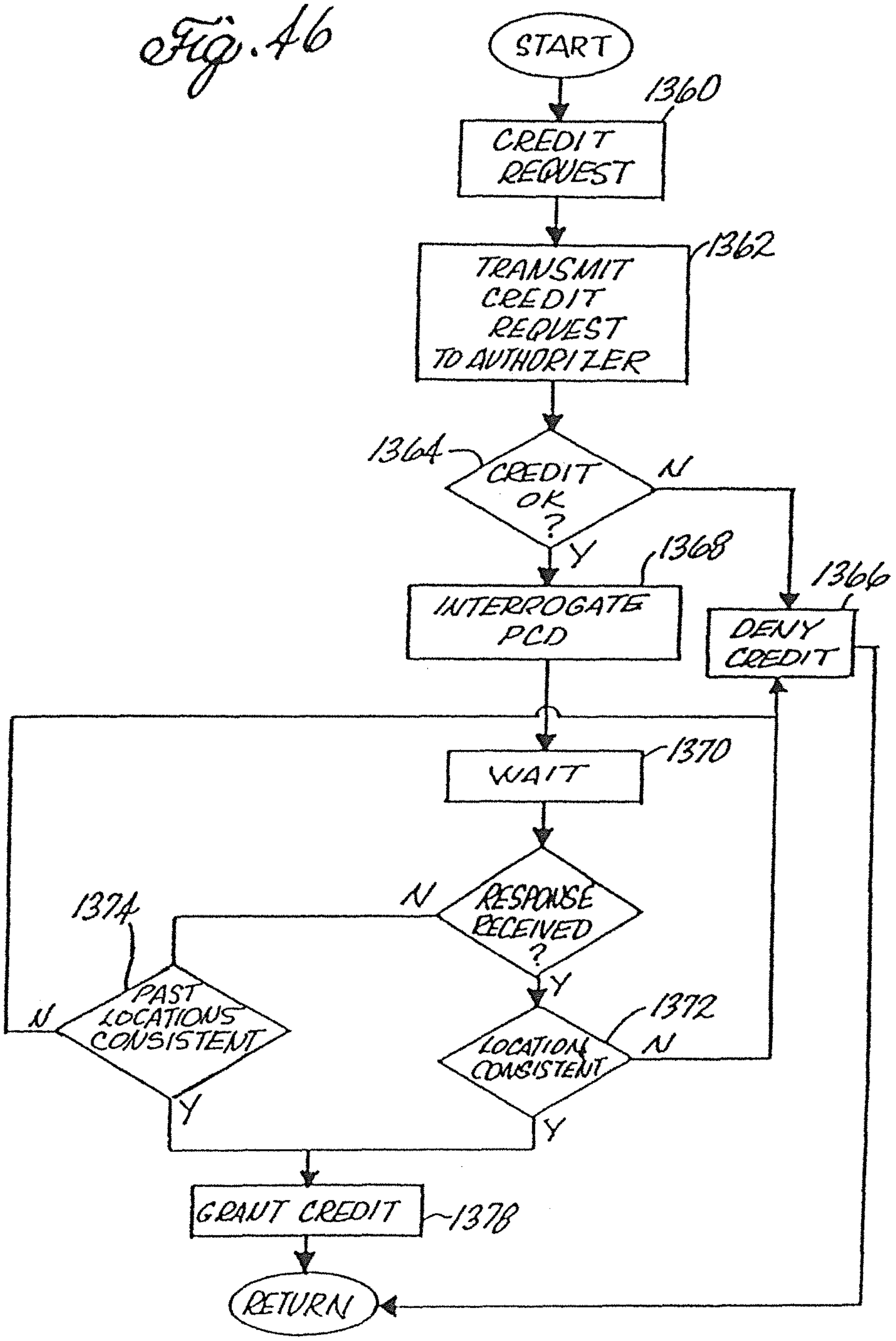
FIG. 46 illustrates a process of credit authorization.

Thus, the PCD can be used to monitor the locations of individuals utilizing PCDs. For example, credit authorization agencies may make use of the location monitoring capability provided by the PCD in determining the validity of credit requests. FIG. 46 illustrates a method of credit authorization using the PCD. In step 1360 an individual makes a request for credit. This may be accomplished in a variety of manners, including "swiping" a credit card through a credit card reader at a gas station, supermarket, or a variety of other locations, or merely by providing a credit card to a retail clerk who thereafter requests credit authorization. The request for credit may be made to a credit card issuer, or may merely be a request for credit authorization by a credit reporting facility.

In step 1362 the request for credit is transmitted to a credit authorizer. In step 1364 the credit authorizer determines whether credit authorization is appropriate in view of the credit authorizer's prior art credit authorization practices. Such prior art practices include the use of credit limits, past credit usage, and other factors. If the credit authorizer determines that credit authorization according to prior art practices is not appropriate, then credit authorization is denied in step 1366. If credit authorization according to prior art practices is appropriate, then the credit authorizer transmits an interrogatory to the individual's PCD in step 1368. In step 1370 the credit authorizer waits a predetermined time for a response from the PCD. In step 1371 the credit authorizer determines if a response from the PCD has been received. If a response from the PCD has been received, the credit authorizer determines if the PCD location is consistent with the request for credit in step 1372. This may be accomplished by determining if the PCD is at the location from which credit was requested if the reported location is consistent with the request for credit, then the process grants or authorizes credit in step 1378. If the reported location is not consistent with the request for credit, the process denies credit in step 1366. If no response is received from the PCD, the credit authorizer determines if previous PCD reported locations are consistent with the location from which credit was requested in step 1374. For example, the credit authorizer may have received responses from previous requests for position from the PCD, or an e-mail address of the credit authorizer may have been entered by the individual for AUTO-TIMED or MOVE position updates. If the previous location is consistent with the request for credit, then the process grants or authorizes credit in step 1378. If the previous locations is not consistent with the request for credit, the process denies credit in step 1366.

Additionally, PCDs can be used to monitor automobile locations and thereby discourage automobile theft or aid in the recovery of the automobile. For example, for an active PCD left in the INTERROG mode, upon discovery of the theft of the PCD or item in which the PCD is located, the user merely need to interrogate the PCD as to its location and thereafter be immediately informed as to the device location, thus allowing for ease in locating and returning the device to the proper user.

As another example, the user can leave the active PCD in MOVE mode, with the user's e-mail address designated as a recipient of the location of the PCD device. Thus, whenever the PCD, or object in which the PCD is located, is moved the user can receive instantaneous notification of the movement of the PCD and any object carrying the PCD. Further, in one embodiment of the invention, the user may select a SECURITY option from the main menu. In the SECURITY option the PCD is automatically configured in the MOVE mode, and the PCD is also automatically configured to transmit an e-mail to a user defined address in addition to any other addresses specified in the MOVE mode. The user defined address is preferably that of a police agency or security service. Further, in one embodiment of the invention, the PCD additionally places a telephone call via the PCD's cellular telephonic capabilities to a user defined telephone number. Upon answer by the receiving telephone the PCD automatically transmits an indication, which may be a prerecorded voice message that the PCD has moved from its prior location. In addition, the user defined telephone number may be the universal telephone number of the user, which is later herein described. In the event the predefined telephone number is the universal telephone number of the user the PCD additionally transmits a password corresponding to security level. The password and security level are selected by the user, and are also later herein described in conjunction with the universal telephone number.

In accordance with the present invention, the central computer system also maintains information in a database allowing individual users to be easily located both physically and in terms of their electronic communication locations. The central computer system maintains a database of individuals and an Internet address linked to each individual. The Internet address linked to each individual need not be a unique address, but instead many individuals may make use of a single computer indicated by the Internet address in the Internet address field. For example, for many cases the central computer system may be the computer system identified by the Internet address.

The system also contains a large number of computer systems linked by the Internet, and which are the computer systems pointed to by the address field for the individuals in the Internet address field Each of these computers form a home site computer system. The responsibility of maintaining the home site computer systems are the responsibility of the individuals.

The home site computer system maintains electronic contact information and geographic location of the individual. The electronic contact information includes home telephone numbers, office telephone numbers, cellular telephone numbers, fax numbers, and e-mail addresses. The geographic location is provided in terms of latitude and longitude, although street addresses or site names can also be provided with the latitude and longitude.

Also linked to each electronic communication identifier in geographic location information is a security level index. In one embodiment, the security level index is a number between one and ten. The individual assigns security level indexes for each item of information. The user also identifies other individuals who may wish to contact the user, and indicates which security index level each such other individual should be provided. Other individuals who are not identified by the user are provided a default security level index. When the home site is contacted by another individual, the other individual provides an identifier, such as the individual's name to the home site. In one embodiment the other individual also provides a password to the home site so that the home site may authenticate the identity of the individual. Based on the identity of the individual, preferably authenticated, the home site determines the other individual's security level index.

The other individual is thereafter only able to obtain information for the other individual's security level index value and those values below the other individual's security level index. For example, a user's general office work number may be assigned a security level index often, with the user's direct line phone number provided a security level index of six. A first other individual with a security index level of seven can only obtain the user's general office number while a second other individual with a security index level of six can also obtain the user's direct line phone number.

The user's geographic location is updated through the PCD. As previously discussed, the PCD can be used to provide e-mails indicative of the user's location in varying manners. When the user's home site computer system is identified as an e-mail address for such updates, the user's home site computer system may track the user over time. In one embodiment of the invention, the user's home site computer system is always provided a copy of any e-mail position updates provided by the PCD.

The capability to track individuals is further enhanced through the use of condition reporting devices. For example, a particular user is identified as being at a particular location, other individuals may request via the central computer system the location of condition reporting devices in that area. If the condition reporting device has digital picture capability, then the other individuals may request information from the particular condition reporting device and determine if the user is in fact at the location. Thus, the system of the present invention provides a method and system for tracking individuals, and for confirming the presence of individuals at particular locations.

In another embodiment of the invention, the user's home site computer system maintains a universal phone number, fax number, and e-mail address for the individual. When other individuals try to contact the user via the general phone number, fax number, or e-mail address the home site computer system automatically routes the incoming call, fax, or e-mail to the phone number, fax number, or e-mail address currently indicated as active for the individual. This routing is done, however, in conjunction with the other individual's security index level. Thus, if the active phone number for the user is the user's cellular telephone number, but the other individual does not have a security level index sufficient to determine the user's cellular telephone number, then the call to the user by the other individual will be automatically routed to the phone number with the highest number security level index available to the other individual. If the telephone number to which the other individual has been routed is not currently active for the user, the other individual will be left in a voice mail or other automatic answering system if available. Thus, users may selectively forward phone calls, facsimiles, or e-mails depending on requirements of the user.

The home site computer system maintains data indicative of the location of telephone numbers, fax numbers, and e-mail addresses. As the user's geographic location is updated through use of the PCD, the home site computer system automatically maintains a list of active phone numbers, facsimile numbers, and e-mail addresses for the user. Thus, if the user's geographic location as provided by the PCD indicates that the user is at the user's office, then the user's office phone numbers are made active. If the user's geographic location as provided by the PCD indicates that the user is at the user's home, then the user's home phone numbers are made active. If the user is at an undetermined location, then the user's home site computer system identifies the user's cellular telephone as the active phone. Thus, phone calls, facsimiles, and e-mails may be automatically routed, using call forwarding technology known in the art, to the electronic communication access number of the user without resort to sequentially calling various phone numbers.

In addition, in order to contact an individual only the universal phone number, facsimile number, and e-mail address need be known. Thus, as actual phone numbers and e-mail addresses change due to changes in telephone area codes, zone prefixes, or changes in the locations of homes and businesses, individuals need only update the information maintained by their home system in order to be able to be contacted by those desiring to communicate with them via electronic means.

The user's home site computer system also serves as a repository for data for use with the user's PCD. One purpose in providing such a repository is that the PCD may be unable to store all data requested from a data provider or other parties due to device memory constraints. For example, the user may request a map of a relatively large area and a relatively great amount of detail. Such a map may be too large for storage in the memory of the PCD. The user could request a subset of the desired map, if such a request or map is available, and request further subsets of the map as desired. Such a method, however, entails repeated requests for map information, and is also inconvenient if a single map section is repeatedly later used after other map sections are requested. Accordingly, the home site computer system provides a repository for such material. Data providers and information suppliers, instead of downloading data directly to a PCD in response to a request for information by a PCD, instead route data to the user's home site computer system.

In one embodiment, requests from a PCD for data include an indication of allowable memory space for downloaded data. The allowable memory space may be automatically determined by the PCD based on the total device memory and the memory available at a given time Thus, if a particular PCD can only accommodate additional data of 8 megabytes or less, the request for information would indicate a maximum download data size of 8 megabytes. Alternatively, the allowable memory space may be set by the user.

After the data provider or other information supplier receives a request for information, the data provider or information supplier then transmits the requested data to the home site computer system, via e-mail or other means described herein, in multiple files, each less than the maximum memory size of the PCD. The data provider or information supplier determines which information, such as map information is responsive to the request, and prepares individually readable and displayable files, or data packets, less than the allowable memory size. The user may thereafter request the data directly from the home site computer system, and later reuse the same information at the user's convenience. In addition, the user is also able to use the requested data using other PCDs, or even other computer systems.

While this invention has been described with reference to illustrative embodiments, this description is not intended to be construed in any limiting sense. Various other embodiments of the invention will be apparent to persons skilled in the art upon reference to this description. It is therefore contemplated that the appended claims will cover any such modifications of the embodiments as fall within the true scope and spirit of the invention.

The invention claimed is:

1. A system, comprising:

a first personal communications device (PCD) associated with a first user, and a second PCD associated with a second user, each PCD having a processor and a display comprising a touch screen input device, and being configured to operate as a portable telephone and to send and receive Global Positioning System (GPS) encoded location data;

a data provider that collects map data and other data and tags the other data to the map data;

one or more condition reporting devices that are configured to detect a road condition at a location and to send traffic speed data to a computer network;

the first PCD configured to receive map data from the data provider and to show the map on the display and to show the position of the first PCD as a first icon on the map, the first PCD configured to serve as a mobile condition reporting device and to send detected road condition data to a central computer system; and the first PCD further configured to receive GPS encoded location data regarding the second PCD and to show the position of the second PCD as a second icon on the map;

wherein the first PCD display is configured so that when the map is shown on the display, an interface to communications with the second user is provided through the touch screen input device at touch points on the display;

wherein the first PCD display is configured to have a sub-menu, and the interface to communications with the second user can be actuated through touch points in the sub-menu; and wherein each PCD comprises a digital camera configured to apply a GPS location stamp on a digitized image captured by the PCD digital camera, and each PCD is configured to select a road condition, wherein the detected road condition data comprises a digitized image with the GPS location stamp and a tag based on the selected road condition.

2. A system as in claim 1, wherein the first PCD is configured to receive data about the second user other than GPS encoded data.

3. A system as in claim 1, wherein the detected road condition comprises traffic speed.

4. A system as in claim 3, wherein at least one of the condition reporting devices is stationary.

5. A system as in claim 1, wherein the central computer system is configured to make the detected road condition data available to one or more other PCDs.

6. A system as in claim 5, wherein the PCDs are configured to communicate with the central computer system via a cellular telephone communication system, and each PCD is configured to receive detected road condition data from the central computer system, and to use current speed information to determine travel times to a desired destination along a plurality of proposed routes.

7. A system, comprising:

a first personal communications device (PCD) associated with a first user, and a second PCD associated with a second user, each PCD having a processor and a display comprising a touch screen input device, and being configured to operate as a portable telephone and to send and receive Global Positioning System (GPS) encoded location data;

a data provider that collects map data and other data and tags the other data to the map data;

the PCDs being configured to serve as mobile condition reporting devices configured to send a road condition data to a central computer system;

the first PCD configured to receive map data from the data provider and to show the map on the display and to show the position of the first PCD as a first icon on the map; and the first PCD further configured to receive GPS encoded location data regarding the second PCD and to show the position of the second PCD as a second icon on the map;

wherein the first PCD display is configured so that when the map is shown on the display, an interface to communications with the second user is provided through the touch screen input device at touch points on the display;

wherein the first PCD display is configured to have a sub-menu, and the interface to communications with the second user can be actuated through touch points in the sub-menu;

wherein the PCDs are configured so that the associated user can select a road status data reflecting the user's observation of a road status, and each PCD is configured to send the selected road status data to the central computer system; and wherein the PCDs each comprise a digital camera configured to apply a GPS location stamp on a digitized image captured by the PCD digital camera, wherein the road condition data comprises a digitized image with the GPS location stamp and a tag based on the selected road status.

8. A system as in claim 7, wherein the central computer system is configured to make the detected road condition data available to one or more other PCDs.

9. A system as in claim 1, wherein locations of interest are indicated by a marker on the map shown on the display, and the marker is linked to other data structures.

10. A system as in claim 9, wherein the PCDs are configured so that if the associated user selects the marker through the touch screen input device, the PCD displays or makes use of additional data concerning the location of interest.

11. A system as in claim 10, configured so that the additional data concerning the location of interest is obtained by the PCD from the data provider.

12. A system, comprising:

a first personal communications device (PCD) associated with a first user, and a second PCD associated with a second user, each PCD having a processor and a display comprising a touch screen input device, and being configured to operate as a portable telephone and to send and receive Global Positioning System (GPS) encoded location data;

a data provider that collects map data and other data and tags the other data to the map data;

the first PCD configured to receive map data from the data provider and to show the map on the display and to show the position of the first PCD as a first icon on the map;

the first PCD further configured to receive GPS encoded location data regarding the second PCD and to show the position of the second PCD as a second icon on the map;

wherein the first PCD display is configured so that when the map is shown on the display, an interface to communications with the second user is provided through the touch screen input device at touch points on the display; and wherein the first PCD display is configured to have a sub-menu, and the interface to communications with the second user can be actuated through touch points in the sub-menu;

wherein each PCD is configured so that the associated user can indicate a roadway status and communicate the status to the data provider; and wherein a first group of one or more users are recognized by the data provider as authorized personnel, and a second group of users are not recognized by the data provider as authorized personnel, and wherein the data provider is configured to only consider communications about the roadway status that are received from a user in the first group of users.

13. A system as in claim 12, wherein each PCD comprises a camera, and each PCD can communicate an image tagged with the roadway status to the data provider.

14. A method of exchanging GPS encoded and non-GPS encoded information between handheld devices, each of the handheld devices including at least a processor, a memory, a display screen configured to accept touch-screen inputs, a microphone, and a speaker, and being configured to operate as a portable telephone and to send and receive Global Positioning System (GPS) encoded location data, the method comprising:

a first one of the handheld devices receiving map data from a data provider;

the first one of the handheld devices sending road condition data to a central computer system, comprising capturing a digitized image, applying a GPS location stamp to the digitized image, and sending the digitized image with the GPS location stamp to the central computer system;

the first one of the handheld devices receiving GPS encoded location data regarding a second one of the handheld devices;

the first one of the handheld devices showing the map on the display and showing the position of the second one of the handheld devices as an icon on the map, and simultaneously receiving an input through a touch point on the display; and in response to the input, the first one of the handheld devices communicating with the second one of the handheld devices.

15. A method as in claim 14, wherein the touch point corresponds to a menu shown on the display with the map and the icon.

16. A method as in claim 15, wherein the first one of the handheld devices receives data about the second one of the handheld devices other than GPS encoded data.

17. A method as in claim 14, wherein the first one of the handheld devices additionally sends a tag based on a selected road condition to the central computer system with the digitized image.

18. A method as in claim 17, wherein the first one of the handheld devices receives a user input to identify the selected road condition.

19. A method as in claim 18, the first one of the handheld devices showing a plurality of possible descriptions for describing the road condition, and the user input selects one of the plurality of possible descriptions.

20. A method as in claim 17, wherein the first one of the handheld devices sends a security code to the central computer system, and the security code identifies whether the user of the first one of the handheld devices is an authorized person.

21. A method as in claim 20 additionally comprising the first one of the handheld devices displaying a sub-menu, and the touch point on the display is in the sub-menu.

22. A system, comprising:

a first personal communications device (PCD) associated with a first user, and a second PCD associated with a second user, each PCD having a processor and a display comprising a touch screen input device, and being configured to operate as a portable telephone and to send and receive Global Positioning System (GPS) encoded location data;

a data provider that collects map data and other data and tags the other data to the map data;

the first PCD configured to receive map data from the data provider and to show the map on the display and to show the position of the first PCD as a first icon on the map;

each PCD comprising a digital camera configured to apply a GPS location data to a digitized image captured by the PCD digital camera;

the first PCD configured to serve as a mobile condition reporting device configured to detect a road condition at a location and to send a detected road condition data to a computer network; and the first PCD being configured to select a road condition, wherein the detected road condition data comprises a digitized image with the GPS location data and a tag based on the selected road condition.

23. A system as in claim 22, wherein the first PCD is further configured to receive GPS encoded location data regarding the second PCD and to show the position of the second PCD as a second icon on the map, and wherein the first PCD display is configured so that when the map is shown on the display, an interface to communications with the second user is provided through the touch screen input device at touch points on the display.

24. A system as in claim 23, wherein the first PCD display is configured to have a sub-menu, and the interface to communications with the second user can be actuated through touch points in the sub-menu.

25. A system as in claim 22, wherein the central computer system is configured to communicate with one or more other PCDs and to make the detected road condition data available to the one or more other PCDs so that, using current speed information, travel times to a desired destination along a plurality of proposed routes can be determined based on the detected road condition data.

26. A system as in claim 22, wherein the central computer system is configured to make the detected road condition data available to one or more of the other PCDs.

27. A system as in claim 26, wherein the central computer system is configured to make the detected road condition data available to one or more of the other PCDs only if it receives a security code from the first PCD that identifies the first user as an authorized person.

28. A system as in claim 26, wherein the first PCD display is configured to show a plurality of road status descriptions and to allow the first user to select one of the plurality of road status descriptions, and the road status data comprises the selected one of the road status descriptions.

29. A system, comprising:

a plurality of personal communications devices (PCDs), each PCD having a processor and a display comprising a touch screen input device, and being configured to operate as a portable telephone and to send and receive Global Positioning System (GPS) encoded location data;

a data provider that collects map data and other data and tags the other data to the map data;

each of the PCDs configured to receive map data from the data provider and to show the map on the respective display and to show the position of the PCD as an icon on the map;

a first one of the PCDs associated with a first user;

the first PCD configured to serve as a mobile condition reporting device adapted to send a road condition data to a central computer system;

the first PCD configured so that the first user can select a road status data reflecting the first user's observation of a road status, and the first PCD is configured to send the selected road status data to the central computer system; and the first PCD comprising a digital camera configured to associate a GPS location data with a digitized image captured by the PCD digital camera, wherein the road condition data comprises the digitized image with the GPS location data and a tag based on the selected road status.

30. A system as in claim 29, wherein the central computer system is configured to make the detected road condition data available to one or more of the other PCDs.

31. A system as in claim 30, wherein the central computer system is configured to make the detected road condition data available to one or more of the other PCDs only if it receives a security code from the first PCD that identifies the first user as an authorized person.

32. A system as in claim 31, wherein the first PCD display is configured to show a plurality of road status descriptions and to allow the first user to select one of the plurality of road status descriptions, and the road status data comprises the selected one of the road status descriptions.

33. A system as in claim 30, wherein the first PCD display is configured to show a plurality of road status descriptions and to allow the first user to select one of the plurality of road status descriptions, and the road status data comprises the selected one of the road status descriptions.

34. A system as in claim 30, wherein each of the PCDs is configured so that the associated user can select a road status data reflecting the associated user's observation of a road status, and each of the PCDs is configured to send the selected road status data to the central computer system.

35. A system as in claim 30, wherein the first PCD is further configured to receive GPS encoded location data regarding a second one of the PCDs associated with a second user, and to show the position of the second PCD as a second icon on the map, and wherein the first PCD display is configured so that when the map is shown on the display, an interface to communications with the second user is provided through the touch screen input device at touch points on the display.

36. A system as in claim 35, wherein the first PCD display is configured to have a sub-menu, and the interface to communications with the second user can be actuated through touch points in the sub-menu.

37. A system, comprising:

a plurality of personal communications devices (PCDs), each PCD having a processor and a display comprising a touch screen input device, and being configured to operate as a portable telephone and to send and receive Global Positioning System (GPS) encoded location data;

a data provider that collects map data and other data and tags the other data to the map data;

each of the PCDs configured to receive map data from the data provider and to show the map on the respective display and to show the position of the PCD as an icon on the map;

a first one of the PCDs associated with a first user;

the first PCD configured to serve as a mobile condition reporting device adapted to send a road condition data about a location to a central computer system;

the first PCD display configured to show a plurality of road status descriptions and to receive a user input selecting one of the plurality of road status descriptions reflecting the first user's observation of a road status, a road status data comprising the selected one of the road status descriptions;

wherein the central computer system is configured to make the detected road condition data available to one or more of the other PCDs only if the first PCD sends a security code that identifies the first user as an authorized person; and wherein the road condition data comprises the road status data and the GPS encoded location data corresponding to the location.

38. A system as in claim 37, wherein the first PCD comprises a digital camera configured to associate a GPS location data with a digitized image captured by the PCD digital camera, and wherein the road condition data additionally comprises the digitized image with the GPS location data.

39. A system as in claim 37, wherein each of the plurality of PCDs is configured to receive detected road condition data from the central computer system, and to use current speed information to determine travel times to a desired destination along a plurality of proposed routes.

40. A system as in claim 1, wherein each PCD display is configured to show a plurality of road condition descriptions and to allow a user to select one of the plurality of road condition descriptions shown on the PCD display, and the tag based on the selected road condition comprises the selected one of the road condition descriptions.

41. A system as in claim 7, wherein each PCD display is configured to show a plurality of road status descriptions and to allow the associated user to select the road status data by selecting one of the plurality of road status descriptions shown on the PCD display, the selected road status data comprising the selected one of the plurality of road status descriptions.

42. A system as in claim 12, wherein each PCD display is configured to show a plurality of roadway status descriptions and to allow the associated user to indicate the roadway status by selecting one of the plurality of roadway status descriptions shown on the PCD display, the indicated roadway status comprising the selected one of the plurality of roadway status descriptions.

43. A system as in claim 42, wherein each PCD comprises a camera, and each PCD can communicate an image tagged with the indicated roadway status to the data provider.

44. A method as in claim 20 additionally comprising a plurality of handheld devices receiving, from the central computer system, the road condition data sent to the central computer system by the first one of the handheld devices only if the security code identifies the user of the first one of the handheld devices as an authorized person.

45. A method as in claim 44, wherein the first one of the handheld devices receives a user input to identify the selected road condition.

46. A method as in claim 45, wherein the first one of the handheld devices showing a plurality of possible descriptions for describing the road condition, and the user input selects one of the plurality of possible descriptions.

* * * * *